US011921290B2

(12) United States Patent
Patterson et al.

(10) Patent No.: US 11,921,290 B2
(45) Date of Patent: Mar. 5, 2024

(54) AUGMENTED REALITY DISPLAY HAVING LIQUID CRYSTAL VARIABLE FOCUS ELEMENT AND ROLL-TO-ROLL METHOD AND APPARATUS FOR FORMING THE SAME

(71) Applicant: Magic Leap, Inc., Plantation, FL (US)

(72) Inventors: Roy Matthew Patterson, Hutto, TX (US); Chulwoo Oh, Cedar Park, TX (US); Ravi Kumar Komanduri, Austin, TX (US); Charles Scott Carden, Austin, TX (US); Michael Nevin Miller, Austin, TX (US); Vikramjit Singh, Pflugerville, TX (US); Shuqiang Yang, Austin, TX (US)

(73) Assignee: Magic Leap, Inc., Plantation, FL (US)

( * ) Notice: Subject to any disclaimer, the term of this patent is extended or adjusted under 35 U.S.C. 154(b) by 0 days.

(21) Appl. No.: 17/145,181

(22) Filed: Jan. 8, 2021

(65) Prior Publication Data
US 2021/0132394 A1 May 6, 2021

Related U.S. Application Data

(62) Division of application No. 16/171,111, filed on Oct. 25, 2018, now Pat. No. 10,890,769.
(Continued)

(51) Int. Cl.
*G02B 27/01* (2006.01)
*F21V 8/00* (2006.01)
*G02F 1/29* (2006.01)

(52) U.S. Cl.
CPC ....... *G02B 27/0172* (2013.01); *G02B 6/0076* (2013.01); *G02F 1/29* (2013.01); *G02B 2027/0112* (2013.01); *G02F 1/294* (2021.01)

(58) Field of Classification Search
CPC .............. G02B 27/0172; G02B 6/0076; G02B 2027/0112; G02F 1/29; G02F 1/294
See application file for complete search history.

(56) References Cited

U.S. PATENT DOCUMENTS

| 5,647,036 A | 7/1997 | Deacon et al. |
| 6,850,221 B1 | 2/2005 | Tickle |
| (Continued) | | |

FOREIGN PATENT DOCUMENTS

| CN | 101261369 | 9/2008 |
| CN | 101261369 A | 9/2008 |
| (Continued) | | |

OTHER PUBLICATIONS

Invitation to Pay Additional Fees for PCT Application No. PCT/US 18/57590, dated Dec. 21, 2018.
(Continued)

*Primary Examiner* — Nathanael R Briggs
(74) *Attorney, Agent, or Firm* — Tobias Intellectual Property Law, PLLC

(57) ABSTRACT

A display device includes a waveguide assembly comprising a waveguide configured to outcouple light out of a major surface of the waveguide to form an image in the eyes of a user. An adaptive lens assembly has a major surface facing the output surface and a waveplate lens and a switchable waveplate assembly. The switchable waveplate assembly includes quarter-wave plates on opposing sides of a switchable liquid crystal layer, and electrodes on the quarter-wave plates in the volume between the quarter-wave plates. The electrodes can selectively establish an electric field and may serve as an alignment structure for molecules of the liquid crystal layer. Portions of the adaptive lens assembly may be manufactured by roll-to-roll processing in which a substrate roll is unwound, and alignment layers and liquid
(Continued)

crystal layers are formed on the substrate as it moves towards a second roller, to be wound on that second roller.

20 Claims, 42 Drawing Sheets

Related U.S. Application Data

(60) Provisional application No. 62/577,678, filed on Oct. 26, 2017.

(56) References Cited

U.S. PATENT DOCUMENTS

| | | | |
|---|---|---|---|
| 8,493,520 B2 | 7/2013 | Gay et al. | |
| 9,081,426 B2 | 7/2015 | Armstrong | |
| 9,215,293 B2 | 12/2015 | Miller | |
| 9,348,143 B2 | 5/2016 | Gao et al. | |
| 9,417,452 B2 | 8/2016 | Schowengerdt et al. | |
| 9,470,906 B2 | 10/2016 | Kaji et al. | |
| 9,547,174 B2 | 1/2017 | Gao et al. | |
| 9,671,566 B2 | 6/2017 | Abovitz et al. | |
| 9,740,006 B2 | 8/2017 | Gao | |
| 9,791,700 B2 | 10/2017 | Schowengerdt et al. | |
| 9,846,967 B2 | 12/2017 | Schowengerdt | |
| 9,851,563 B2 | 12/2017 | Gao et al. | |
| 9,857,591 B2 | 1/2018 | Welch et al. | |
| 9,874,749 B2 | 1/2018 | Bradski | |
| 9,977,251 B2 | 5/2018 | Cho et al. | |
| 10,371,992 B2 * | 8/2019 | Tang | G02F 1/1343 |
| 10,890,769 B2 | 1/2021 | Patterson et al. | |
| 10,926,452 B2 | 2/2021 | Patterson et al. | |
| 2002/0126249 A1 | 9/2002 | Liang et al. | |
| 2004/0077141 A1* | 4/2004 | Kim | H01L 28/40 257/E21.292 |
| 2005/0042391 A1 | 2/2005 | Ryan et al. | |
| 2006/0028436 A1 | 2/2006 | Armstrong | |
| 2007/0081123 A1 | 4/2007 | Lewis | |
| 2009/0009668 A1 | 1/2009 | Tan et al. | |
| 2009/0174300 A1 | 7/2009 | Jousse et al. | |
| 2009/0213147 A1 | 8/2009 | Sagardoyburu et al. | |
| 2010/0220043 A1 | 9/2010 | Broughton et al. | |
| 2011/0024950 A1 | 2/2011 | Kruglick | |
| 2011/0170184 A1 | 7/2011 | Wolk | |
| 2011/0181706 A1* | 7/2011 | Harrold | G02B 30/30 348/51 |
| 2012/0092750 A1 | 4/2012 | Kroll et al. | |
| 2012/0127062 A1 | 5/2012 | Bar-Zeev et al. | |
| 2012/0128811 A1 | 5/2012 | Shizawa et al. | |
| 2012/0162549 A1 | 6/2012 | Gao et al. | |
| 2013/0082922 A1 | 4/2013 | Miller | |
| 2013/0117377 A1 | 5/2013 | Miller | |
| 2013/0125027 A1 | 5/2013 | Abovitz | |
| 2013/0208234 A1 | 8/2013 | Lewis | |
| 2013/0242262 A1 | 9/2013 | Lewis | |
| 2014/0071539 A1 | 3/2014 | Gao | |
| 2014/0177023 A1 | 6/2014 | Gao et al. | |
| 2014/0218468 A1 | 8/2014 | Gao et al. | |
| 2014/0267420 A1 | 9/2014 | Schowengerdt | |
| 2014/0306866 A1 | 10/2014 | Miller et al. | |
| 2015/0016777 A1 | 1/2015 | Abovitz et al. | |
| 2015/0103306 A1 | 4/2015 | Kaji et al. | |
| 2015/0115495 A1 | 4/2015 | Sakamoto et al. | |
| 2015/0178939 A1 | 6/2015 | Bradski et al. | |
| 2015/0205126 A1 | 7/2015 | Schowengerdt | |
| 2015/0222883 A1 | 8/2015 | Welch | |
| 2015/0222884 A1 | 8/2015 | Cheng | |
| 2015/0268415 A1 | 9/2015 | Schowengerdt et al. | |
| 2015/0268495 A1* | 9/2015 | Kizaki | G02F 1/133784 349/33 |
| 2015/0302652 A1 | 10/2015 | Miller et al. | |
| 2015/0309263 A2 | 10/2015 | Abovitz et al. | |
| 2015/0326570 A1 | 11/2015 | Publicover et al. | |
| 2015/0346490 A1 | 12/2015 | TeKolste et al. | |
| 2015/0346495 A1 | 12/2015 | Welch et al. | |
| 2016/0011419 A1 | 1/2016 | Gao | |
| 2016/0026253 A1 | 1/2016 | Bradski et al. | |
| 2017/0293145 A1 | 10/2017 | Miller et al. | |
| 2017/0307796 A1 | 10/2017 | Boone et al. | |
| 2018/0113362 A1* | 4/2018 | Lan | G02F 1/133528 |
| 2018/0172888 A1* | 6/2018 | Johnson | G02B 5/305 |
| 2019/0129178 A1 | 5/2019 | Patterson et al. | |

FOREIGN PATENT DOCUMENTS

| | | |
|---|---|---|
| CN | 105842862 | 8/2016 |
| CN | 105842862 A | 8/2016 |
| EP | 2 811 339 | 12/2014 |
| EP | 2738602 B1 | 10/2019 |
| JP | 2005274847 A | 10/2005 |
| JP | 2006326948 A | 12/2006 |
| JP | 2007133302 A | 5/2007 |
| JP | 2010526321 A | 7/2010 |
| JP | 2012169434 A | 9/2012 |
| JP | 2015034996 A | 2/2015 |
| JP | 2015167152 A | 9/2015 |
| JP | 2017500605 A | 1/2017 |
| JP | 2017030160 A | 2/2017 |
| KR | 2014-0147542 | 12/2014 |
| KR | 2014-0147542 A | 12/2014 |
| KR | 2016-0039101 | 4/2016 |
| KR | 2016-0039101 A | 4/2016 |
| WO | 2011087896 A2 | 7/2011 |
| WO | WO 2015/081313 | 6/2015 |
| WO | 2017176898 A1 | 10/2017 |
| WO | WO 2019/084322 | 5/2019 |

OTHER PUBLICATIONS

International Search Report and Written Opinion for PCT Application No. PCT/US 18/57590, dated Feb. 21, 2019.
International Preliminary Report for Patentability for PCT Application No. PCT/US 18/57590, dated Apr. 28, 2020.
ARToolKit: https://web.archive.org/web/20051013062315/http://www.hitl.washington.edu:80/artoolkit/documentation/hardware.htm, archived Oct. 13, 2005.
Azuma, "A Survey of Augmented Reality," Teleoperators and Virtual Environments 6, 4 (Aug. 1997), pp. 355-385. https://web.archive.org/web/20010604100006/http://www.cs.unc.edu/~azuma/ARpresence.pdf.
Azuma, "Predictive Tracking for Augmented Realty," TR95-007, Department of Computer Science, UNC—Chapel Hill, NC, Feb. 1995.
Bimber, et al., "Spatial Augmented Reality—Merging Real and Virtual Worlds," 2005 https://web.media.mit.edu/~raskar/book/BimberRaskarAugmentedRealityBook.pdf.
Chulwoo:"Concentric Polarization Gratings as Vectorial Fresnel Zone Plates: a new opportunity for beam shaping," Chapter 7, pp. 125-142, Dissertation_Ch_7_8.
Crawford, et al.: "Liquid-crystal diffraction gratings using polarization holography alignment techniques," Journal of Applied Physics 98, 123102, 2005.
Escuti, M. et al., "39.4: Polarization-independent switching with high contrast from a liquid crystal polarization grating", SID Symposium Digest, vol. 37, pp. 1443-1446, Jun. 2006, in 5 pages.
Escuti, M. et al., "Polarization-Independent LC Microdisplays Using Liquid Crystal Polarization Gratings: A Viable Solution", ILCC presentation, Jul. 1, 2008, in 15 pages.
Jacob, "Eye Tracking in Advanced Interface Design," Human-Computer Interaction Lab Naval Research Laboratory, Washington, D.C. / paper/ in Virtual Environments and Advanced Interface Design, ed. by W. Barfield and T.A. Furness, pp. 258-288, Oxford University Press, New York (1995).
Kim, J. et al., "Wide-angle, nonmechanical beam steering with high throughput utilizing polarization gratings", Applied Optics, vol. 50, No. 17, Jun. 10, 2011, in 4 pages.
Komanduri, et al., "Multi-twist retarders: broadband retadation control using self-aligning reactive liquid crystal layers," Optical Society of America, Optics Express 404, vol. 21, No. 1, Jan. 14, 2013.

(56) References Cited

OTHER PUBLICATIONS

Komanduri, R. et al., "18:3: Late-News Paper: Polarization Independent Liquid Crystal Microdisplays", SID Digest, vol. 39, No. 1, pp. 236-239, May 2008, in 4 pages.

Komanduri, R. et al., "34.4L: Late-News Paper: Polarization Independent Projection Systems using Thin Film Polymer Polarization Gratings and Standard Liquid Crystal Microdisplays", SID Digest, vol. 40, No. 1, Jun. 2009, in 4 pages.

Komanduri, R. et al., "Elastic Continuum Analysis of the Liquid Crystal Polarization Grating", Physical review. E, Statistical, nonlinear, and soft matter physics, May 25, 2007, in 8 pages.

Komanduri, R. et al., "Polarization Independent Projection Systems using Thin Film Polymer Polarization Gratings and Standard Liquid Crystal Microdisplays", SID-Display week presentation, Jun. 3, 2009, in 12 pages.

Komanduri, R. et al., "Polarization-independent modulation for projection displays using small-period LC polarization gratings", Journal of the Society for information display, vol. 15, No. 8, pp. 589-594, Aug. 2007, in 7 pages.

Lee, et al., Negative dispersion of birefringence in two-dimensionally self-organized smectic liquid crystal and monomer thin film, Optics Letters, vol. 39, No. 17, Sep. 1, 2014.

Lim, Y. et al., "Anisotropic Nano-Imprinting Technique for Fabricating a Patterned Optical Film of a Liquid Crystalline Polymer", Journal of Nanoscience and Nanotechnology, vol. 8, pp. 4775-4778, Oct. 2008, in 4 pages.

Nikolova et al., "Diffraction Efficiency and Selectivity of Polarization Holographic Recording", Optica Acta: Int'l J Optics (1984) 31(5):579-588.

Oh C. et al.: "Achromatic Diffraction from Polarization Gratings with High Efficiency", Opt Lett. (Oct. 2008) 33(20):2287-2289 & Erratum Opt Lett. (Dec. 2009) 34(23):3637.

Oh, C. et al., "Numerical analysis of polarization gratings using the finite-difference time-domain method", Physical review A, vol. 76, Oct. 12, 2007, in 8 pages.

Oh, C. et al., "Polarization-Independent Modulation using Standard LCDs and Polymer PGs", 2008, in 6 pages.

Oh, C. et al., 16.2: Polarization-Independent Modulation Using Standard Liquid Crystal Microdisplays and Polymer Polarization Gratings, IDRC, 2008, in 4 pages.

Tanriverdi and Jacob, "Interacting With Eye Movements in Virtual Environments," Department of Electrical Engineering and Computer Science, Tufts University, Medford, MA—paper/Proc. ACM CHI 2000 Human Factors in Computing Systems Conference, pp. 265-272, Addison-Wesley/ACM Press (2000).

Yang et al. Negative dispersion of birefringence of smectic liquid crystal-polymer compostie: dependence on the constituent molecules and temperature, Optical Society of America, Optics Express 2466, vol. 23, No. 3, Feb. 9, 2015.

JP2020-521300 Official Action dated Dec. 1, 2022.

JP2020-521300 Official Action dated Aug. 10, 2022.

EP23189421.3 Extended European Search Report dated Nov. 22, 2023.

Jeong et al., "Bifunctional ITO layer with a high resolution, surface nano-pattern for alignment and switching of LCs in device applications", NPG Asia Materials, vol. 4, No. 2, Feb. 17, 2012, pp. e7-e7, XP093100255, ISSN: 1884-4049, DOI: 10.1038/am. 2012. 12, Retrieved from the Internet: https ://www.nature.com/articles/am201212.pdf>.

KR2020-7014200 Office Action dated Dec. 1, 2023.

Tabiryan et al., "Thin waveplate lenses of switchable focal length—new generation in optics", Optics Express, vol. 23, No. 20, Sep. 22, 2015, p. 25783, XP055348699, DOI: 10.1364/OE.23.025783.

\* cited by examiner

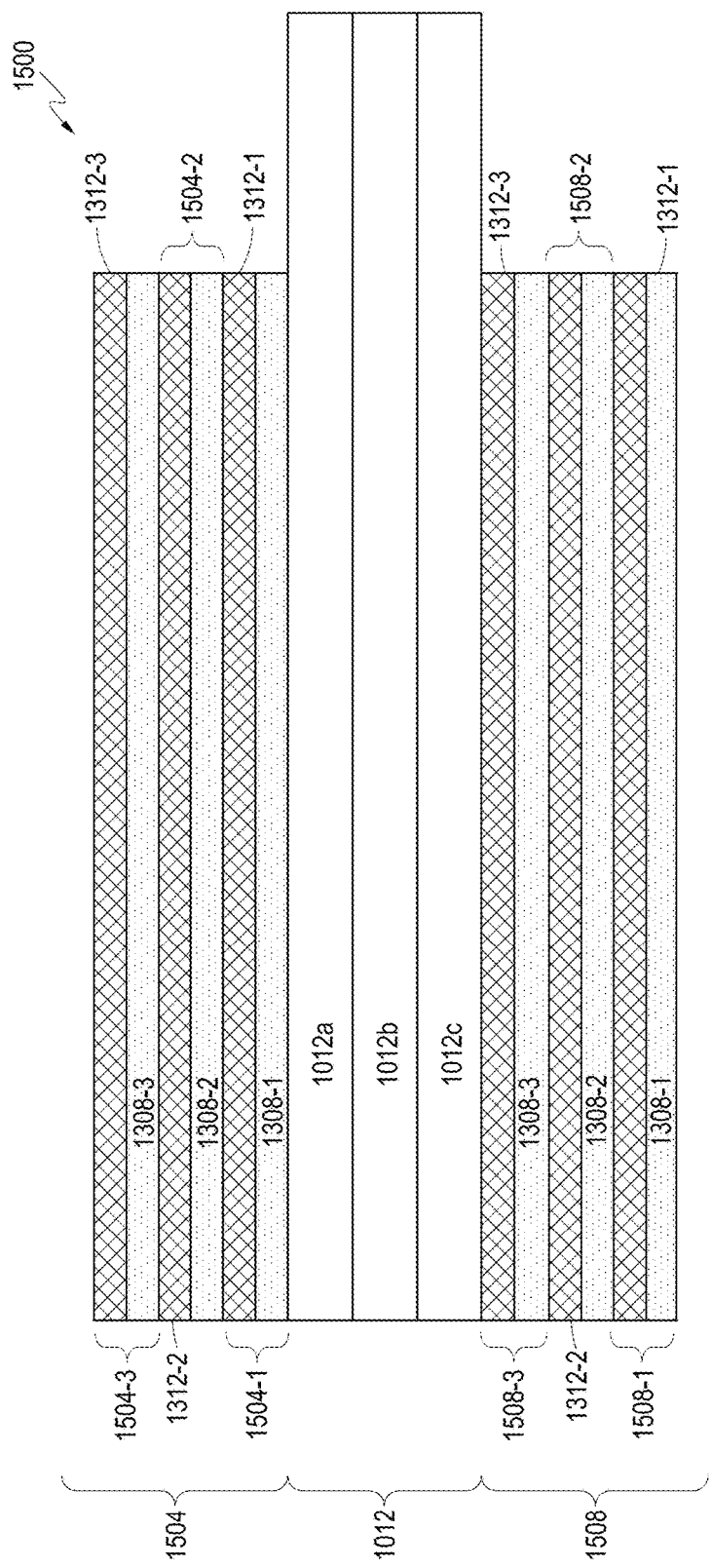
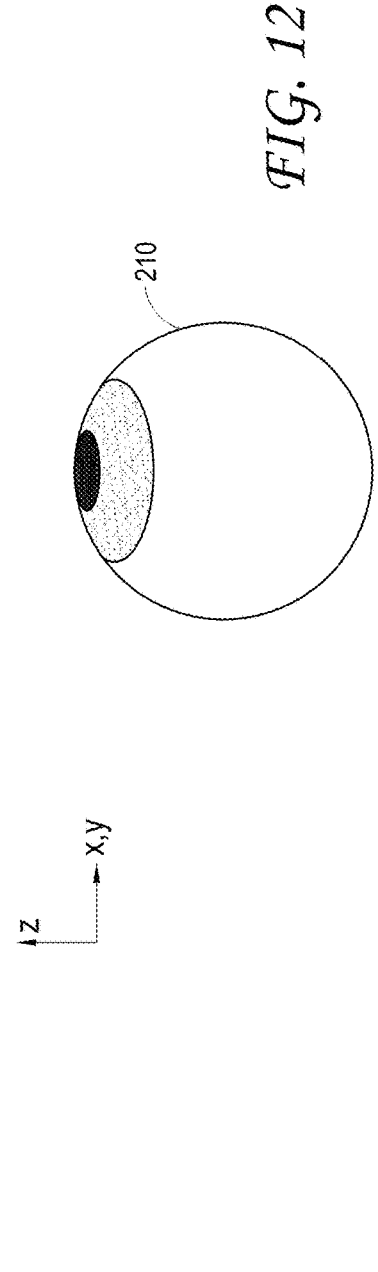
FIG. 12

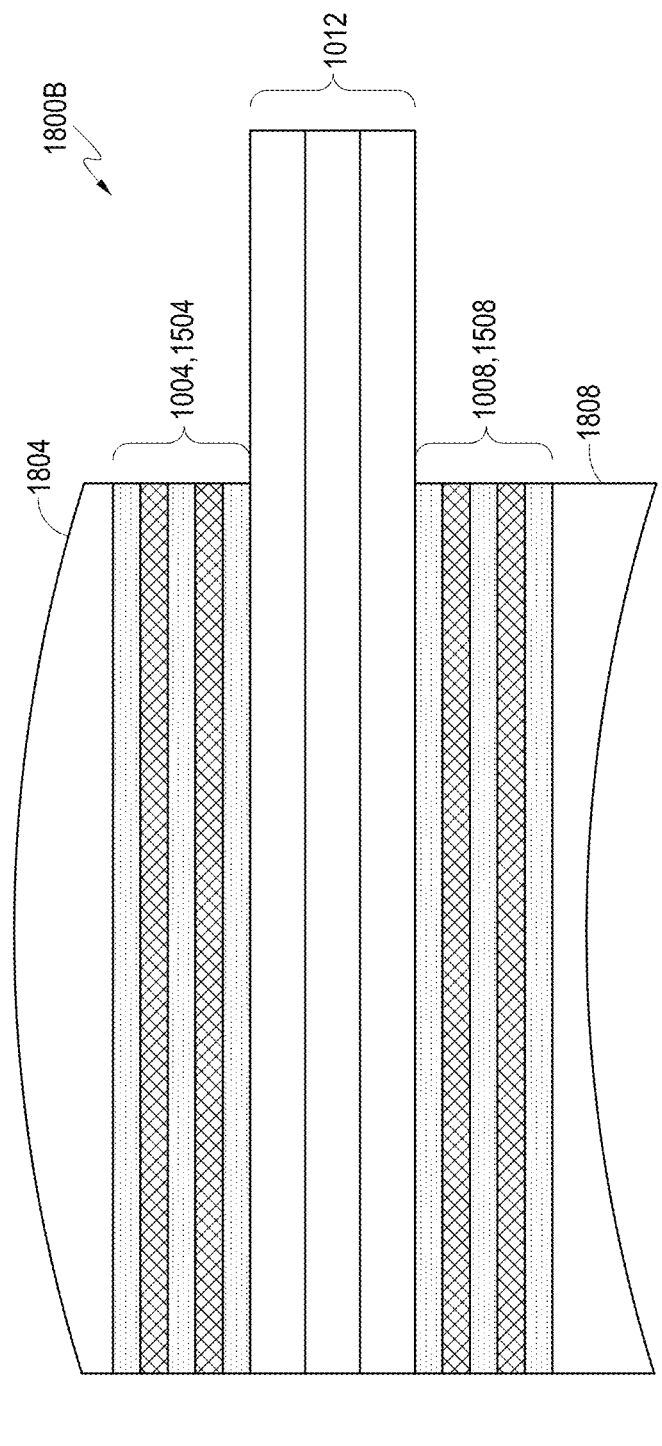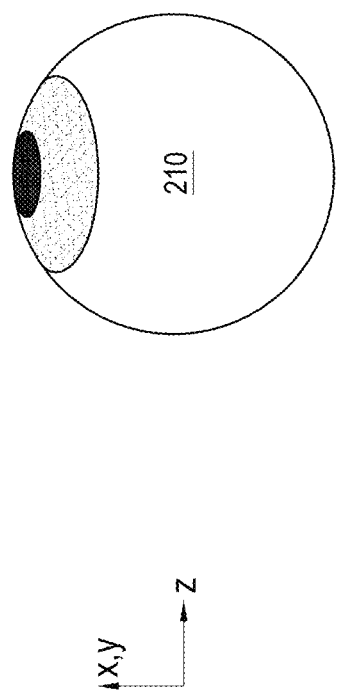
FIG. 13B

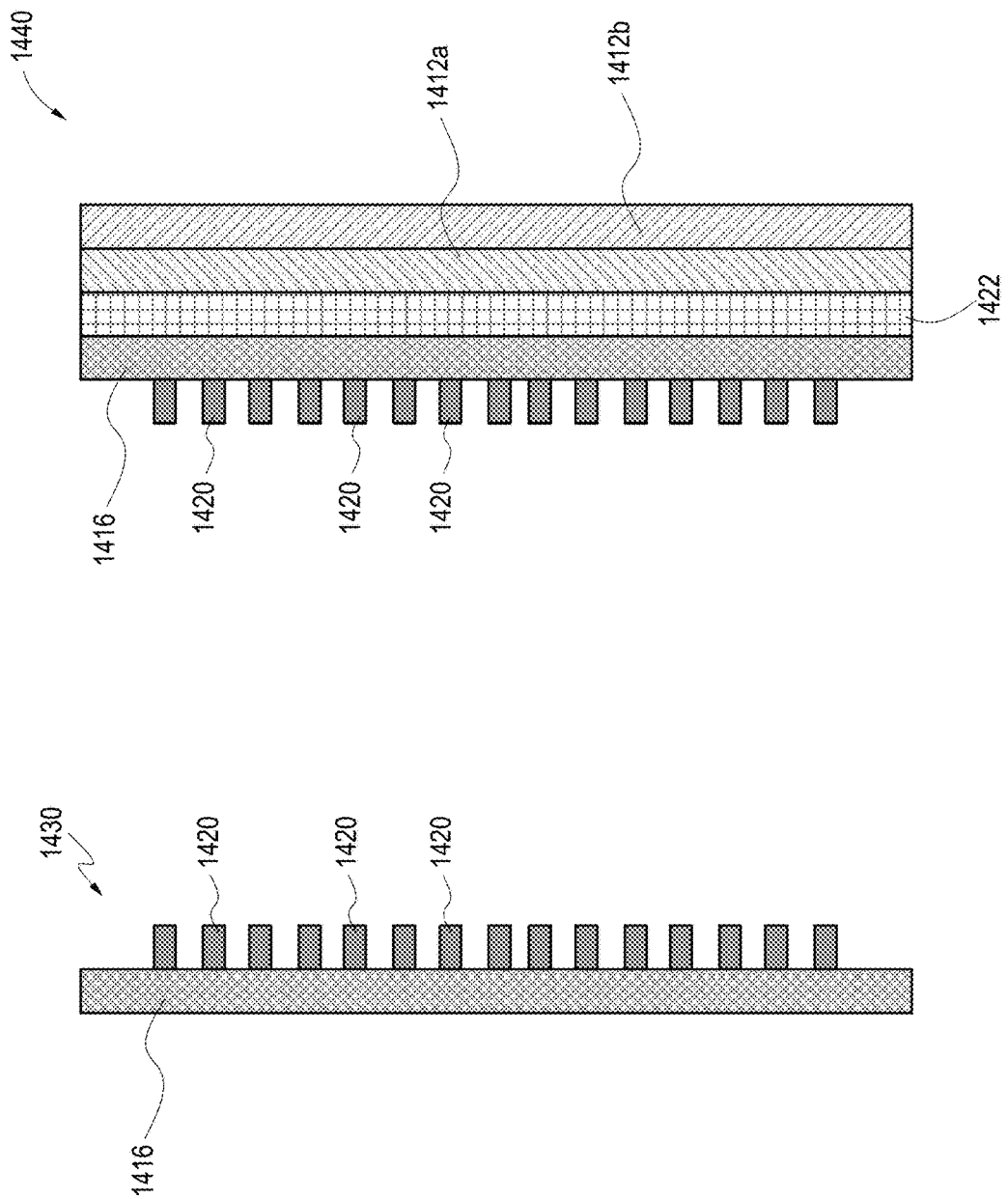

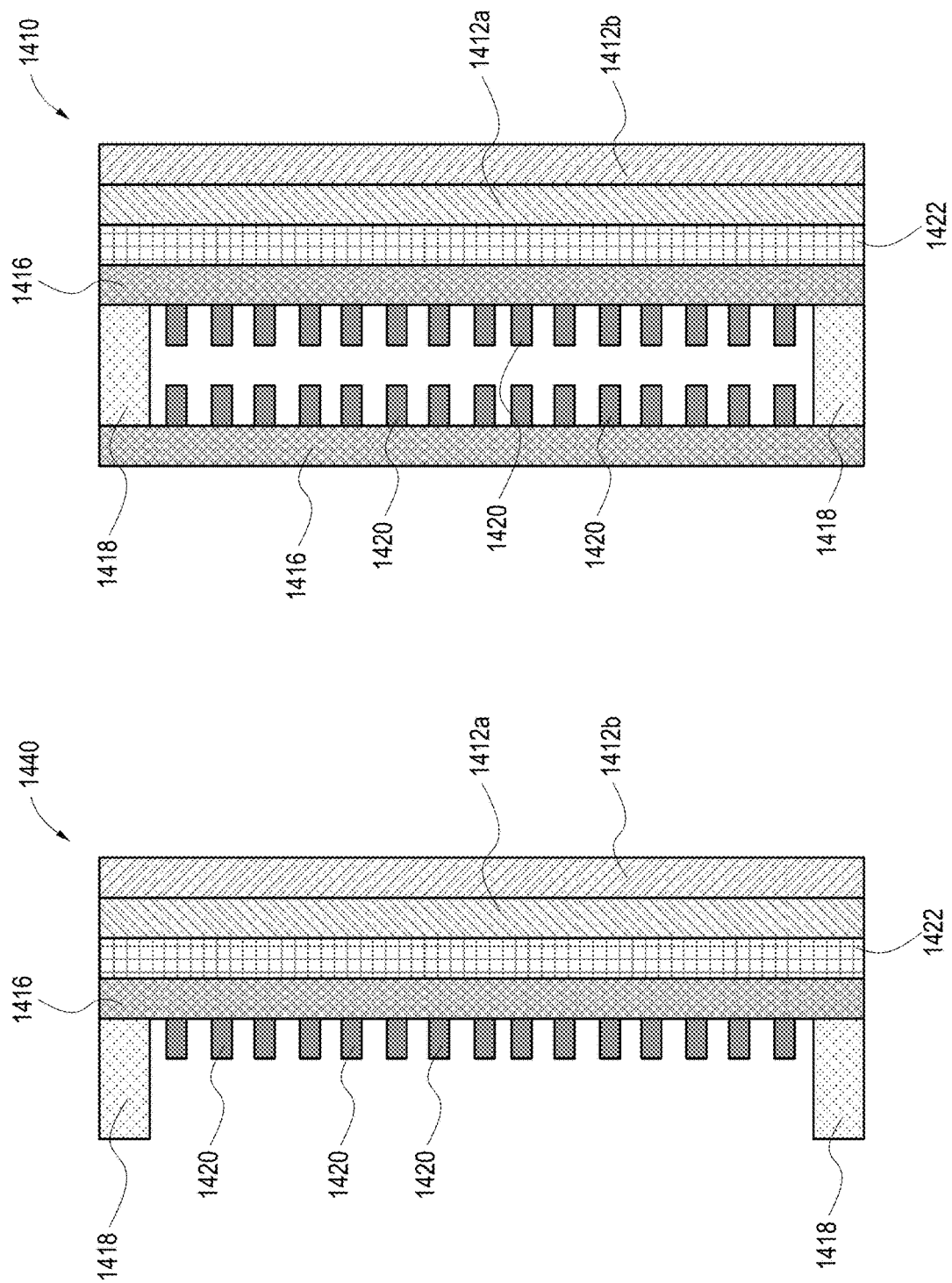

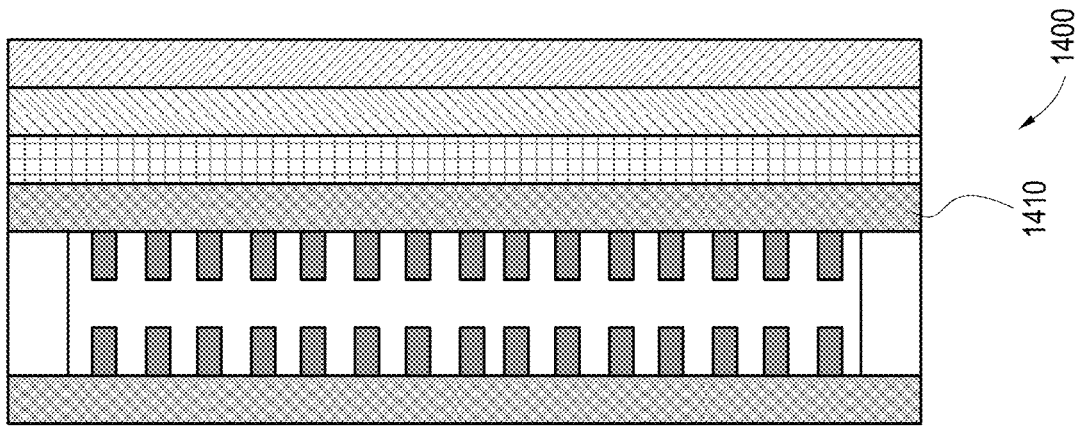
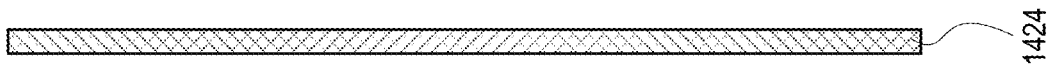
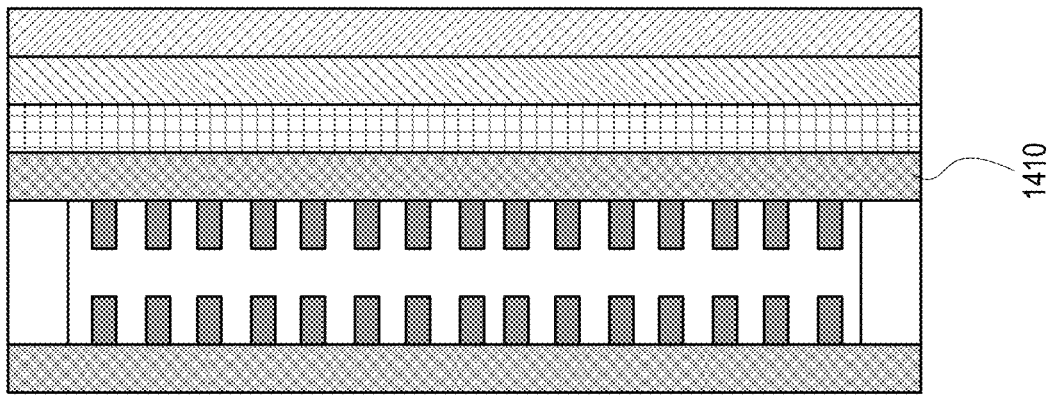
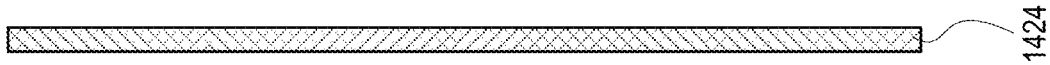
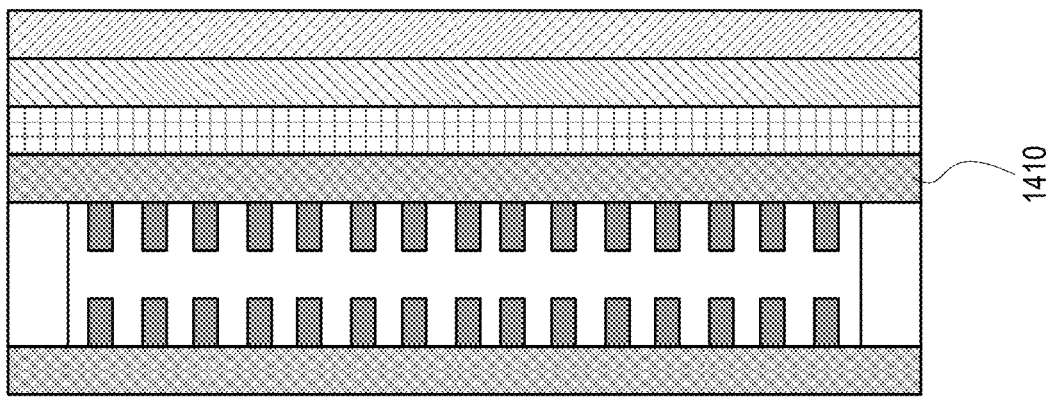
FIG. 17E

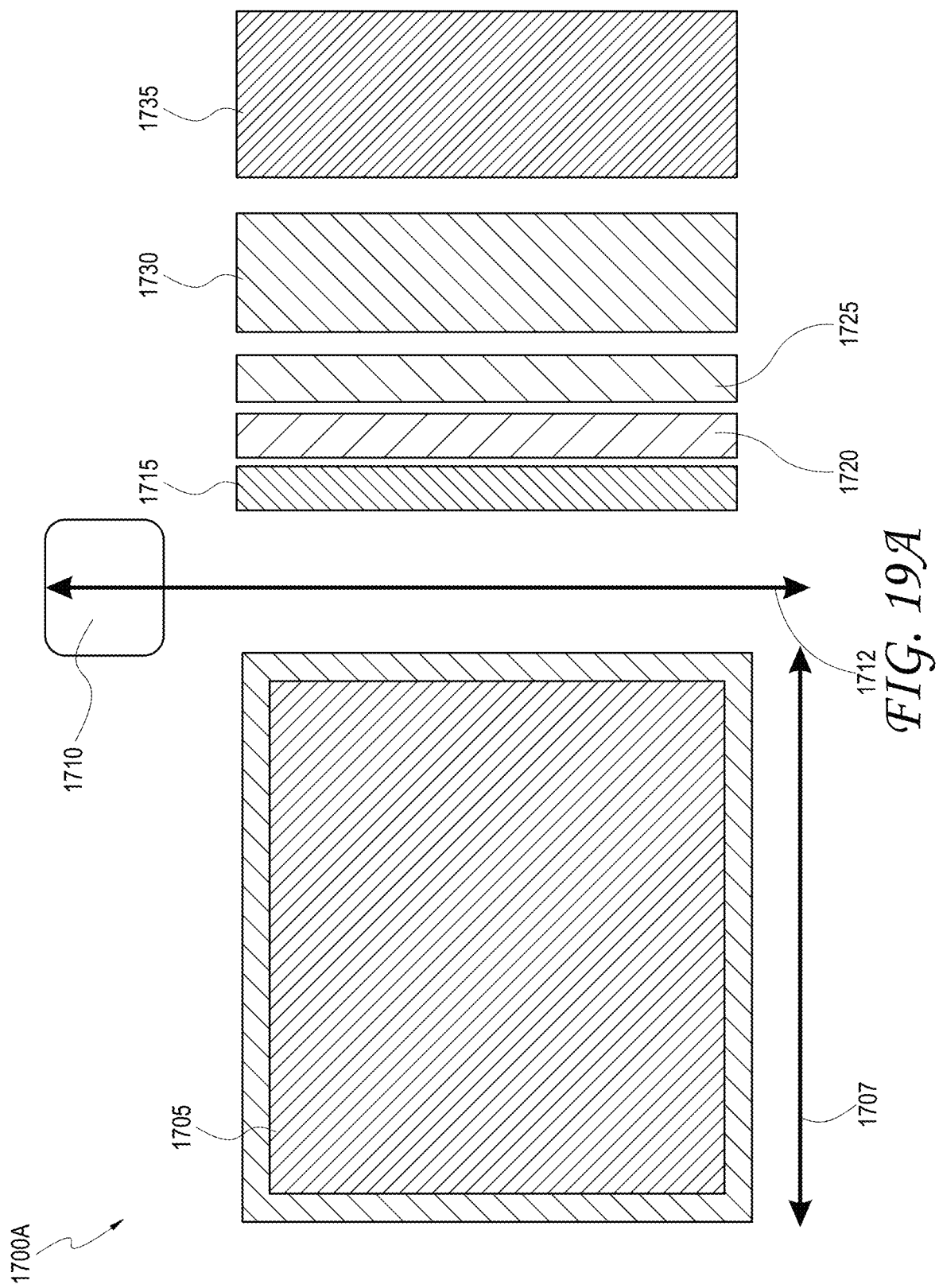

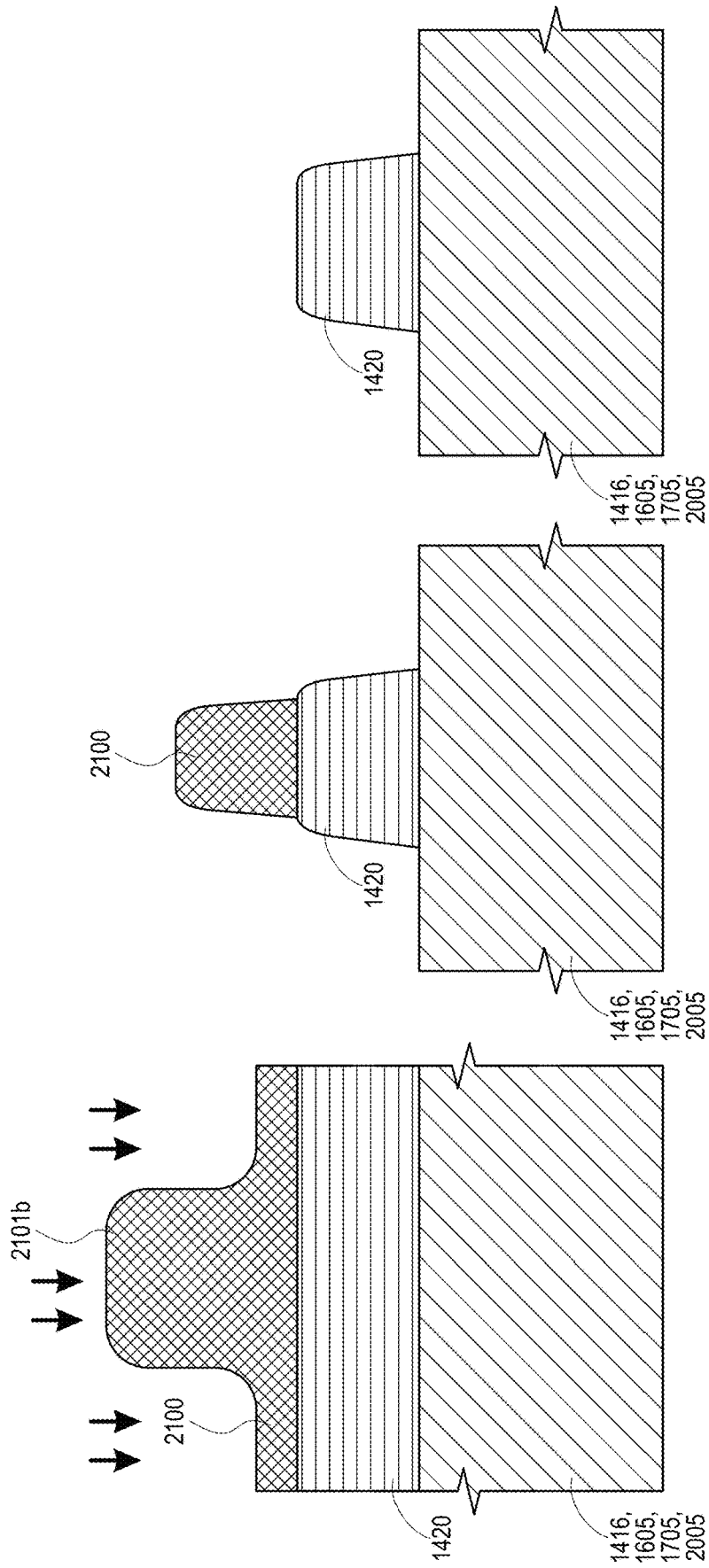

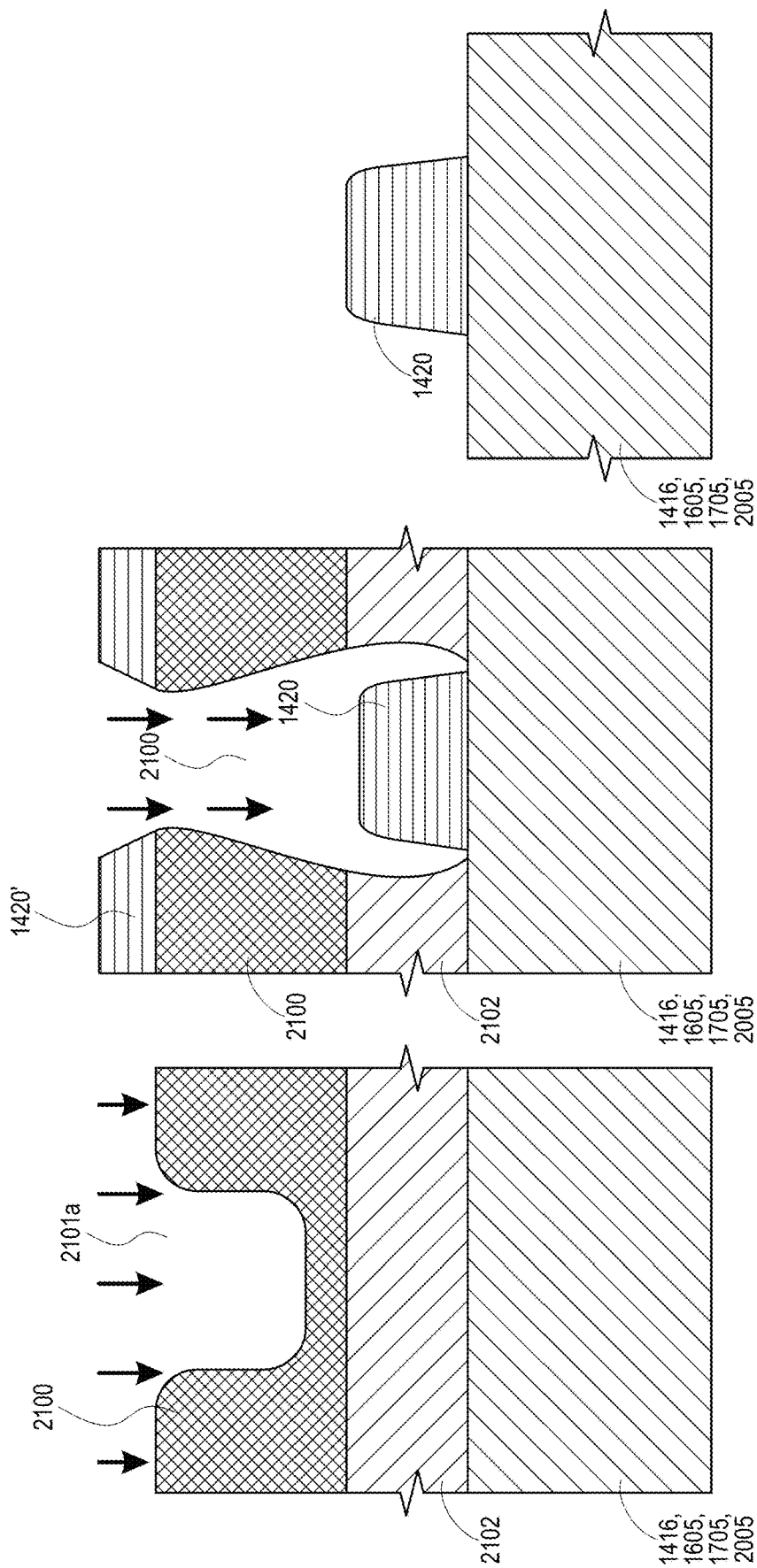

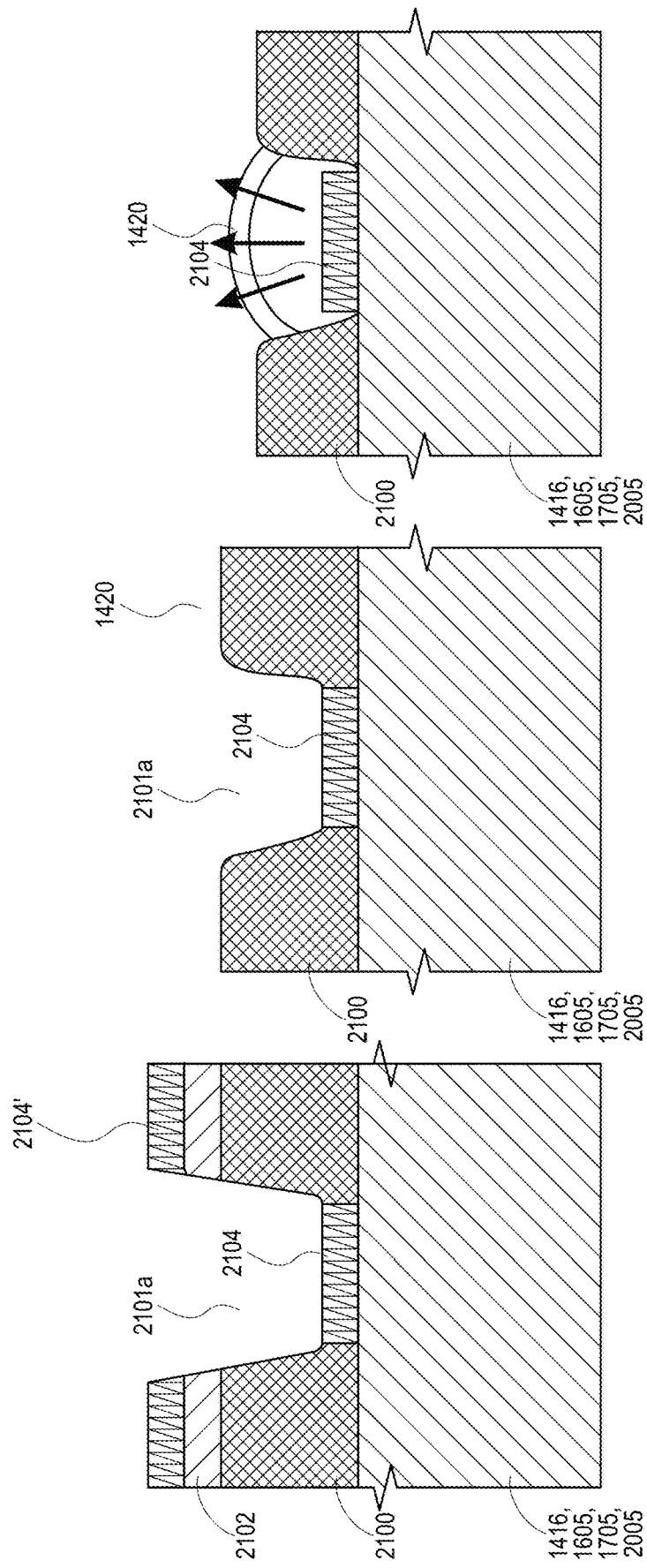

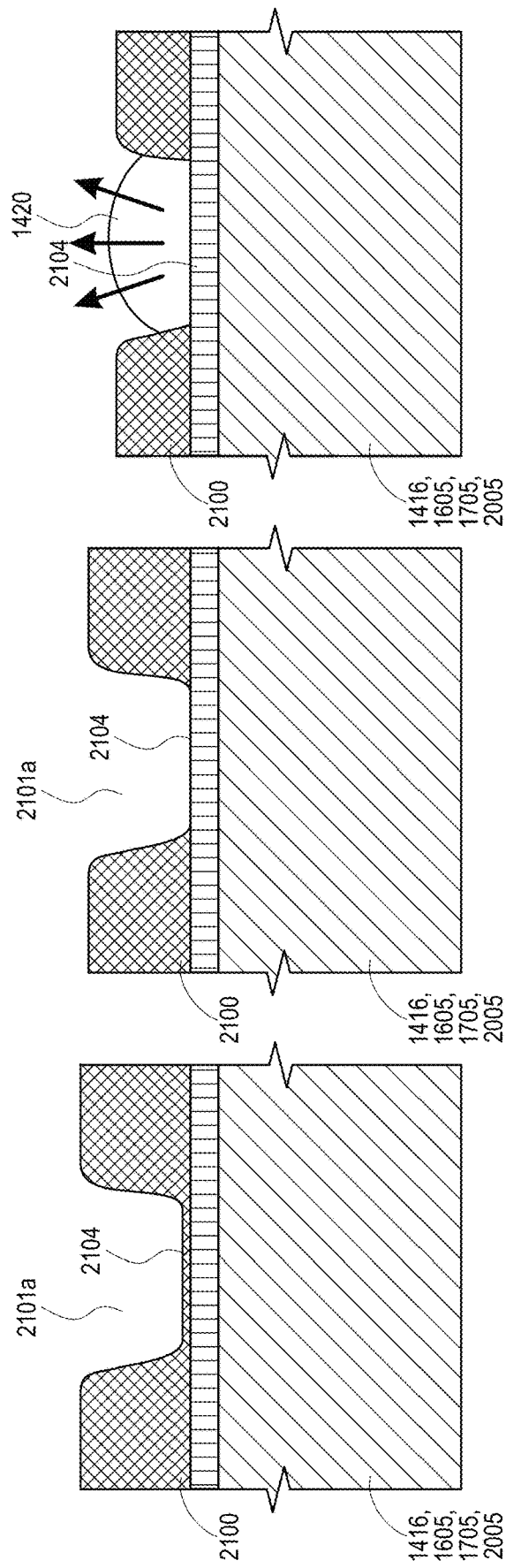

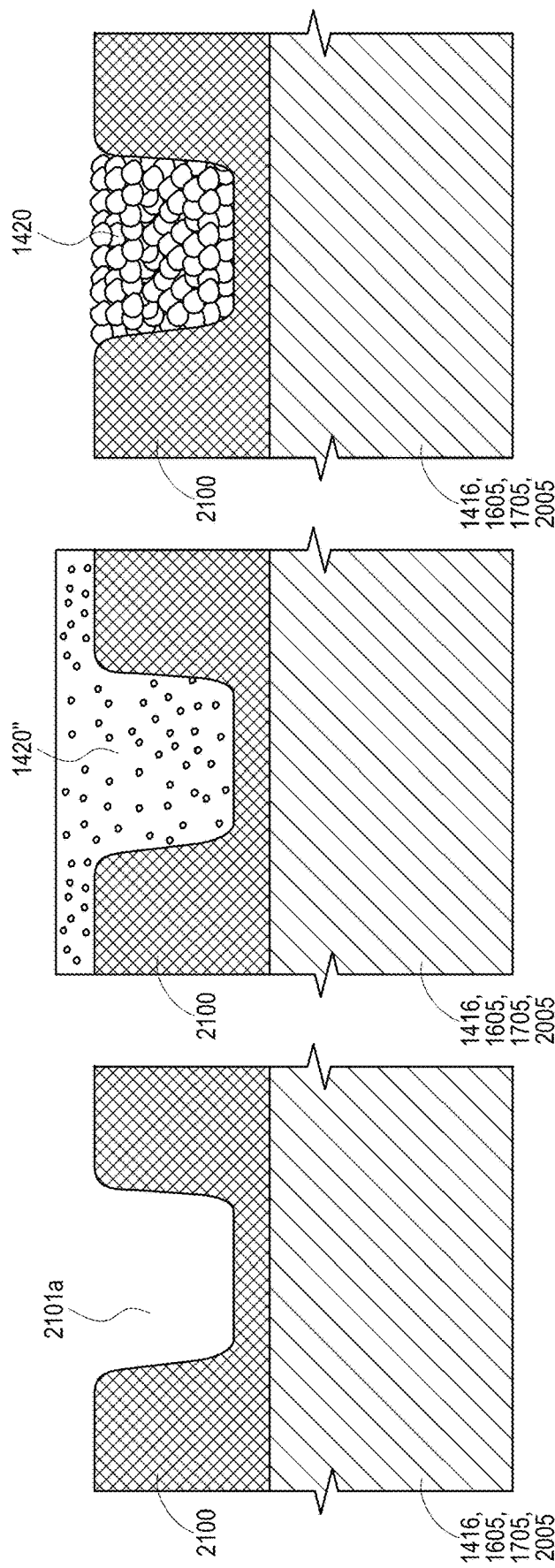

AUGMENTED REALITY DISPLAY HAVING LIQUID CRYSTAL VARIABLE FOCUS ELEMENT AND ROLL-TO-ROLL METHOD AND APPARATUS FOR FORMING THE SAME

PRIORITY CLAIM

This application is a division of U.S. application Ser. No. 16/171,111, filed Oct. 25, 2018, entitled "AUGMENTED REALITY DISPLAY HAVING LIQUID CRYSTAL VARIABLE FOCUS ELEMENT AND ROLL-TO-ROLL METHOD AND APPARATUS FOR FORMING THE SAME," which claims the benefit of priority of U.S. Provisional Application No. 62/577,678, filed Oct. 26, 2017, entitled "AUGMENTED REALITY DISPLAY HAVING LIQUID CRYSTAL VARIABLE FOCUS ELEMENT AND ROLL-TO-ROLL METHOD AND APPARATUS FOR FORMING THE SAME," both of which are incorporated herein by reference in their entirety.

INCORPORATION BY REFERENCE

This application incorporates by reference the entirety of each of the following patent applications: U.S. application Ser. No. 14/555,585 filed on Nov. 27, 2014, published on Jul. 23, 2015 as U.S. Publication No. 2015/0205126; U.S. application Ser. No. 14/690,401 filed on Apr. 18, 2015, published on Oct. 22, 2015 as U.S. Publication No. 2015/0302652; U.S. application Ser. No. 14/212,961 filed on Mar. 14, 2014, now U.S. Pat. No. 9,417,452 issued on Aug. 16, 2016; U.S. application Ser. No. 14/331,218 filed on Jul. 14, 2014, published on Oct. 29, 2015 as U.S. Publication No. 2015/0309263; U.S. patent application Ser. No. 15/683,706, filed Aug. 22, 2017; U.S. Provisional Patent Application No. 62/424,341, filed Nov. 18, 2016; U.S. Provisional Patent Application No. 62/518,539, filed Jun. 12, 2017; and U.S. patent Ser. No. 15/990,155, filed on May 25, 2018.

BACKGROUND

Field

The present disclosure relates to display systems and, more particularly, to augmented reality display systems.

Description of the Related Art

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. A mixed reality, or "MR", scenario is a type of AR scenario and typically involves virtual objects that are integrated into, and responsive to, the natural world. For example, in an MR scenario, AR image content may be blocked by or otherwise be perceived as interacting with objects in the real world.

Referring to FIG. 1, an augmented reality scene 10 is depicted wherein a user of an AR technology sees a real-world park-like setting 20 featuring people, trees, buildings in the background, and a concrete platform 30. In addition to these items, the user of the AR technology also perceives that he "sees" "virtual content" such as a robot statue 40 standing upon the real-world platform 30, and a cartoon-like avatar character 50 flying by which seems to be a personification of a bumble bee, even though these elements 40, 50 do not exist in the real world. Because the human visual perception system is complex, it is challenging to produce an AR technology that facilitates a comfortable, natural-feeling, rich presentation of virtual image elements amongst other virtual or real-world imagery elements.

Systems and methods disclosed herein address various challenges related to AR and VR technology.

SUMMARY

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

In a first embodiment, a display device is described. The display device comprises a waveguide assembly comprising a waveguide configured to output light to display an image, and an adaptive lens assembly having a major surface facing a major surface of the waveguide. The adaptive lens assembly comprises a waveplate lens and a switchable waveplate assembly. The switchable waveplate assembly comprises a first non-liquid crystal quarter-wave plate and a second non-liquid crystal quarter-wave plate defining a volume therebetween, and a liquid crystal layer disposed in the volume between the first quarter-wave plate and the second quarter-wave plate, wherein liquid crystal molecules of the liquid crystal layer have selectively switchable orientations.

The switchable waveplate assembly may further comprise an electrode pattern disposed in the volume between the first quarter-wave plate and the second quarter-wave plate, the electrode pattern comprising a conductive material configured to selectively establish an electric field to change the orientations of the liquid crystal molecules. The electrode pattern may be disposed on the first quarter-wave plate and another electrode pattern may be disposed in the volume on the second quarter-wave plate. The waveplate lens may comprise a liquid crystal polymer layer. The adaptive lens assembly may further comprise an alignment layer disposed between the waveplate lens and the first quarter-wave plate, wherein the alignment layer at least partially determines orientations of liquid crystal molecules in the liquid crystal polymer layer. The waveplate lens may comprise an other liquid crystal polymer layer on the liquid crystal polymer layer. The volume between the first quarter-wave plate and the second quarter-wave plate may further be defined by a cell wall extending between the first quarter-wave plate and the second quarter-wave plate, wherein the cell wall comprises an inkjet printable material. The waveplate lens and the switchable waveplate assembly may constitute an adaptive lens assembly, wherein the adaptive lens assembly comprises a plurality of adaptive lens subassemblies, each adaptive lens subassembly comprising a waveplate lens and a switchable waveplate assembly. The display device may further comprise an other adaptive lens assembly on the opposite side of the waveguide assembly from the adaptive lens assembly, wherein the other adaptive lens assembly comprises an associated waveplate lens and an associated switchable waveplate assembly.

In another embodiment, an adaptive lens assembly is described. The adaptive lens assembly comprises a waveplate lens and a switchable waveplate assembly. The switchable waveplate assembly comprises a first non-liquid crystal quarter-wave plate and a second non-liquid crystal quarter-wave plate defining a volume therebetween, and a liquid crystal layer disposed in the volume between the first quarter-wave plate and the second quarter-wave plate, wherein liquid crystal molecules of the liquid crystal layer have selectively switchable orientations.

The switchable waveplate assembly may further comprise an electrode pattern disposed in the volume between the first quarter-wave plate and the second quarter-wave plate, the electrode pattern comprising a conductive material configured to selectively establish an electric field to change the orientations of the liquid crystal molecules. The electrode pattern may be disposed on the first quarter-wave plate and an other electrode pattern may be disposed in the volume on the second quarter-wave plate. The waveplate lens may comprise a liquid crystal polymer layer. The adaptive lens assembly may further comprise an alignment layer disposed between the waveplate lens and the first quarter-wave plate, wherein the alignment layer at least partially determines orientations of liquid crystal molecules in the liquid crystal polymer layer. The waveplate lens may comprise an other liquid crystal polymer layer on the liquid crystal polymer layer. The volume between the first quarter-wave plate and the second quarter-wave plate may be further defined by a cell wall extending between the first quarter-wave plate and the second quarter-wave plate, wherein the cell wall comprises an inkjet printable material. The waveplate lens and the switchable waveplate assembly may constitute an adaptive lens subassembly, wherein the adaptive lens assembly comprises a plurality of adaptive lens subassembly, each adaptive lens subassembly comprising a waveplate lens and a switchable waveplate assembly.

In another example, a display device is described. The display device comprises a waveguide assembly comprising a waveguide configured to output light to display an image, and an adaptive lens assembly having a major surface facing a major surface of the waveguide. The adaptive lens assembly comprises a waveplate lens and a switchable waveplate assembly. The switchable waveplate assembly comprises a first substrate and a second substrate defining a volume therebetween, a liquid crystal layer disposed within the volume, a first set of guides for aligning liquid crystal molecules of the liquid crystal layer, the first set of guides comprising a first electrode pattern disposed in the volume and on the first substrate, and a second set of guides for aligning liquid crystal molecules of the liquid crystal layer, the second set of guides comprising a second electrode pattern disposed in the volume and on the first substrate. The first electrode pattern and the second electrode pattern are configured to establish an electric field for selectively changing orientations of liquid crystal molecules of the liquid crystal layer.

At least one of the first electrode pattern and the second electrode pattern may comprise an array of parallel conductors. At least one of the first electrode pattern and the second electrode pattern may comprise a wire mesh. The first substrate and the second substrate may each comprise quarter-wave plates. The waveplate lens and the switchable waveplate assembly may constitute an adaptive lens subassembly, wherein the adaptive lens assembly comprises a plurality of adaptive lens subassemblies, each adaptive lens subassembly comprising a waveplate lens and a switchable waveplate assembly. The display device may further comprise an other adaptive lens assembly on the opposite side of the waveguide assembly from the adaptive lens assembly, wherein the other adaptive lens assembly comprises an associated waveplate lens and an associated switchable waveplate assembly.

In another embodiment, an adaptive lens assembly is described. The adaptive lens assembly comprises a waveplate lens and a switchable waveplate assembly. The switchable waveplate assembly comprises a first substrate and a second substrate defining a volume therebetween, a liquid crystal layer disposed within the volume, a first set of guides for aligning liquid crystal molecules of the liquid crystal layer, the first set of guides comprising a first electrode pattern disposed in the volume and on the first substrate, and a second set of guides for aligning liquid crystal molecules of the liquid crystal layer, the second set of guides comprising a second electrode pattern disposed in the volume and on the first substrate. The first electrode pattern and the second electrode pattern are configured to establish an electric field for selectively changing orientations of liquid crystal molecules of the liquid crystal layer.

At least one of the first electrode pattern and the second electrode pattern may comprise an array of parallel conductors. At least one of the first electrode pattern and the second electrode pattern may comprise a wire mesh. The first substrate and the second substrate may each comprise quarter-wave plates. The waveplate lens may comprise a liquid crystal polymer layer. The adaptive lens assembly may further comprise an alignment layer disposed between the waveplate lens and the first quarter-wave plate, wherein the alignment layer at least partially determines orientations of liquid crystal molecules in the liquid crystal polymer layer. The waveplate lens may comprise an other liquid crystal polymer layer on the liquid crystal polymer layer. The waveplate lens and the switchable waveplate assembly may constitute an adaptive lens subassembly, wherein the adaptive lens assembly comprises a plurality of adaptive lens subassemblies, each adaptive lens subassembly comprising a waveplate lens and a switchable waveplate assembly.

In another embodiment, a roll-to-roll apparatus for manufacturing liquid crystal lenses is described. The apparatus comprises a supply substrate roller for providing a roll of substrate for processing, a lens substrate roller for receiving processed substrate having lens structures thereon, a substrate path defining a path of unrolled substrate from the supply substrate roller to the lens substrate roller, an alignment structure applicator in the substrate path and configured to form an alignment structure, for guiding an orientation of liquid crystal molecules, on a first side of the substrate, and a first lens layer applicator in the substrate path and comprising a slot die configured to apply a first liquid crystal layer to the first side of the supply substrate, and a first curing station configured to cure the first liquid crystal layer.

The first curing station may comprise an ultraviolet (UV) light source, the UV light source configured to polymerize liquid crystal molecules of the first liquid crystal layer. The first curing station may comprise a heat source configured to heat the first liquid crystal layer. The roll-to-roll apparatus may further comprise a second lens layer applicator comprising a slot die configured to apply a second liquid crystal layer on the cured first lens layer, and a second curing station configured to cure the second liquid crystal layer. The second curing station may comprise an ultraviolet (UV) light source, the UV light source configured to polymerize liquid crystal molecules of the second liquid crystal layer. The second curing station may comprise a heat source configured to heat the second liquid crystal layer. The alignment structure applicator may comprise a slot die configured to apply an alignment layer resist material to the first side of the supply substrate, a curing station configured to cure the alignment layer resist material to form a solid alignment layer, and an optical aligner configured to optically pattern one or more alignment structures within the solid alignment layer. The alignment structure applicator may comprise an inkjet printer configured to print a liquid resist material onto the first side of the supply substrate, a roll template configured to imprint the liquid resist material to form a liquid crystal alignment structure, and an energy source configured to cure the liquid resist material, while the liquid resist material is in contact with the conformal roll template, to form a solid resist comprising a pattern of alignment structures on the first side of the supply substrate.

In another embodiment, a roll-to-roll apparatus for manufacturing liquid crystal lenses is described. The apparatus comprises a supply substrate roller for providing a roll of substrate for processing, an intermediate substrate roller for receiving processed substrate having alignment structures thereon, a substrate path defining a path of unrolled substrate from the supply substrate roller to the intermediate substrate roller, a deposition device configured to deposit an imprint resist, a continuous template loop configured to travel along a closed template path defined by a plurality of rollers (wherein an imprinting portion of the template path coincides with a portion of the substrate path), and an energy source configured to cure the alignment structure to form a solid alignment layer.

The energy source may comprise an ultraviolet (UV) light source. The deposition device may comprise a slot die upstream of the energy source and configured to apply the imprint resist to the first side of the supply substrate, and the template loop may be configured to imprint the imprint resist along the imprinting portion of the roll template path. The deposition device may comprise an inkjet printer upstream of the energy source and configured to print an imprint resist, the template configured to imprint the imprint resist along the imprinting portion of the template path. The inkjet printer may be configured to deposit the imprint resist onto the template.

In another example, a method for manufacturing a liquid crystal lens is described. The method comprises unrolling a supply roll of a substrate at a supply substrate roller, processing unrolled substrate extending between the supply substrate roller and a lens substrate roller, and subsequently rerolling the unrolled substrate at the lens substrate roller, wherein processing the unrolled substrate comprises forming an alignment layer on a first side of the unrolled substrate, depositing a first liquid crystal layer over the alignment structure, and curing the first liquid crystal layer to form a first lens layer.

Depositing the first liquid crystal layer may comprise applying liquid crystal on the alignment structure using a slot die. Curing the first liquid crystal layer may comprise irradiating the first liquid crystal layer with ultraviolet (UV) light. Curing the first liquid crystal layer may comprise heating the first liquid crystal layer in an oven. Forming the alignment layer may comprise depositing a selectively definable material to the first side of the substrate, and patterning the deposited selectively definable material. Patterning the selectively definable material may comprise exposing the selectively definable material to light to form a holographic recording. The selectively definable material may be a resist, wherein patterning the selectively definable material comprises imprinting the resist using a conformal roll template, and curing the liquid resist material while the liquid resist material is in contact with the conformal roll template, to form solid alignment structures on the first side of the supply substrate. The method may further comprise applying a second liquid crystal layer over the first lens layer and curing the second liquid crystal layer to form a solid second lens layer. The method may further comprise, before unrolling the supply roll, forming an electrode pattern on an underside side of the substrate opposite a side in which the alignment layer is formed. The method may further comprise, after rerolling the unrolled substrate, unrolling the substrate and forming a plurality of liquid crystal cell walls on the underside of the substrate. Forming the plurality of liquid crystal cell walls may comprise an ink-jet deposition. The method may further comprise attaching the substrate to an other substrate to form an open volume defined by the substrate and the other substrate and the liquid crystal cell walls, and filling the open volume with liquid crystal. The substrate may be a quarter-wave plate.

In another embodiment, a method for manufacturing a liquid crystal lens is described. The method comprises unrolling a supply roll of a substrate at a supply substrate roller, wherein the unrolled substrate extends between the supply substrate roller and an intermediate substrate roller; forming alignment features, for guiding an orientation of liquid crystal molecules on the substrate, on the unrolled substrate, wherein forming the alignment features comprises imprinting the alignment features using a closed-loop template having a travel path defined by a plurality of rollers; and subsequently rerolling the unrolled substrate at the intermediate substrate roller.

Forming the alignment features may comprise depositing an imprint resist on the substrate, imprinting the imprint resist using the template, and curing the imprint resist while the template is imprinting the imprint resist, to form solid alignment structures on the supply substrate. The supply roll may comprise an electrode pattern on an underside side of the substrate opposite an upper side in which the alignment layer is to be formed. The method may further comprise, after rerolling the unrolled substrate, unrolling the substrate and forming a plurality of liquid crystal cell walls on the upper side of the substrate. Forming the plurality of liquid crystal cell walls may comprise printing the cell walls by an ink-jet deposition. The method may further comprise attaching the substrate to an other substrate to form an open volume defined by the substrate and the other substrate and the liquid crystal cell walls, and filling the open volume with liquid crystal. The substrate may be a quarter-wave plate.

In another example, a method for manufacturing a liquid crystal lens is described. The method comprises unrolling a roll of an intermediate substrate at an intermediate substrate roller, the intermediate substrate comprising alignment features for liquid crystal molecules, the alignment features on a first side of the intermediate substrate; processing unrolled substrate extending between the intermediate substrate roller and a lens substrate roller, and subsequently rerolling the unrolled substrate at the lens substrate roller. Processing the unrolled substrate comprises depositing a first liquid crystal layer on the alignment features, and curing the first liquid crystal layer to form a first lens layer.

Depositing the first liquid crystal layer may comprise applying liquid crystal material with a slot die. Curing the first liquid crystal layer may comprise irradiating the first liquid crystal layer with ultraviolet (UV) light. Curing the first liquid crystal layer may comprise heating the first liquid crystal layer in an oven. The method may further comprise applying a second liquid crystal layer over the first lens layer, and curing the second liquid crystal layer to form a solid second lens layer. The method may further comprise, after rerolling the unrolled substrate, unrolling the substrate and forming a plurality of liquid crystal cell walls on the substrate. Forming the plurality of liquid crystal cell walls may comprise an ink-jet deposition. The method may further comprise attaching the substrate to an other substrate to form an open volume defined by the substrate, the other substrate, and the liquid crystal cell walls, and filling the open volume with liquid crystal material. The substrate may be a quarter-wave plate comprising the alignment features thereon.

BRIEF DESCRIPTION OF THE DRAWINGS

FIG. 12 illustrates an example of a display device comprising a pair of adaptive lens assemblies each comprising alternatingly stacked waveplate lenses and switchable waveplates.

FIGS. 13A and 13B illustrate an example of a display device comprising a pair of adaptive lens assemblies and a pair of fixed lenses.

FIGS. 17A-17E illustrate an example process for manufacturing an adaptive lens assembly.

FIG. 19A illustrates an example apparatus for sheet manufacturing of a lens substrate with an imprint alignment process for an adaptive lens assembly.

FIGS. 21A-21C illustrate an example of a process for forming a pattern of conductive material by directional etching.

FIGS. 22A-22C illustrate an example of a process for forming a pattern of conductive material using a solvent-soluble layer.

FIGS. 23A-23C illustrate an example of a process for forming a pattern of conductive material using a seed layer.

FIGS. 24A-24C illustrate another example of a process for forming a pattern of conductive material using a seed layer.

FIGS. 25A-25C illustrate an example of a process for forming a pattern of conductive material by deposition of a suspension of metal material into openings in a patterned layer.

DETAILED DESCRIPTION

Figure 1:
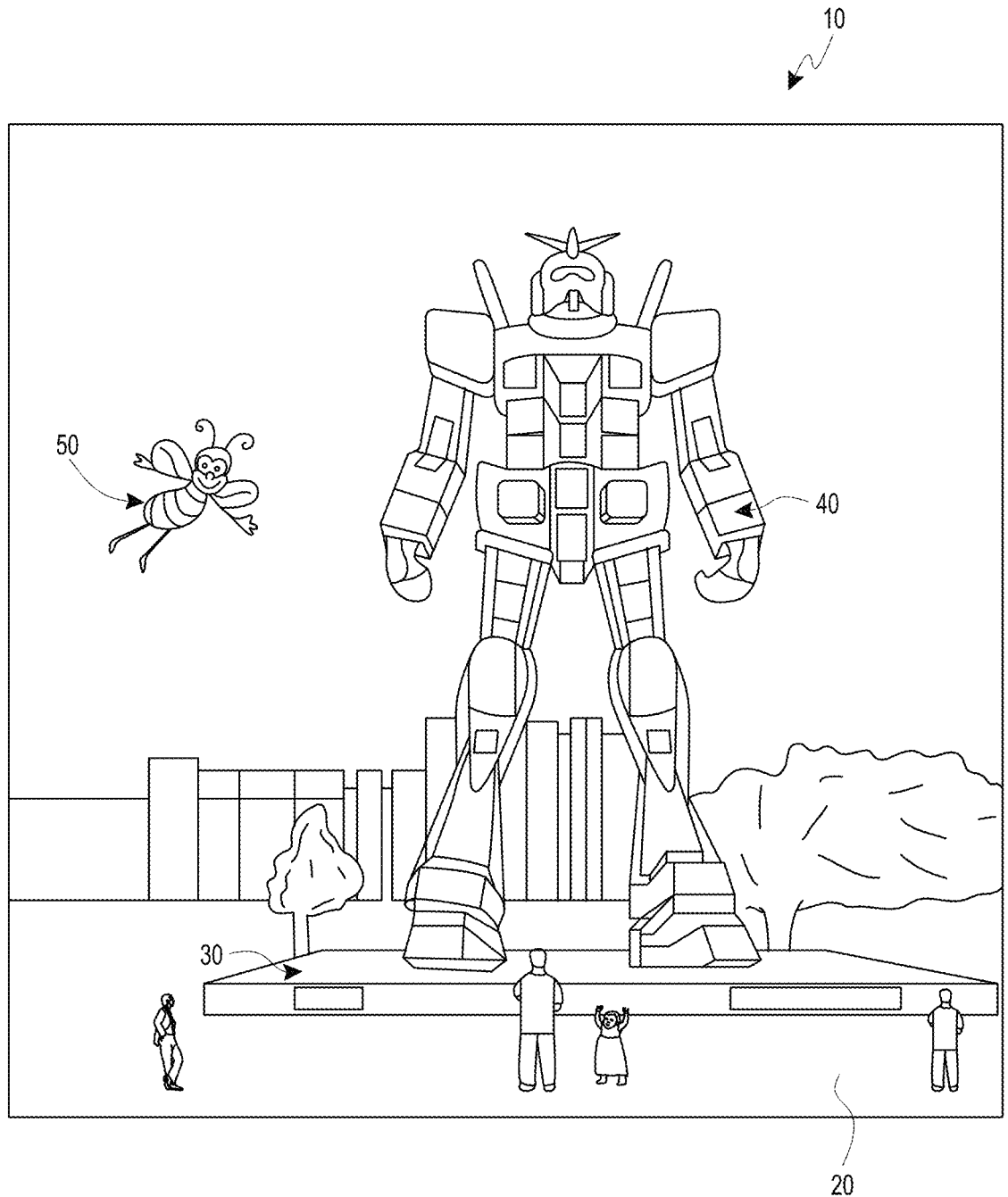
FIG. 1 illustrates a user's view of augmented reality (AR) through an AR device.

AR systems may display virtual content to a user, or viewer, while still allowing the user to see the world around them. Preferably, this content is displayed on a head-mounted display, e.g., as part of eyewear, that projects image information to the user's eyes. In addition, the display may also transmit light from the surrounding environment to the user's eyes, to allow a view of that surrounding environment. As used herein, it will be appreciated that a "head-mounted" or "head mountable" display is a display that may be mounted on the head of a viewer or user.

In some AR systems, a plurality of waveguides may be configured to form virtual images at a plurality of virtual depth planes (also referred to simply a "depth planes" herein). Different waveguides of the plurality of waveguides may have different optical powers, which may provide images that appear to be on different depth planes at different distances from the user's eye. The display systems may also include a plurality lenses that provide optical power or modify the optical power of the waveguides. Undesirably, each of the waveguides and lenses may increase the overall thickness and weight of the display.

Adaptive lens assemblies, which may also be referred to as variable focus lens assemblies, have been proposed in an approach for reducing the thickness and weight of the display. The adaptive lens assemblies provide variable optical power to, e.g., modify the wavefront divergence of light propagating through the lens assembly to provide a plurality of different virtual depth planes. For example, rather than multiple waveguides, a single adaptive lens assembly may be utilized to provide a set of different optical powers and the associated depth planes. Examples of adaptive lens assemblies and related structures are disclosed in U.S. Provisional Patent Application No. 62/424,341, filed Nov. 18, 2016, and U.S. Provisional Patent Application No. 62/518,539, filed Jun. 12, 2017, the entire disclosures of each of which are incorporated herein by reference.

The adaptive lens assemblies may include a stack of adaptive lens subassemblies, each of which may include a waveplate lens and a switchable waveplate assembly, which may include a liquid crystal layer with liquid crystal molecules that are switchable between different states having different orientations. The switchable waveplate assembly may include a pair of substrates for confining the liquid crystal layer, alignment layers for establishing the orientation of the liquid crystal molecules in the liquid crystal layer, and conductive layers for providing electric fields to switch the orientations of the liquid crystal molecules. It will be appreciated that each adaptive lens subassembly may differently impact the wavefront of passing light depending on the state of the switchable waveplate. The optical powers of a plurality of subassemblies may be combined to provide different aggregate optical powers. It has been found, however, that an adaptive lens assembly with a large number of such subassemblies may still be thicker than desired.

Advantageously, in some embodiments, thin adaptive lens assemblies and methods and apparatus for making such assemblies are provided. In some embodiments, the switchable waveplate assembly may include a pair of substrates that are themselves waveplates (e.g., quarter-wave plates), with a switchable waveplate (preferably a liquid crystal layer having liquid crystal molecules with selectively switchable orientations) disposed between them. Preferably, the substrates do not comprise liquid crystals. In some other embodiments, the switchable waveplate assembly may include patterns of electrodes that function as both alignment guides for liquid crystal molecules and as conductive layers that selectively establish an electric field for switching the orientations of the liquid crystal molecules. In some embodiments, the electrode pattern may be disposed on the surface of substrates that also function as waveplates. For example, the electrodes may be disposed on opposing faces of the substrates, and in the same volume between the substrates that is occupied by the liquid crystal layer. It will be appreciated that the electrodes may be freestanding on the surface of the substrates, or may be embedded in a layer of other material.

The advantageously thin switchable waveplate assembly may form an adaptive lens subassembly with a passive waveplate lens that does not include liquid crystal molecules that change orientation with application of the electric field noted above. It will be appreciated the switchable waveplate assembly and the passive waveplate lenses can modify the polarization of light and in turn provide optical power. The passive waveplate lens may be formed of polymerized liquid crystal molecules which have been locked into a particular pattern and/or orientation. The particular pattern and/orientation may provide the desired optical response in only a narrow range of wavelengths of light. In some embodiments, to provide more broadband response over a broader range of wavelengths, a plurality of waveplate lenses may be provided. Each of the waveplate lenses may have a peak response over a different range of wavelengths and, in the aggregate, the waveplate lenses provide a response over a broader range of wavelengths.

As noted herein, a plurality of the subassemblies may be stacked together to form an adaptive lens assembly providing a range of optical powers. In some other embodiments, the adaptive lens assembly may include only a single subassembly.

In some embodiments, the adaptive lens assemblies or portions thereof may be manufactured using a roll-to-roll manufacturing apparatus. A substrate forming part of the volume containing the switchable liquid crystal layer may be used as a substrate on which adjacent layers are formed, and then a pair of substrates may be brought together to form a volume that is subsequently filled with the switchable liquid crystal. The substrates are preferably formed of pliable, mechanically stable optically transmissive materials which can be rolled and unrolled during the manufacturing process. For example, a supply of the substrate may be provided on a first roller and extended to a second roller. The substrate is unrolled at the first roller and then rerolled at the second roller. In between, an alignment layer may be deposited and patterned on the substrate, and one or more liquid crystal layers may be deposited and cured on the alignment layer. Preferably, the substrate supplied on the first roller may include a previously-formed pattern of electrodes on a backside of the substrate.

In some embodiments, making of the alignment layer may be conducted using a first roll-to-roll apparatus in which a substrate roll is unrolled and an imprinted alignment layer (comprising alignment features for liquid crystal molecules) is formed on the substrate, which is rerolled after forming the imprinted alignment layer. Subsequently, a second roll-to-roll manufacturing apparatus uses the substrate with the imprinted alignment layer comprising the alignment features as a starting material, deposits liquid crystal layers on that substrate, and subsequently re-rolls the substrate with the deposited liquid crystal layers.

In some embodiments, after the roll-to-roll processing, a processed substrate sheet with electrodes on one side and deposited layers on the opposite side of the sheet may be joined with another substrate sheet with electrodes on the surface of that other sheet. Before joining the substrate sheets together, walls to laterally confine the later liquid crystal fill may be formed on one or both sheets. The walls may be in a desired shape for a display eyepiece. The sheets may then be joined together, with the electrodes facing one another, to form an open volume. The open volume is subsequently filled with liquid crystal and then the sheets may be cut to form individual display eyepieces. In some other embodiments, liquid crystal may be provided in a volume defined by the walls and the underlying substrate, and then an overlying substrate may be adhered to the walls to form a closed volume.

Advantageously, in some embodiments the adaptive lens assemblies described herein may be thin and/or lightweight structures. For example, an adaptive lens assembly having three adaptive lens subassemblies may have a relatively small thickness (e.g., less than 2 mm in some embodiments). By having quarter-wave plates serve both as optical elements within the adaptive lens subassemblies and as supportive substrates, no additional support substrate may be necessary. Moreover, a mesh or array of wires on the surfaces of the quarter-wave plates proximate the liquid crystal layer may be arranged to serve as both an electrical potential source and an alignment structure to guide the alignment of liquid crystal molecules in the liquid crystal layer. In addition, the disclosed roll-to-roll manufacturing apparatus and methods allow for efficient, high-throughput manufacturing of the adaptive lens assemblies.

Reference will now be made to the drawings, in which like reference numerals refer to like parts throughout. Unless indicated otherwise, the drawings are schematic not necessarily drawn to scale.

Figure 2:
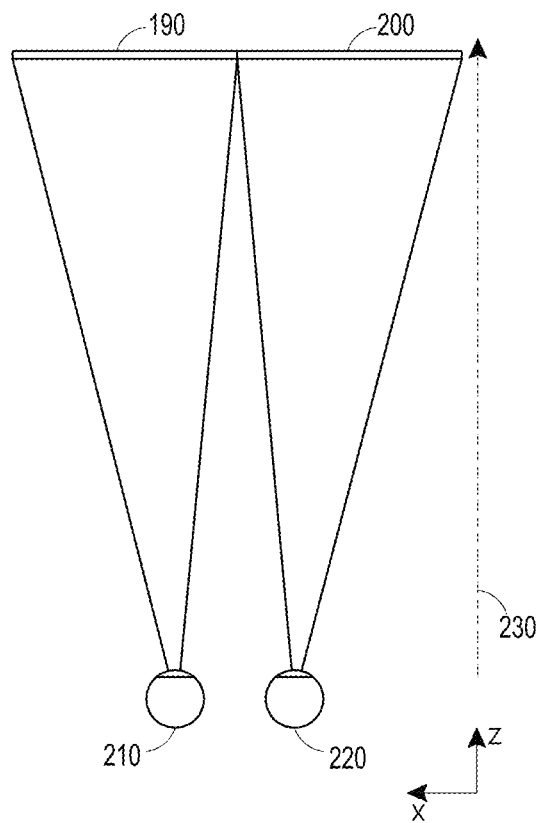
FIG. 2 illustrates a conventional display system for simulating three-dimensional imagery for a user.

FIG. 2 illustrates a conventional display system for simulating three-dimensional imagery for a user. It will be appreciated that a user's eyes are spaced apart and that, when looking at a real object in space, each eye will have a slightly different view of the object and may form an image of the object at different locations on the retina of each eye. This may be referred to as binocular disparity and may be utilized by the human visual system to provide a perception of depth. Conventional display systems simulate binocular disparity by presenting two distinct images 190, 200 with slightly different views of the same virtual object—one for each eye 210, 220—corresponding to the views of the virtual object that would be seen by each eye were the virtual object a real object at a desired depth. These images provide binocular cues that the user's visual system may interpret to derive a perception of depth.

With continued reference to FIG. 2, the images 190, 200 are spaced from the eyes 210, 220 by a distance 230 on a z-axis. The z-axis is parallel to the optical axis of the viewer with their eyes fixated on an object at optical infinity directly ahead of the viewer. The images 190, 200 are flat and at a fixed distance from the eyes 210, 220. Based on the slightly different views of a virtual object in the images presented to the eyes 210, 220, respectively, the eyes may naturally rotate such that an image of the object falls on corresponding points on the retinas of each of the eyes, to maintain single binocular vision. This rotation may cause the lines of sight of each of the eyes 210, 220 to converge onto a point in space at which the virtual object is perceived to be present. As a result, providing three-dimensional imagery conventionally involves providing binocular cues that may manipulate the vergence of the user's eyes 210, 220, and that the human visual system interprets to provide a perception of depth.

Figure 3A:
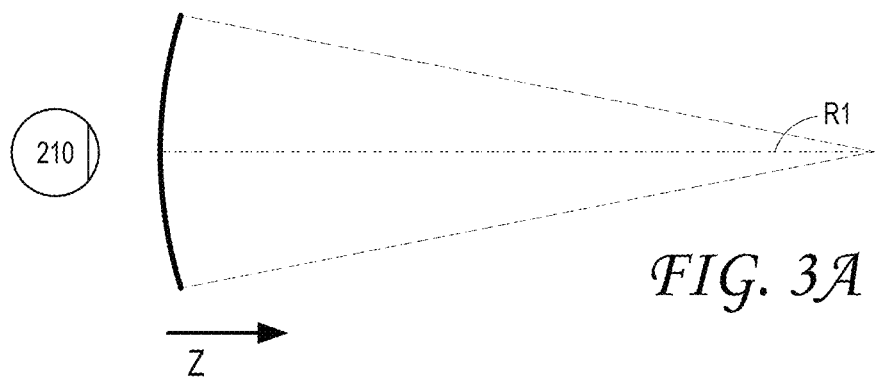
FIGS. 3A-3C illustrate relationships between radius of curvature and focal radius.
Figure 3B:
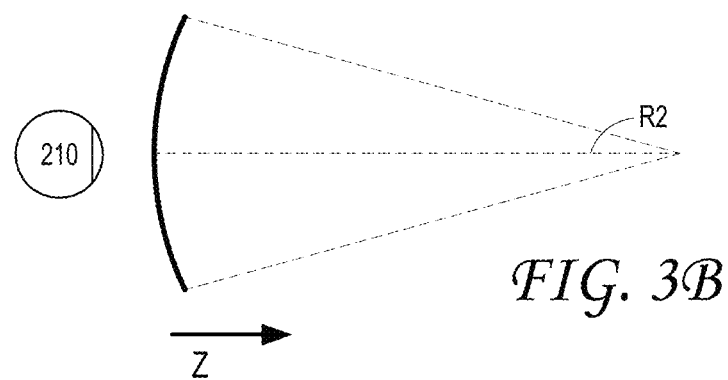
Figure 3C:
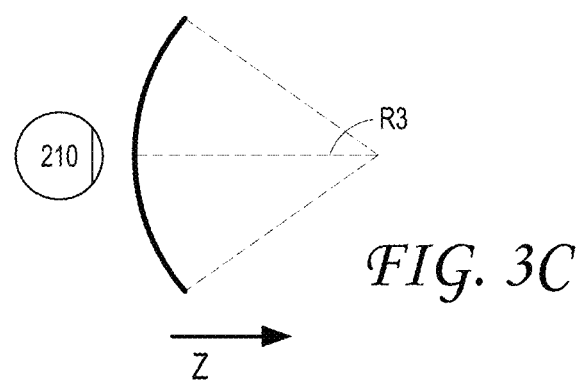

Generating a realistic and comfortable perception of depth is challenging, however. It will be appreciated that light from objects at different distances from the eyes have wavefronts with different amounts of divergence. FIGS. 3A-3C illustrate relationships between distance and the divergence of light rays. The distance between the object and the eye 210 is represented by, in order of decreasing distance, R1, R2, and R3. As shown in FIGS. 3A-3C, the light rays become more divergent as distance to the object decreases. Conversely, as distance increases, the light rays become more collimated. Stated another way, it may be said that the light field produced by a point (the object or a part of the object) has a spherical wavefront curvature, which is a function of how far away the point is from the eye of the user. The curvature increases with decreasing distance between the object and the eye 210. While only a single eye 210 is illustrated for clarity of illustration in FIGS. 3A-3C and other figures herein, the discussions regarding eye 210 may be applied to both eyes 210 and 220 of a viewer.

With continued reference to FIGS. 3A-3C, light from an object that the viewer's eyes are fixated on may have different degrees of wavefront divergence. Due to the different amounts of wavefront divergence, the light may be focused differently by the lens of the eye, which in turn may require the lens to assume different shapes to form a focused image on the retina of the eye. Where a focused image is not formed on the retina, the resulting retinal blur acts as a cue to accommodation that causes a change in the shape of the lens of the eye until a focused image is formed on the retina. For example, the cue to accommodation may trigger the ciliary muscles surrounding the lens of the eye to relax or contract, thereby modulating the force applied to the suspensory ligaments holding the lens, thus causing the shape of the lens of the eye to change until retinal blur of an object of fixation is eliminated or minimized, thereby forming a focused image of the object of fixation on the retina (e.g., fovea) of the eye. The process by which the lens of the eye changes shape may be referred to as accommodation, and the shape of the lens of the eye required to form a focused image of the object of fixation on the retina (e.g., fovea) of the eye may be referred to as an accommodative state.

Figure 4A:
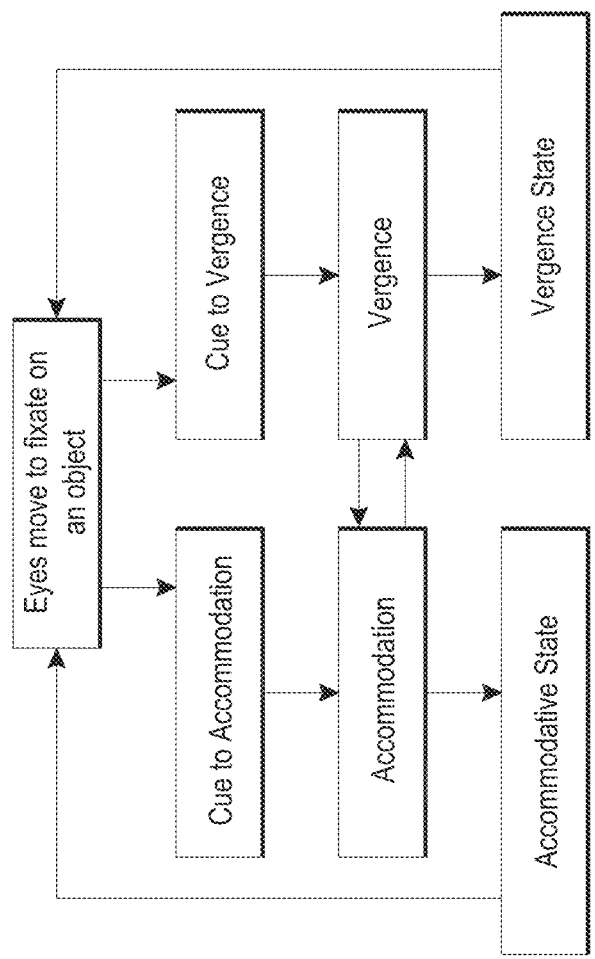
FIG. 4A illustrates a representation of the accommodation-vergence response of the human visual system.

With reference now to FIG. 4A, a representation of the accommodation-vergence response of the human visual system is illustrated. The movement of the eyes to fixate on an object causes the eyes to receive light from the object, with the light forming an image on each of the retinas of the eyes. The presence of retinal blur in the image formed on the retina may provide a cue to accommodation, and the relative locations of the image on the retinas may provide a cue to vergence. The cue to accommodation causes accommodation to occur, resulting in the lenses of the eyes each assuming a particular accommodative state that forms a focused image of the object on the retina (e.g., fovea) of the eye. On the other hand, the cue to vergence causes vergence movements (rotation of the eyes) to occur such that the images formed on each retina of each eye are at corresponding retinal points that maintain single binocular vision. In these positions, the eyes may be said to have assumed a particular vergence state. With continued reference to FIG. 4A, accommodation may be understood to be the process by which the eye achieves a particular accommodative state, and vergence may be understood to be the process by which the eye achieves a particular vergence state. As indicated in FIG. 4A, the accommodative and vergence states of the eyes may change if the user fixates on another object. For example, the accommodated state may change if the user fixates on a new object at a different depth on the z-axis.

Without being limited by theory, it is believed that viewers of an object may perceive the object as being "three-dimensional" due to a combination of vergence and accommodation. As noted above, vergence movements (e.g., rotation of the eyes so that the pupils move toward or away from each other to converge the lines of sight of the eyes to fixate upon an object) of the two eyes relative to each other are closely associated with accommodation of the lenses of the eyes. Under normal conditions, changing the shapes of the lenses of the eyes to change focus from one object to another object at a different distance will automatically cause a matching change in vergence to the same distance, under a relationship known as the "accommodation-vergence reflex." Likewise, a change in vergence will trigger a matching change in lens shape under normal conditions.

Figure 4B:
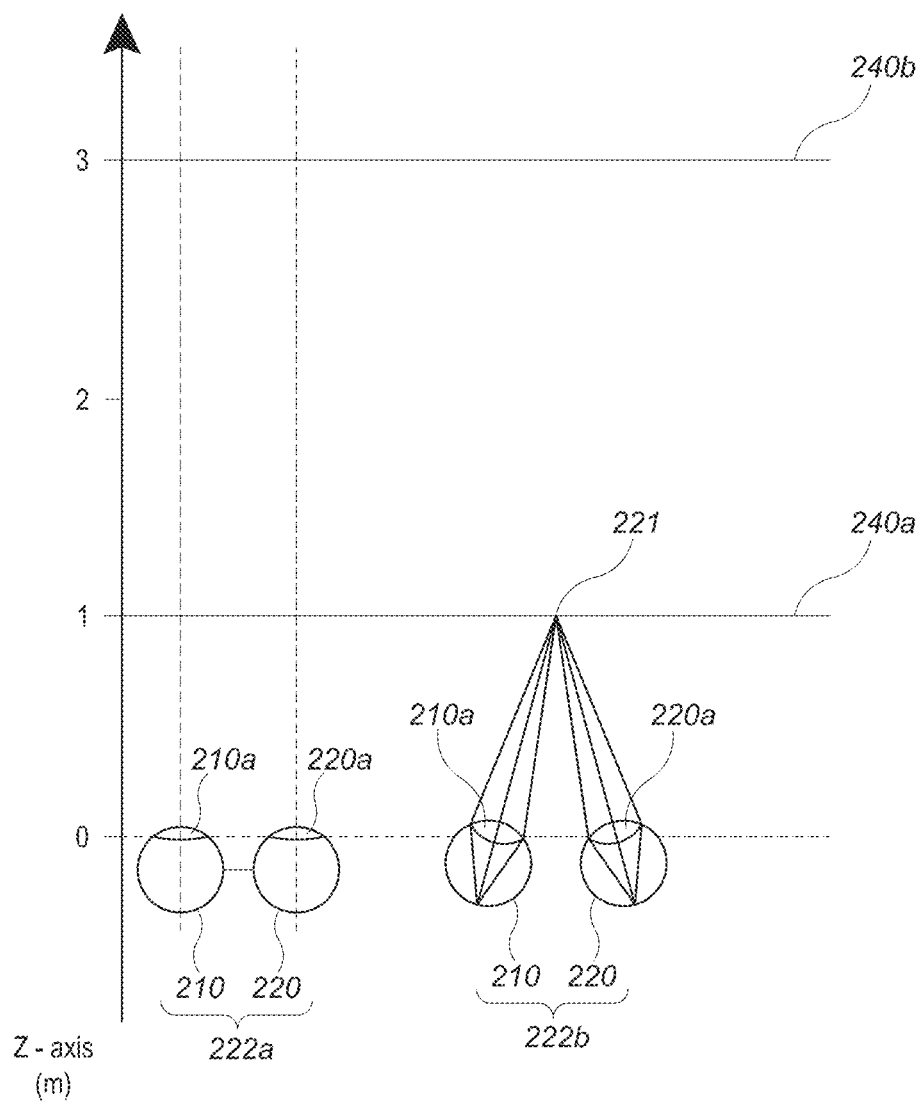
FIG. 4B illustrates examples of different accommodative states and vergence states of a pair of eyes of the user.

With reference now to FIG. 4B, examples of different accommodative and vergence states of the eyes are illustrated. The pair of eyes 222a is fixated on an object at optical infinity, while the pair eyes 222b are fixated on an object 221 at less than optical infinity. Notably, the vergence states of each pair of eyes is different, with the pair of eyes 222a directed straight ahead, while the pair of eyes 222 converge on the object 221. The accommodative states of the eyes forming each pair of eyes 222a and 222b are also different, as represented by the different shapes of the lenses 210a, 220a.

Undesirably, many users of conventional "3-D" display systems find such conventional systems to be uncomfortable or may not perceive a sense of depth at all due to a mismatch between accommodative and vergence states in these displays. As noted above, many stereoscopic or "3-D" display systems display a scene by providing slightly different images to each eye. Such systems are uncomfortable for many viewers, since they, among other things, simply provide different presentations of a scene and cause changes in the vergence states of the eyes, but without a corresponding change in the accommodative states of those eyes. Rather, the images are shown by a display at a fixed distance from the eyes, such that the eyes view all the image information at a single accommodative state. Such an arrangement works against the "accommodation-vergence reflex" by causing changes in the vergence state without a matching change in the accommodative state. This mismatch is believed to cause viewer discomfort. Display systems that provide a better match between accommodation and vergence may form more realistic and comfortable simulations of three-dimensional imagery.

Without being limited by theory, it is believed that the human eye typically may interpret a finite number of depth planes to provide depth perception. Consequently, a highly believable simulation of perceived depth may be achieved by providing, to the eye, different presentations of an image corresponding to each of these limited numbers of depth planes. In some embodiments, the different presentations may provide both cues to vergence and matching cues to accommodation, thereby providing physiologically correct accommodation-vergence matching.

With continued reference to FIG. 4B, two depth planes 240, corresponding to different distances in space from the eyes 210, 220, are illustrated. For a given depth plane 240, vergence cues may be provided by the displaying of images of appropriately different perspectives for each eye 210, 220. In addition, for a given depth plane 240, light forming the images provided to each eye 210, 220 may have a wavefront divergence corresponding to a light field produced by a point at the distance of that depth plane 240.

In the illustrated embodiment, the distance, along the z-axis, of the depth plane 240 containing the point 221 is 1 m. As used herein, distances or depths along the z-axis may be measured with a zero-point located at the exit pupils of the user's eyes. Thus, a depth plane 240 located at a depth of 1 m corresponds to a distance of 1 m away from the exit pupils of the user's eyes, on the optical axis of those eyes with the eyes directed towards optical infinity. As an approximation, the depth or distance along the z-axis may be measured from the display in front of the user's eyes (e.g., from the surface of a waveguide), plus a value for the distance between the device and the exit pupils of the user's eyes. That value may be called the eye relief and corresponds to the distance between the exit pupil of the user's eye and the display worn by the user in front of the eye. In practice, the value for the eye relief may be a normalized value used generally for all viewers. For example, the eye relief may be assumed to be 20 mm and a depth plane that is at a depth of 1 m may be at a distance of 980 mm in front of the display.

Figure 4C:
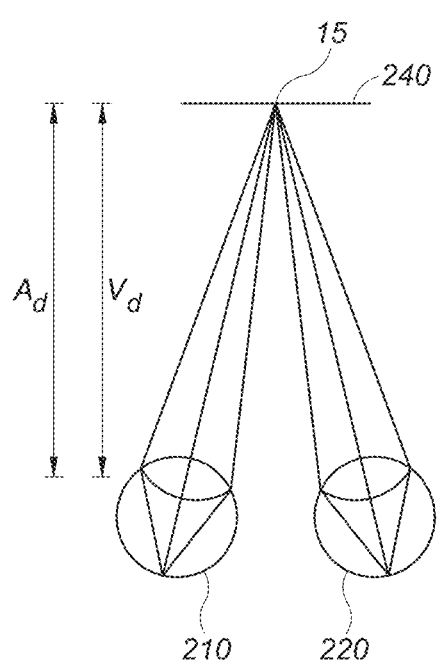
FIG. 4C illustrates an example of a representation of a top-down view of a user viewing content via a display system.
Figure 4D:
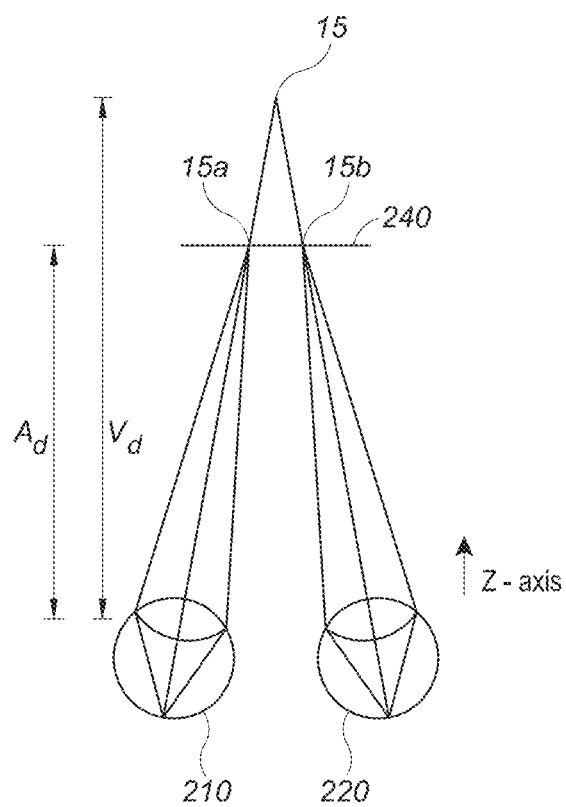
FIG. 4D illustrates another example of a representation of a top-down view of a user viewing content via a display system.

With reference now to FIGS. 4C and 4D, examples of matched accommodation-vergence distances and mismatched accommodation-vergence distances are illustrated, respectively. As illustrated in FIG. 4C, the display system may provide images of a virtual object to each eye 210, 220. The images may cause the eyes 210, 220 to assume a vergence state in which the eyes converge on a point 15 on a depth plane 240. In addition, the images may be formed by a light having a wavefront curvature corresponding to real objects at that depth plane 240. As a result, the eyes 210, 220 assume an accommodative state in which the images are in focus on the retinas of those eyes. Thus, the user may perceive the virtual object as being at the point 15 on the depth plane 240.

It will be appreciated that each of the accommodative and vergence states of the eyes 210, 220 are associated with a particular distance on the z-axis. For example, an object at a particular distance from the eyes 210, 220 causes those eyes to assume particular accommodative states based upon the distances of the object. The distance associated with a particular accommodative state may be referred to as the accommodation distance, $A_d$. Similarly, there are particular vergence distances, $V_d$, associated with the eyes in particular vergence states, or positions relative to one another. Where the accommodation distance and the vergence distance match, the relationship between accommodation and vergence may be said to be physiologically correct. This is considered to be the most comfortable scenario for a viewer.

In stereoscopic displays, however, the accommodation distance and the vergence distance may not always match. For example, as illustrated in FIG. 4D, images displayed to the eyes 210, 220 may be displayed with wavefront divergence corresponding to depth plane 240, and the eyes 210, 220 may assume a particular accommodative state in which the points 15a, 15b on that depth plane are in focus. However, the images displayed to the eyes 210, 220 may provide cues for vergence that cause the eyes 210, 220 to converge on a point 15 that is not located on the depth plane 240. As a result, the accommodation distance corresponds to the distance from the exit pupils of the eyes 210, 220 to the depth plane 240, while the vergence distance corresponds to the larger distance from the exit pupils of the eyes 210, 220 to the point 15, in some embodiments. The accommodation distance is different from the vergence distance. Consequently, there is an accommodation-vergence mismatch. Such a mismatch is considered undesirable and may cause discomfort in the user. It will be appreciated that the mismatch corresponds to distance (e.g., $V_d$-$A_d$) and may be characterized using diopters.

In some embodiments, it will be appreciated that a reference point other than exit pupils of the eyes 210, 220 may be utilized for determining distance for determining accommodation-vergence mismatch, so long as the same reference point is utilized for the accommodation distance and the vergence distance. For example, the distances could be measured from the cornea to the depth plane, from the retina to the depth plane, from the eyepiece (e.g., a waveguide of the display device) to the depth plane, and so on.

Without being limited by theory, it is believed that users may still perceive accommodation-vergence mismatches of up to about 0.25 diopter, up to about 0.33 diopter, and up to about 0.5 diopter as being physiologically correct, without the mismatch itself causing significant discomfort. In some embodiments, display systems disclosed herein (e.g., the display system 250, FIG. 6) present images to the viewer having accommodation-vergence mismatch of about 0.5 diopter or less. In some other embodiments, the accommodation-vergence mismatch of the images provided by the display system is about 0.33 diopter or less. In yet other embodiments, the accommodation-vergence mismatch of the images provided by the display system is about 0.25 diopter or less, including about 0.1 diopter or less.

Figure 5:
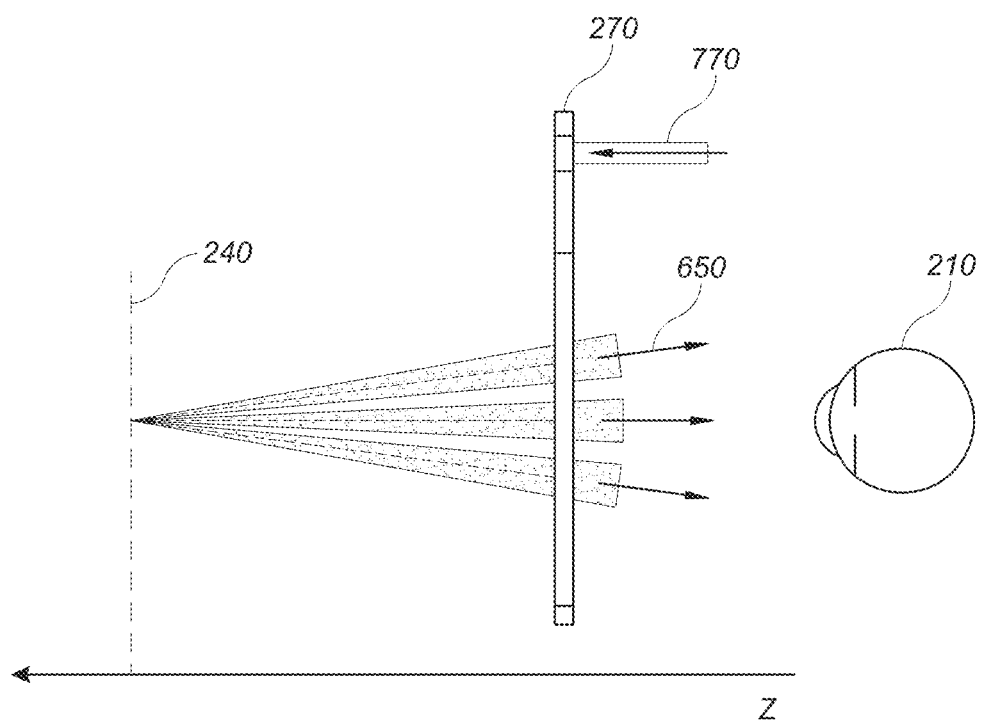
FIG. 5 illustrates aspects of an approach for simulating three-dimensional imagery by modifying wavefront divergence.

FIG. 5 illustrates aspects of an approach for simulating three-dimensional imagery by modifying wavefront divergence. The display system includes a waveguide 270 that is configured to receive light 770 that is encoded with image information, and to output that light to the user's eye 210. The waveguide 270 may output the light 650 with a defined amount of wavefront divergence corresponding to the wavefront divergence of a light field produced by a point on a desired depth plane 240. In some embodiments, the same amount of wavefront divergence is provided for all objects presented on that depth plane. In addition, it will be illustrated that the other eye of the user may be provided with image information from a similar waveguide.

In some embodiments, a single waveguide may be configured to output light with a set amount of wavefront divergence corresponding to a single or limited number of depth planes and/or the waveguide may be configured to output light of a limited range of wavelengths. Consequently, in some embodiments, a plurality or stack of waveguides may be utilized to provide different amounts of wavefront divergence for different depth planes and/or to output light of different ranges of wavelengths. As used herein, it will be appreciated at a depth plane may follow the contours of a flat or a curved surface. In some embodiments, advantageously for simplicity, the depth planes may follow the contours of flat surfaces.

Figure 6:
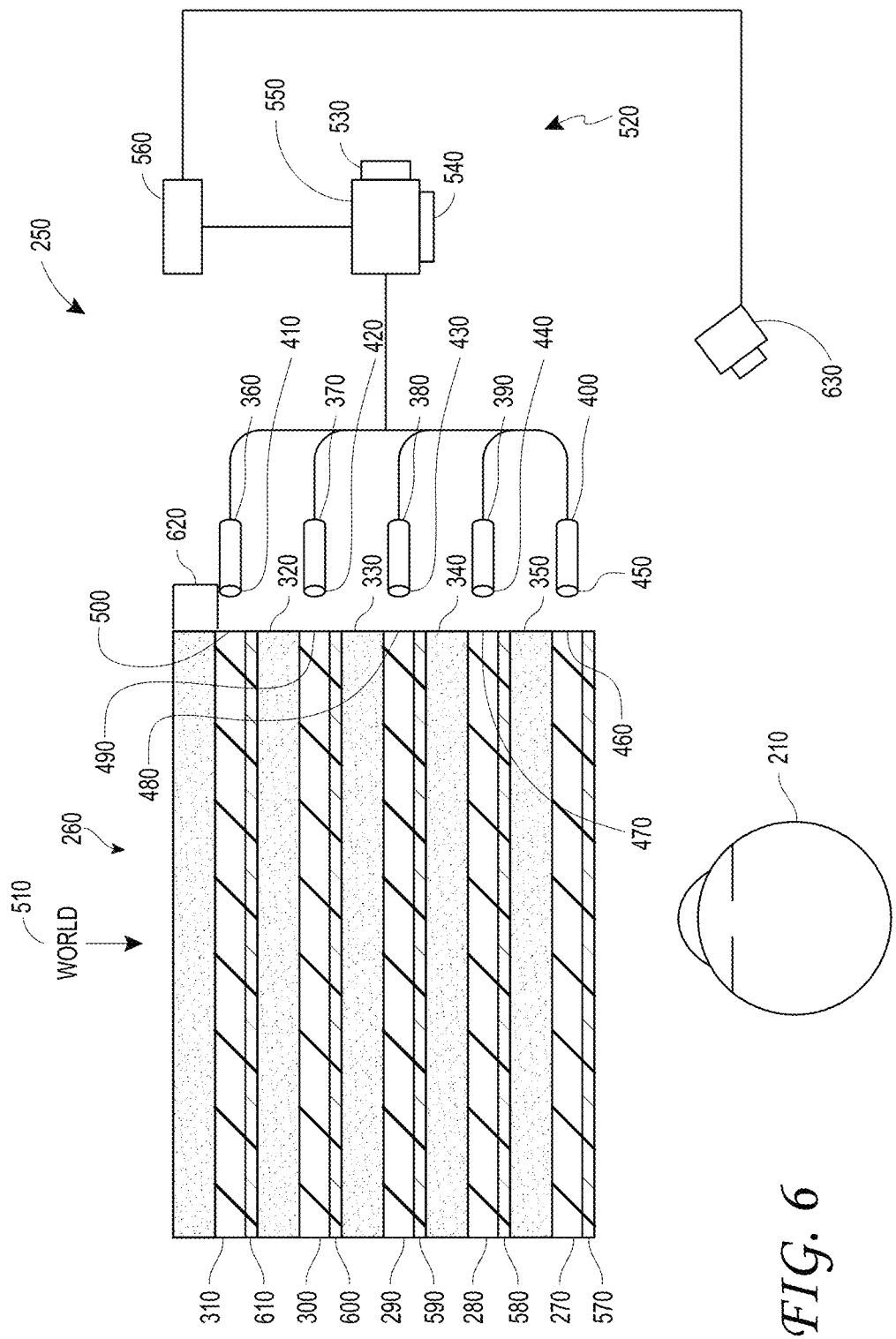
FIG. 6 illustrates an example of a waveguide stack for outputting image information to a user.

FIG. 6 illustrates an example of a waveguide stack for outputting image information to a user. A display system 250 includes a stack of waveguides, or stacked waveguide assembly, 260 that may be utilized to provide three-dimensional perception to the eye/brain using a plurality of waveguides 270, 280, 290, 300, 310. It will be appreciated that the display system 250 may be considered a light field display in some embodiments. In addition, the waveguide assembly 260 may also be referred to as an eyepiece.

In some embodiments, the display system 250 may be configured to provide substantially continuous cues to vergence and multiple discrete cues to accommodation. The cues to vergence may be provided by displaying different images to each of the eyes of the user, and the cues to accommodation may be provided by outputting the light that forms the images with selectable discrete amounts of wavefront divergence. Stated another way, the display system 250 may be configured to output light with variable levels of wavefront divergence. In some embodiments, each discrete level of wavefront divergence corresponds to a particular depth plane and may be provided by a particular one of the waveguides 270, 280, 290, 300, 310.

With continued reference to FIG. 6, the waveguide assembly 260 may also include a plurality of features 320, 330, 340, 350 between the waveguides. In some embodiments, the features 320, 330, 340, 350 may be one or more lenses. The waveguides 270, 280, 290, 300, 310 and/or the plurality of lenses 320, 330, 340, 350 may be configured to send image information to the eye with various levels of wavefront curvature or light ray divergence. Each waveguide level may be associated with a particular depth plane and may be configured to output image information corresponding to that depth plane. Image injection devices 360, 370, 380, 390, 400 may function as a source of light for the waveguides and may be utilized to inject image information into the waveguides 270, 280, 290, 300, 310, each of which may be configured, as described herein, to distribute incoming light across each respective waveguide, for output toward the eye 210. Light exits an output surface 410, 420, 430, 440, 450 of the image injection devices 360, 370, 380, 390, 400 and is injected into a corresponding input surface 460, 470, 480, 490, 500 of the waveguides 270, 280, 290, 300, 310. In some embodiments, each of the input surfaces 460, 470, 480, 490, 500 may be an edge of a corresponding waveguide, or may be part of a major surface of the corresponding waveguide (that is, one of the waveguide surfaces directly facing the world 510 or the viewer's eye 210). In some embodiments, a single beam of light (e.g. a collimated beam) may be injected into each waveguide to output an entire field of cloned collimated beams that are directed toward the eye 210 at particular angles (and amounts of divergence) corresponding to the depth plane associated with a particular waveguide. In some embodiments, a single one of the image injection devices 360, 370, 380, 390, 400 may be associated with and inject light into a plurality (e.g., three) of the waveguides 270, 280, 290, 300, 310.

In some embodiments, the image injection devices 360, 370, 380, 390, 400 are discrete displays that each produce image information for injection into a corresponding waveguide 270, 280, 290, 300, 310, respectively. In some other embodiments, the image injection devices 360, 370, 380, 390, 400 are the output ends of a single multiplexed display which may, e.g., pipe image information via one or more optical conduits (such as fiber optic cables) to each of the image injection devices 360, 370, 380, 390, 400. It will be appreciated that the image information provided by the image injection devices 360, 370, 380, 390, 400 may include light of different wavelengths, or colors (e.g., different component colors, as discussed herein).

In some embodiments, the light injected into the waveguides 270, 280, 290, 300, 310 is provided by a light projector system 520, which comprises a light module 530, which may include a light emitter, such as a light emitting diode (LED). The light from the light module 530 may be directed to and modified by a light modulator 540, e.g., a spatial light modulator, via a beam splitter 550. The light modulator 540 may be configured to change the perceived intensity of the light injected into the waveguides 270, 280, 290, 300, 310 to encode the light with image information. Examples of spatial light modulators include liquid crystal displays (LCD) including a liquid crystal on silicon (LCOS) displays. It will be appreciated that the image injection devices 360, 370, 380, 390, 400 are illustrated schematically and, in some embodiments, these image injection devices may represent different light paths and locations in a common projection system configured to output light into associated ones of the waveguides 270, 280, 290, 300, 310. In some embodiments, the waveguides of the waveguide assembly 260 may function as ideal lens while relaying light injected into the waveguides out to the user's eyes. In this conception, the object may be the spatial light modulator 540 and the image may be the image on the depth plane.

In some embodiments, the display system 250 may be a scanning fiber display comprising one or more scanning fibers configured to project light in various patterns (e.g., raster scan, spiral scan, Lissajous patterns, etc.) into one or more waveguides 270, 280, 290, 300, 310 and ultimately to the eye 210 of the viewer. In some embodiments, the illustrated image injection devices 360, 370, 380, 390, 400 may schematically represent a single scanning fiber or a bundle of scanning fibers configured to inject light into one or a plurality of the waveguides 270, 280, 290, 300, 310. In some other embodiments, the illustrated image injection devices 360, 370, 380, 390, 400 may schematically represent a plurality of scanning fibers or a plurality of bundles of scanning fibers, each of which are configured to inject light into an associated one of the waveguides 270, 280, 290, 300, 310. It will be appreciated that one or more optical fibers may be configured to transmit light from the light module 530 to the one or more waveguides 270, 280, 290, 300, 310. It will be appreciated that one or more intervening optical structures may be provided between the scanning fiber, or fibers, and the one or more waveguides 270, 280, 290, 300, 310 to, e.g., redirect light exiting the scanning fiber into the one or more waveguides 270, 280, 290, 300, 310.

A controller 560 controls the operation of one or more of the stacked waveguide assembly 260, including operation of the image injection devices 360, 370, 380, 390, 400, the light source 530, and the light modulator 540. In some embodiments, the controller 560 is part of the local data processing module 140. The controller 560 includes programming (e.g., instructions in a non-transitory medium) that regulates the timing and provision of image information to the waveguides 270, 280, 290, 300, 310 according to, e.g., any of the various schemes disclosed herein. In some embodiments, the controller may be a single integral device, or a distributed system connected by wired or wireless communication channels. The controller 560 may be part of the processing modules 140 or 150 (FIG. 9D) in some embodiments.

With continued reference to FIG. 6, the waveguides 270, 280, 290, 300, 310 may be configured to propagate light within each respective waveguide by total internal reflection (TIR). The waveguides 270, 280, 290, 300, 310 may each be planar or have another shape (e.g., curved), with major top and bottom surfaces and edges extending between those major top and bottom surfaces. In the illustrated configuration, the waveguides 270, 280, 290, 300, 310 may each include out-coupling optical elements 570, 580, 590, 600, 610 that are configured to extract light out of a waveguide by redirecting the light, propagating within each respective waveguide, out of the waveguide to output image information to the eye 210. Extracted light may also be referred to as out-coupled light and the out-coupling optical elements light may also be referred to light extracting optical elements. An extracted beam of light may be outputted by the waveguide at locations at which the light propagating in the waveguide strikes a light extracting optical element. The out-coupling optical elements 570, 580, 590, 600, 610 may, for example, be gratings, including diffractive optical features, as discussed further herein. While illustrated disposed at the bottom major surfaces of the waveguides 270, 280, 290, 300, 310, for ease of description and drawing clarity, in some embodiments, the out-coupling optical elements 570, 580, 590, 600, 610 may be disposed at the top and/or bottom major surfaces, and/or may be disposed directly in the volume of the waveguides 270, 280, 290, 300, 310, as discussed further herein. In some embodiments, the out-coupling optical elements 570, 580, 590, 600, 610 may be formed in a layer of material that is attached to a transparent substrate to form the waveguides 270, 280, 290, 300, 310. In some other embodiments, the waveguides 270, 280, 290, 300, 310 may be a monolithic piece of material and the out-coupling optical elements 570, 580, 590, 600, 610 may be formed on a surface and/or in the interior of that piece of material.

With continued reference to FIG. 6, as discussed herein, each waveguide 270, 280, 290, 300, 310 is configured to output light to form an image corresponding to a particular depth plane. For example, the waveguide 270 nearest the eye may be configured to deliver collimated light (which was injected into such waveguide 270), to the eye 210. The collimated light may be representative of the optical infinity focal plane. The next waveguide up 280 may be configured to send out collimated light which passes through the first lens 350 (e.g., a negative lens) before it may reach the eye 210; such first lens 350 may be configured to create a slight convex wavefront curvature so that the eye/brain interprets light coming from that next waveguide up 280 as coming from a first focal plane closer inward toward the eye 210 from optical infinity. Similarly, the third up waveguide 290 passes its output light through both the first 350 and second 340 lenses before reaching the eye 210; the combined optical power of the first 350 and second 340 lenses may be configured to create another incremental amount of wavefront curvature so that the eye/brain interprets light coming from the third waveguide 290 as coming from a second focal plane that is even closer inward toward the person from optical infinity than was light from the next waveguide up 280.

The other waveguide layers 300, 310 and lenses 330, 320 are similarly configured, with the highest waveguide 310 in the stack sending its output through all of the lenses between it and the eye for an aggregate focal power representative of the closest focal plane to the person. To compensate for the stack of lenses 320, 330, 340, 350 when viewing/interpreting light coming from the world 510 on the other side of the stacked waveguide assembly 260, a compensating lens layer 620 may be disposed at the top of the stack to compensate for the aggregate power of the lens stack 320, 330, 340, 350 below. Such a configuration provides as many perceived focal planes as there are available waveguide/lens pairings. Both the out-coupling optical elements of the waveguides and the focusing aspects of the lenses may be static (i.e., not dynamic or electro-active). In some alternative embodiments, either or both may be dynamic using electro-active features.

In some embodiments, two or more of the waveguides 270, 280, 290, 300, 310 may have the same associated depth plane. For example, multiple waveguides 270, 280, 290, 300, 310 may be configured to output images set to the same depth plane, or multiple subsets of the waveguides 270, 280, 290, 300, 310 may be configured to output images set to the same plurality of depth planes, with one set for each depth plane. This may provide advantages for forming a tiled image to provide an expanded field of view at those depth planes.

With continued reference to FIG. 6, the out-coupling optical elements 570, 580, 590, 600, 610 may be configured to both redirect light out of their respective waveguides and to output this light with the appropriate amount of divergence or collimation for a particular depth plane associated with the waveguide. As a result, waveguides having different associated depth planes may have different configurations of out-coupling optical elements 570, 580, 590, 600, 610, which output light with a different amount of divergence depending on the associated depth plane. In some embodiments, the light extracting optical elements 570, 580, 590, 600, 610 may be volumetric or surface features, which may be configured to output light at specific angles. For example, the light extracting optical elements 570, 580, 590, 600, 610 may be volume holograms, surface holograms, and/or diffraction gratings. In some embodiments, the features 320,

330, 340, 350 may not be lenses; rather, they may simply be spacers (e.g., cladding layers and/or structures for forming air gaps).

In some embodiments, the out-coupling optical elements 570, 580, 590, 600, 610 are diffractive features that form a diffraction pattern, or "diffractive optical element" (also referred to herein as a "DOE"). Preferably, the DOE's have a sufficiently low diffraction efficiency so that only a portion of the light of the beam is deflected away toward the eye 210 with each intersection of the DOE, while the rest continues to move through a waveguide via TIR. The light carrying the image information is thus divided into a number of related exit beams that exit the waveguide at a multiplicity of locations and the result is a fairly uniform pattern of exit emission toward the eye 210 for this particular collimated beam bouncing around within a waveguide.

In some embodiments, one or more DOEs may be switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets may be switched to substantially match the refractive index of the host material (in which case the pattern does not appreciably diffract incident light) or the microdroplet may be switched to an index that does not match that of the host medium (in which case the pattern actively diffracts incident light).

In some embodiments, a camera assembly 630 (e.g., a digital camera, including visible light and infrared light cameras) may be provided to capture images of the eye 210 and/or tissue around the eye 210 to, e.g., detect user inputs and/or to monitor the physiological state of the user. As used herein, a camera may be any image capture device. In some embodiments, the camera assembly 630 may include an image capture device and a light source to project light (e.g., infrared light) to the eye, which may then be reflected by the eye and detected by the image capture device. In some embodiments, the camera assembly 630 may be attached to the frame 80 (FIG. 9D) and may be in electrical communication with the processing modules 140 and/or 150, which may process image information from the camera assembly 630. In some embodiments, one camera assembly 630 may be utilized for each eye, to separately monitor each eye.

Figure 7:
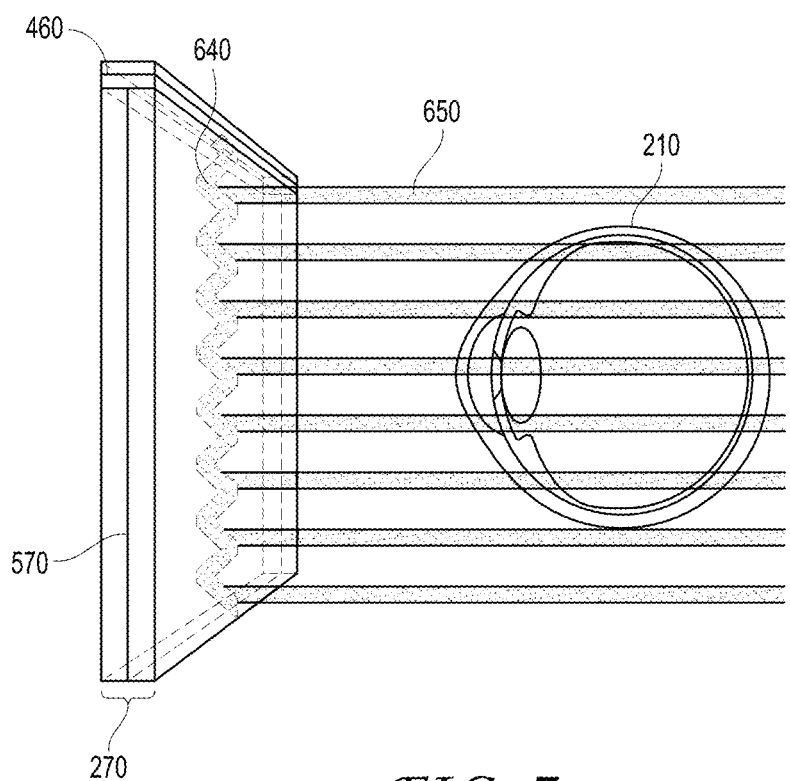
FIG. 7 illustrates an example of exit beams outputted by a waveguide.

With reference now to FIG. 7, an example of exit beams outputted by a waveguide is shown. One waveguide is illustrated, but it will be appreciated that other waveguides in the waveguide assembly 260 (FIG. 6) may function similarly, where the waveguide assembly 260 includes multiple waveguides. Light 640 is injected into the waveguide 270 at the input surface 460 of the waveguide 270 and propagates within the waveguide 270 by TIR. At points where the light 640 impinges on the DOE 570, a portion of the light exits the waveguide as exit beams 650. The exit beams 650 are illustrated as substantially parallel but, as discussed herein, they may also be redirected to propagate to the eye 210 at an angle (e.g., forming divergent exit beams), depending on the depth plane associated with the waveguide 270. It will be appreciated that substantially parallel exit beams may be indicative of a waveguide with out-coupling optical elements that out-couple light to form images that appear to be set on a depth plane at a large distance (e.g., optical infinity) from the eye 210. Other waveguides or other sets of out-coupling optical elements may output an exit beam pattern that is more divergent, which would require the eye 210 to accommodate to a closer distance to bring it into focus on the retina and would be interpreted by the brain as light from a distance closer to the eye 210 than optical infinity.

Figure 8:
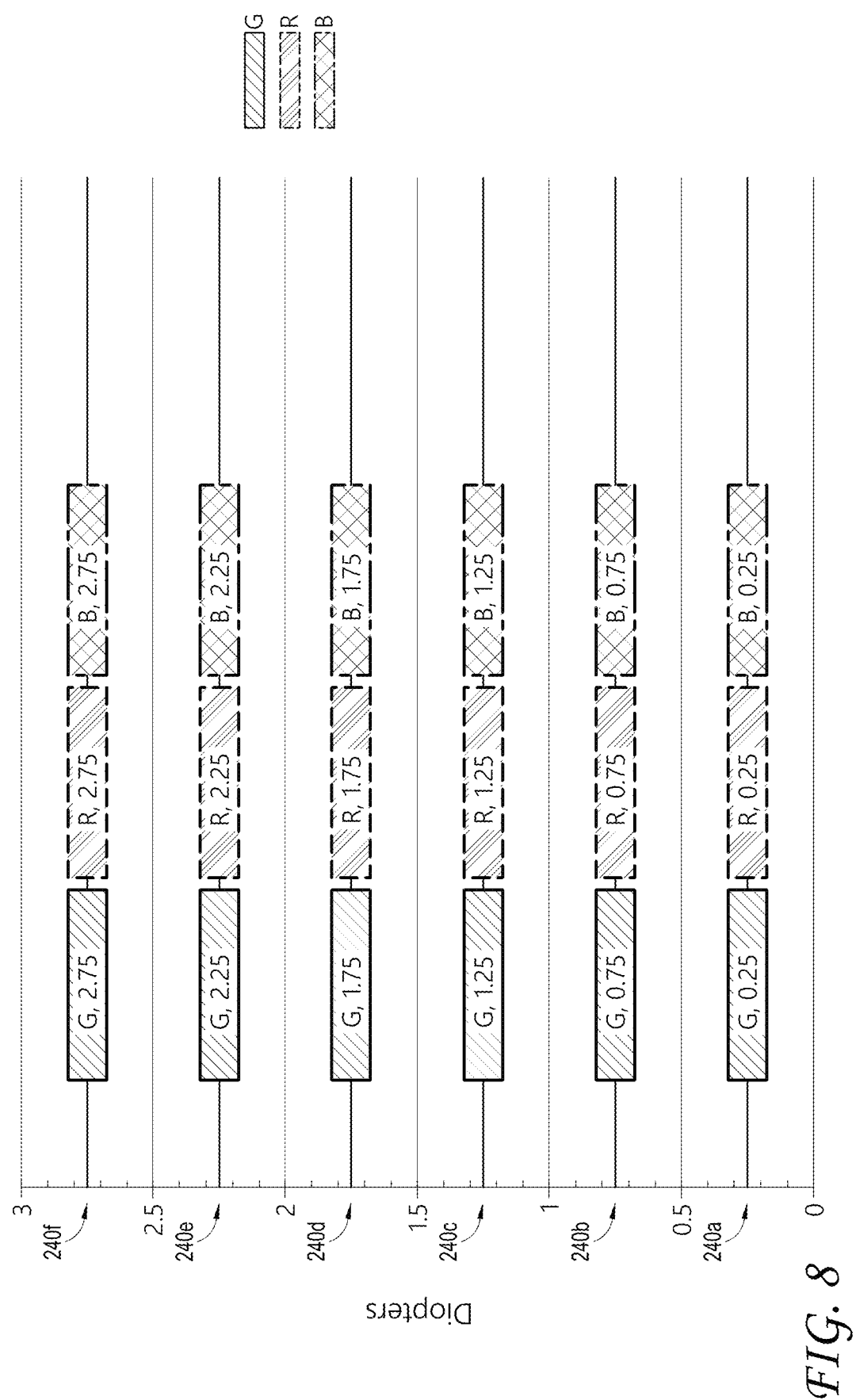
FIG. 8 illustrates an example of a stacked waveguide assembly in which each depth plane includes images formed using multiple different component colors.

In some embodiments, a full color image may be formed at each depth plane by overlaying images in each of the component colors, e.g., three or more component colors. FIG. 8 illustrates an example of a stacked waveguide assembly in which each depth plane includes images formed using multiple different component colors. The illustrated embodiment shows depth planes 240a-240f, although more or fewer depths are also contemplated. Each depth plane may have three or more component color images associated with it, including: a first image of a first color, G; a second image of a second color, R; and a third image of a third color, B. Different depth planes are indicated in the figure by different numbers for diopters (dpt) following the letters G, R, and B. Just as examples, the numbers following each of these letters indicate diopters (1/m), or inverse distance of the depth plane from a viewer, and each box in the figures represents an individual component color image. In some embodiments, to account for differences in the eye's focusing of light of different wavelengths, the exact placement of the depth planes for different component colors may vary. For example, different component color images for a given depth plane may be placed on depth planes corresponding to different distances from the user. Such an arrangement may increase visual acuity and user comfort and/or may decrease chromatic aberrations.

In some embodiments, light of each component color may be outputted by a single dedicated waveguide and, consequently, each depth plane may have multiple waveguides associated with it. In such embodiments, each box in the figures including the letters G, R, or B may be understood to represent an individual waveguide, and three waveguides may be provided per depth plane where three component color images are provided per depth plane. While the waveguides associated with each depth plane are shown adjacent to one another in this drawing for ease of description, it will be appreciated that, in a physical device, the waveguides may all be arranged in a stack with one waveguide per level. In some other embodiments, multiple component colors may be outputted by the same waveguide, such that, e.g., only a single waveguide may be provided per depth plane.

With continued reference to FIG. 8, in some embodiments, G is the color green, R is the color red, and B is the color blue. In some other embodiments, other colors associated with other wavelengths of light, including magenta and cyan, may be used in addition to or may replace one or more of red, green, or blue.

It will be appreciated that references to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm.

In some embodiments, the light source 530 (FIG. 6) may be configured to emit light of one or more wavelengths outside the visual perception range of the viewer, for example, infrared and/or ultraviolet wavelengths. In addition, the in-coupling, out-coupling, and other light redirecting structures of the waveguides of the display 250 may be configured to direct and emit this light out of the display towards the user's eye 210, e.g., for imaging and/or user stimulation applications.

Figure 9A:
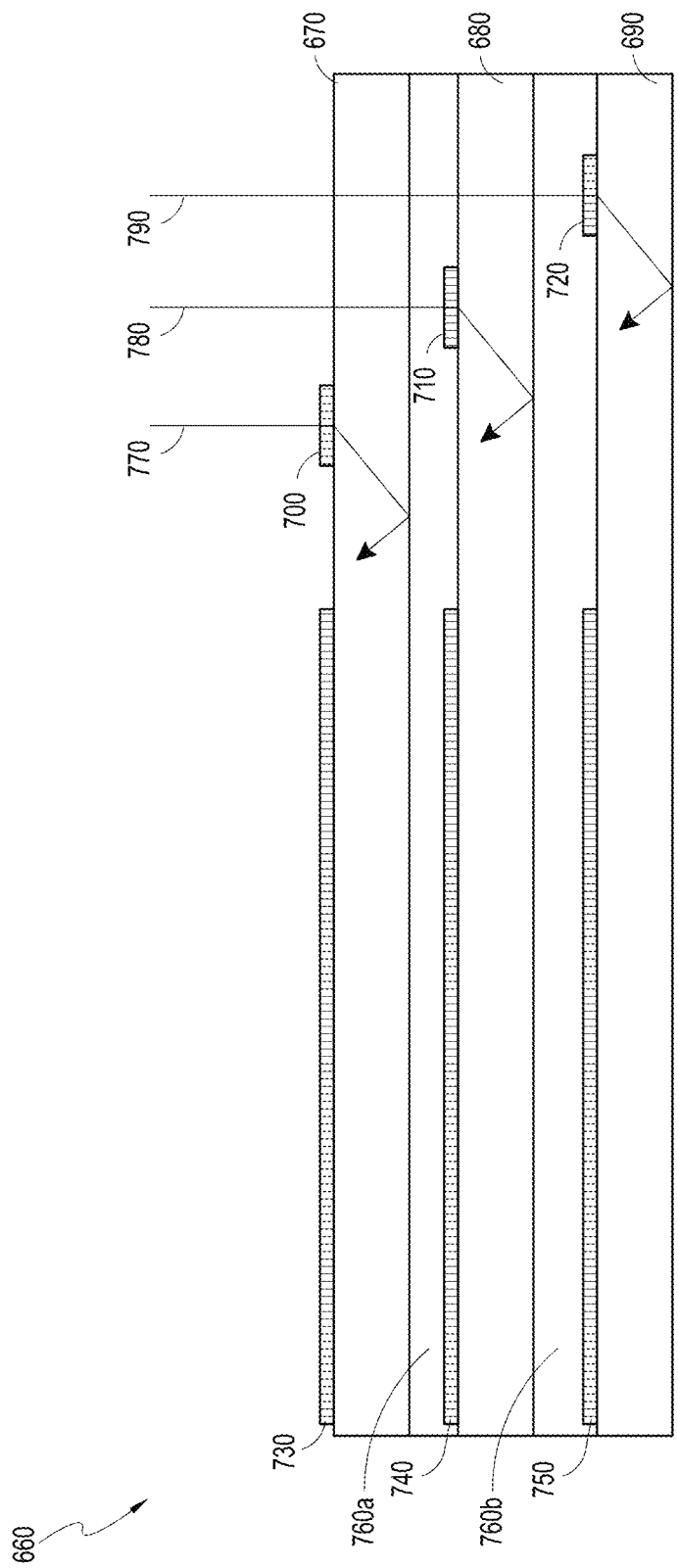
FIG. 9A illustrates a cross-sectional side view of an example of a set of stacked waveguides that each includes an incoupling optical element.

With reference now to FIG. 9A, in some embodiments, light impinging on a waveguide may need to be redirected to in-couple that light into the waveguide. An in-coupling optical element may be used to redirect and in-couple the light into its corresponding waveguide. FIG. 9A illustrates a cross-sectional side view of an example of a plurality or set 660 of stacked waveguides that each includes an in-coupling optical element. The waveguides may each be configured to output light of one or more different wavelengths, or one or more different ranges of wavelengths. It will be appreciated that the stack 660 may correspond to the stack 260 (FIG. 6) and the illustrated waveguides of the stack 660 may correspond to part of the plurality of waveguides 270, 280, 290, 300, 310, except that light from one or more of the image injection devices 360, 370, 380, 390, 400 is injected into the waveguides from a position that requires light to be redirected for in-coupling.

The illustrated set 660 of stacked waveguides includes waveguides 670, 680, and 690. Each waveguide includes an associated in-coupling optical element (which may also be referred to as a light input area on the waveguide), with, e.g., in-coupling optical element 700 disposed on a major surface (e.g., an upper major surface) of waveguide 670, in-coupling optical element 710 disposed on a major surface (e.g., an upper major surface) of waveguide 680, and in-coupling optical element 720 disposed on a major surface (e.g., an upper major surface) of waveguide 690. In some embodiments, one or more of the in-coupling optical elements 700, 710, 720 may be disposed on the bottom major surface of the respective waveguide 670, 680, 690 (particularly where the one or more in-coupling optical elements are reflective, deflecting optical elements). As illustrated, the in-coupling optical elements 700, 710, 720 may be disposed on the upper major surface of their respective waveguide 670, 680, 690 (or the top of the next lower waveguide), particularly where those in-coupling optical elements are transmissive, deflecting optical elements. In some embodiments, the in-coupling optical elements 700, 710, 720 may be disposed in the body of the respective waveguide 670, 680, 690. In some embodiments, as discussed herein, the in-coupling optical elements 700, 710, 720 are wavelength selective, such that they selectively redirect one or more wavelengths of light, while transmitting other wavelengths of light. While illustrated on one side or corner of their respective waveguide 670, 680, 690, it will be appreciated that the in-coupling optical elements 700, 710, 720 may be disposed in other areas of their respective waveguide 670, 680, 690 in some embodiments.

As illustrated, the in-coupling optical elements 700, 710, 720 may be laterally offset from one another. In some embodiments, each in-coupling optical element may be offset such that it receives light without that light passing through another in-coupling optical element. For example, each in-coupling optical element 700, 710, 720 may be configured to receive light from a different image injection device 360, 370, 380, 390, and 400 as shown in FIG. 6, and may be separated (e.g., laterally spaced apart) from other in-coupling optical elements 700, 710, 720 such that it substantially does not receive light from the other ones of the in-coupling optical elements 700, 710, 720.

Each waveguide also includes associated light distributing elements, with, e.g., light distributing elements 730 disposed on a major surface (e.g., a top major surface) of waveguide 670, light distributing elements 740 disposed on a major surface (e.g., a top major surface) of waveguide 680, and light distributing elements 750 disposed on a major surface (e.g., a top major surface) of waveguide 690. In some other embodiments, the light distributing elements 730, 740, 750, may be disposed on a bottom major surface of associated waveguides 670, 680, 690, respectively. In some other embodiments, the light distributing elements 730, 740, 750, may be disposed on both top and bottom major surface of associated waveguides 670, 680, 690, respectively; or the light distributing elements 730, 740, 750, may be disposed on different ones of the top and bottom major surfaces in different associated waveguides 670, 680, 690, respectively.

The waveguides 670, 680, 690 may be spaced apart and separated by, e.g., gas, liquid, and/or solid layers of material. For example, as illustrated, layer 760a may separate waveguides 670 and 680; and layer 760b may separate waveguides 680 and 690. In some embodiments, the layers 760a and 760b are formed of low refractive index materials (that is, materials having a lower refractive index than the material forming the immediately adjacent one of waveguides 670, 680, 690). Preferably, the refractive index of the material forming the layers 760a, 760b is 0.05 or more, or 0.10 or less than the refractive index of the material forming the waveguides 670, 680, 690. Advantageously, the lower refractive index layers 760a, 760b may function as cladding layers that facilitate total internal reflection (TIR) of light through the waveguides 670, 680, 690 (e.g., TIR between the top and bottom major surfaces of each waveguide). In some embodiments, the layers 760a, 760b are formed of air. While not illustrated, it will be appreciated that the top and bottom of the illustrated set 660 of waveguides may include immediately neighboring cladding layers.

Preferably, for ease of manufacturing and other considerations, the material forming the waveguides 670, 680, 690 are similar or the same, and the material forming the layers 760a, 760b are similar or the same. In some embodiments, the material forming the waveguides 670, 680, 690 may be different between one or more waveguides, and/or the material forming the layers 760a, 760b may be different, while still holding to the various refractive index relationships noted above.

With continued reference to FIG. 9A, light rays 770, 780, 790 are incident on the set 660 of waveguides. It will be appreciated that the light rays 770, 780, 790 may be injected into the waveguides 670, 680, 690 by one or more image injection devices 360, 370, 380, 390, 400 (FIG. 6).

In some embodiments, the light rays 770, 780, 790 have different properties, e.g., different wavelengths or different ranges of wavelengths, which may correspond to different colors. The in-coupling optical elements 700, 710, 720 each deflect the incident light such that the light propagates through a respective one of the waveguides 670, 680, 690 by TIR. In some embodiments, the incoupling optical elements 700, 710, 720 each selectively deflect one or more particular wavelengths of light, while transmitting other wavelengths to an underlying waveguide and associated incoupling optical element.

For example, in-coupling optical element 700 may be configured to deflect ray 770, which has a first wavelength or range of wavelengths, while transmitting rays 780 and 790, which have different second and third wavelengths or ranges of wavelengths, respectively. The transmitted ray 780 impinges on and is deflected by the in-coupling optical element 710, which is configured to deflect light of a second wavelength or range of wavelengths. The ray 790 is deflected by the in-coupling optical element 720, which is configured to selectively deflect light of third wavelength or range of wavelengths.

With continued reference to FIG. 9A, the deflected light rays 770, 780, 790 are deflected so that they propagate through a corresponding waveguide 670, 680, 690; that is, the in-coupling optical elements 700, 710, 720 of each waveguide deflects light into that corresponding waveguide 670, 680, 690 to in-couple light into that corresponding waveguide. The light rays 770, 780, 790 are deflected at angles that cause the light to propagate through the respective waveguide 670, 680, 690 by TIR. The light rays 770, 780, 790 propagate through the respective waveguide 670, 680, 690 by TIR until impinging on the waveguide's corresponding light distributing elements 730, 740, 750.

Figure 9B:
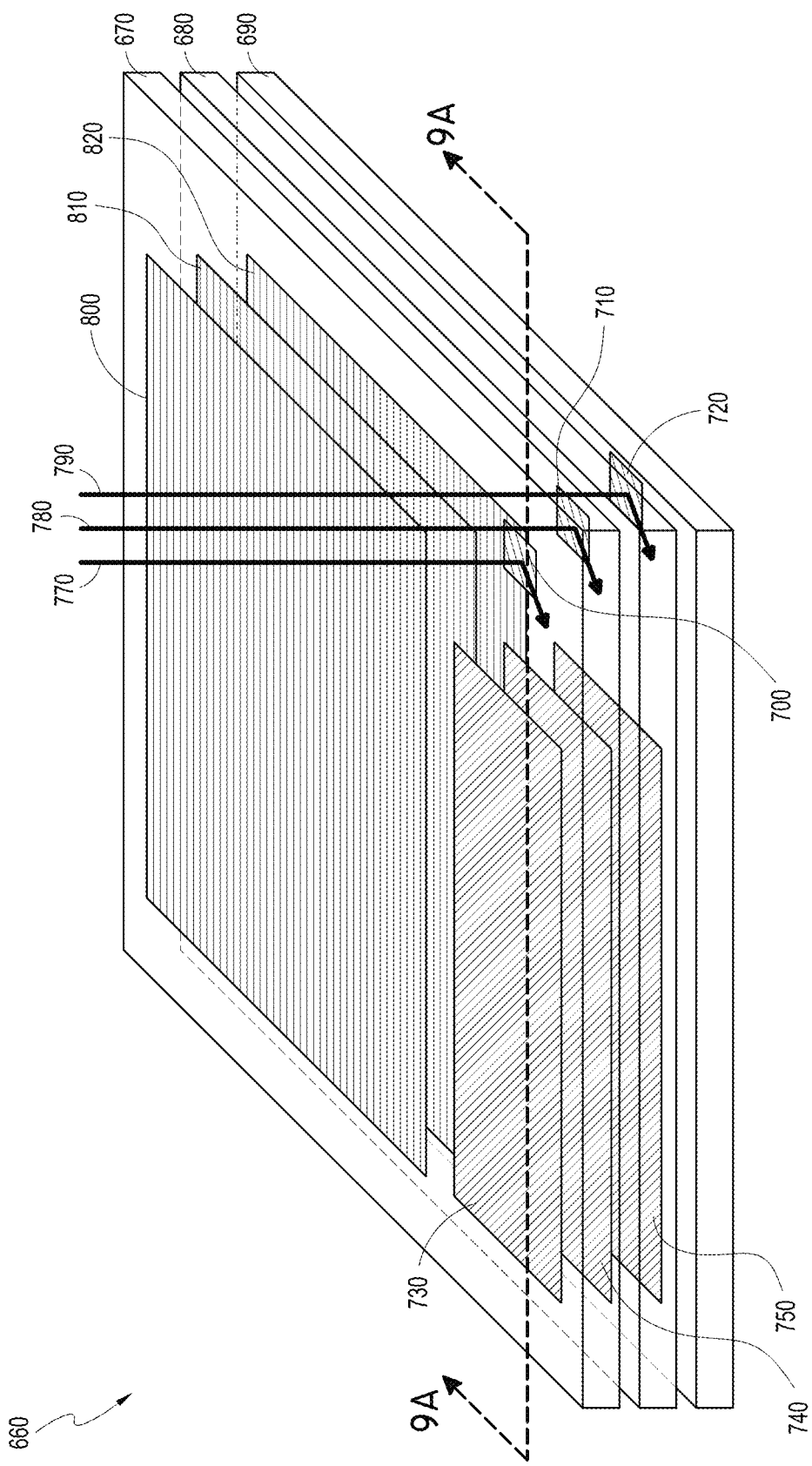
FIG. 9B illustrates a perspective view of an example of the plurality of stacked waveguides of FIG. 9A.

With reference now to FIG. 9B, a perspective view of an example of the plurality of stacked waveguides of FIG. 9A is illustrated. As noted above, the in-coupled light rays 770, 780, 790, are deflected by the in-coupling optical elements 700, 710, 720, respectively, and then propagate by TIR within the waveguides 670, 680, 690, respectively. The light rays 770, 780, 790 then impinge on the light distributing elements 730, 740, 750, respectively. The light distributing elements 730, 740, 750 deflect the light rays 770, 780, 790 so that they propagate towards the out-coupling optical elements 800, 810, 820, respectively.

In some embodiments, the light distributing elements 730, 740, 750 are orthogonal pupil expanders (OPE's). In some embodiments, the OPE's deflect or distribute light to the out-coupling optical elements 800, 810, 820 and, in some embodiments, may also increase the beam or spot size of this light as it propagates to the out-coupling optical elements. In some embodiments, the light distributing elements 730, 740, 750 may be omitted and the in-coupling optical elements 700, 710, 720 may be configured to deflect light directly to the out-coupling optical elements 800, 810, 820. For example, with reference to FIG. 9A, the light distributing elements 730, 740, 750 may be replaced with out-coupling optical elements 800, 810, 820, respectively. In some embodiments, the out-coupling optical elements 800, 810, 820 are exit pupils (EP's) or exit pupil expanders (EPE's) that direct light in a viewer's eye 210 (FIG. 7). It will be appreciated that the OPE's may be configured to increase the dimensions of the eye box in at least one axis and the EPE's may be to increase the eye box in an axis crossing, e.g., orthogonal to, the axis of the OPEs. For example, each OPE may be configured to redirect a portion of the light striking the OPE to an EPE of the same waveguide, while allowing the remaining portion of the light to continue to propagate down the waveguide. Upon impinging on the OPE again, another portion of the remaining light is redirected to the EPE, and the remaining portion of that portion continues to propagate further down the waveguide, and so on. Similarly, upon striking the EPE, a portion of the impinging light is directed out of the waveguide towards the user, and a remaining portion of that light continues to propagate through the waveguide until it strikes the EP again, at which time another portion of the impinging light is directed out of the waveguide, and so on. Consequently, a single beam of incoupled light may be "replicated" each time a portion of that light is redirected by an OPE or EPE, thereby forming a field of cloned beams of light, as shown in FIG. 6. In some embodiments, the OPE and/or EPE may be configured to modify a size of the beams of light.

Accordingly, with reference to FIGS. 9A and 9B, in some embodiments, the set 660 of waveguides includes waveguides 670, 680, 690; in-coupling optical elements 700, 710, 720; light distributing elements (e.g., OPE's) 730, 740, 750; and out-coupling optical elements (e.g., EP's) 800, 810, 820 for each component color. The waveguides 670, 680, 690 may be stacked with an air gap/cladding layer between each one. The in-coupling optical elements 700, 710, 720 redirect or deflect incident light (with different in-coupling optical elements receiving light of different wavelengths) into its waveguide. The light then propagates at an angle which will result in TIR within the respective waveguide 670, 680, 690. In the example shown, light ray 770 (e.g., blue light) is deflected by the first in-coupling optical element 700, and then continues to bounce down the waveguide, interacting with the light distributing element (e.g., OPE's) 730 and then the out-coupling optical element (e.g., EPs) 800, in a manner described earlier. The light rays 780 and 790 (e.g., green and red light, respectively) will pass through the waveguide 670, with light ray 780 impinging on and being deflected by in-coupling optical element 710. The light ray 780 then bounces down the waveguide 680 via TIR, proceeding on to its light distributing element (e.g., OPEs) 740 and then the out-coupling optical element (e.g., EP's) 810. Finally, light ray 790 (e.g., red light) passes through the waveguide 690 to impinge on the light in-coupling optical elements 720 of the waveguide 690. The light in-coupling optical elements 720 deflect the light ray 790 such that the light ray propagates to light distributing element (e.g., OPEs) 750 by TIR, and then to the out-coupling optical element (e.g., EPs) 820 by TIR. The out-coupling optical element 820 then finally out-couples the light ray 790 to the viewer, who also receives the out-coupled light from the other waveguides 670, 680.

Figure 9C:
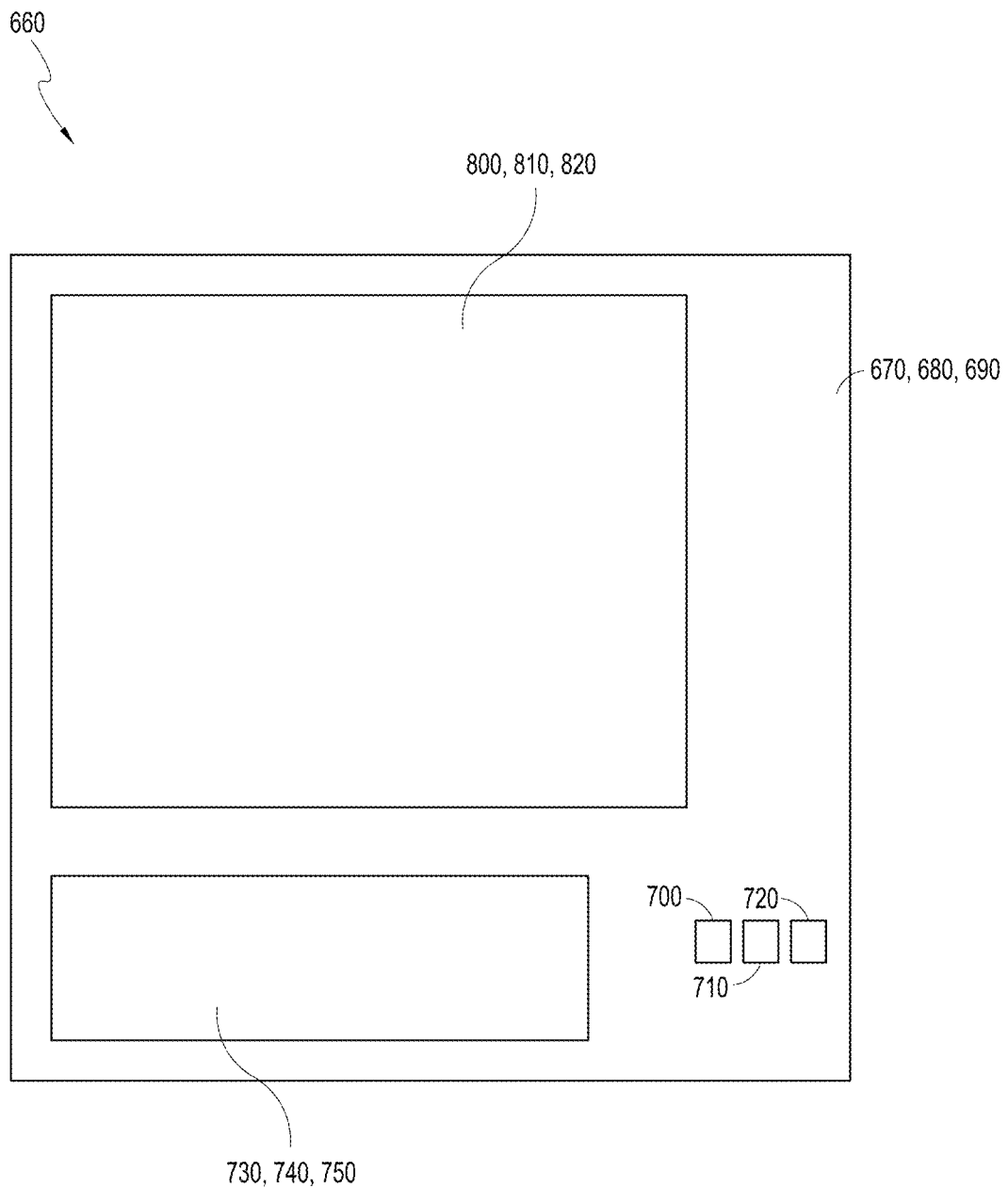
FIG. 9C illustrates a top-down plan view of an example of the plurality of stacked waveguides of FIGS. 9A and 9B.

FIG. 9C illustrates a top-down plan view of an example of the plurality of stacked waveguides of FIGS. 9A and 9B. As illustrated, the waveguides 670, 680, 690, along with each waveguide's associated light distributing element 730, 740, 750 and associated out-coupling optical element 800, 810, 820, may be vertically aligned. However, as discussed herein, the in-coupling optical elements 700, 710, 720 are not vertically aligned; rather, the in-coupling optical elements are preferably non-overlapping (e.g., laterally spaced apart as seen in the top-down view). As discussed further herein, this nonoverlapping spatial arrangement facilitates the injection of light from different resources into different waveguides on a one-to-one basis, thereby allowing a specific light source to be uniquely coupled to a specific waveguide. In some embodiments, arrangements including nonoverlapping spatially-separated in-coupling optical elements may be referred to as a shifted pupil system, and the in-coupling optical elements within these arrangements may correspond to sub pupils.

Figure 9D:
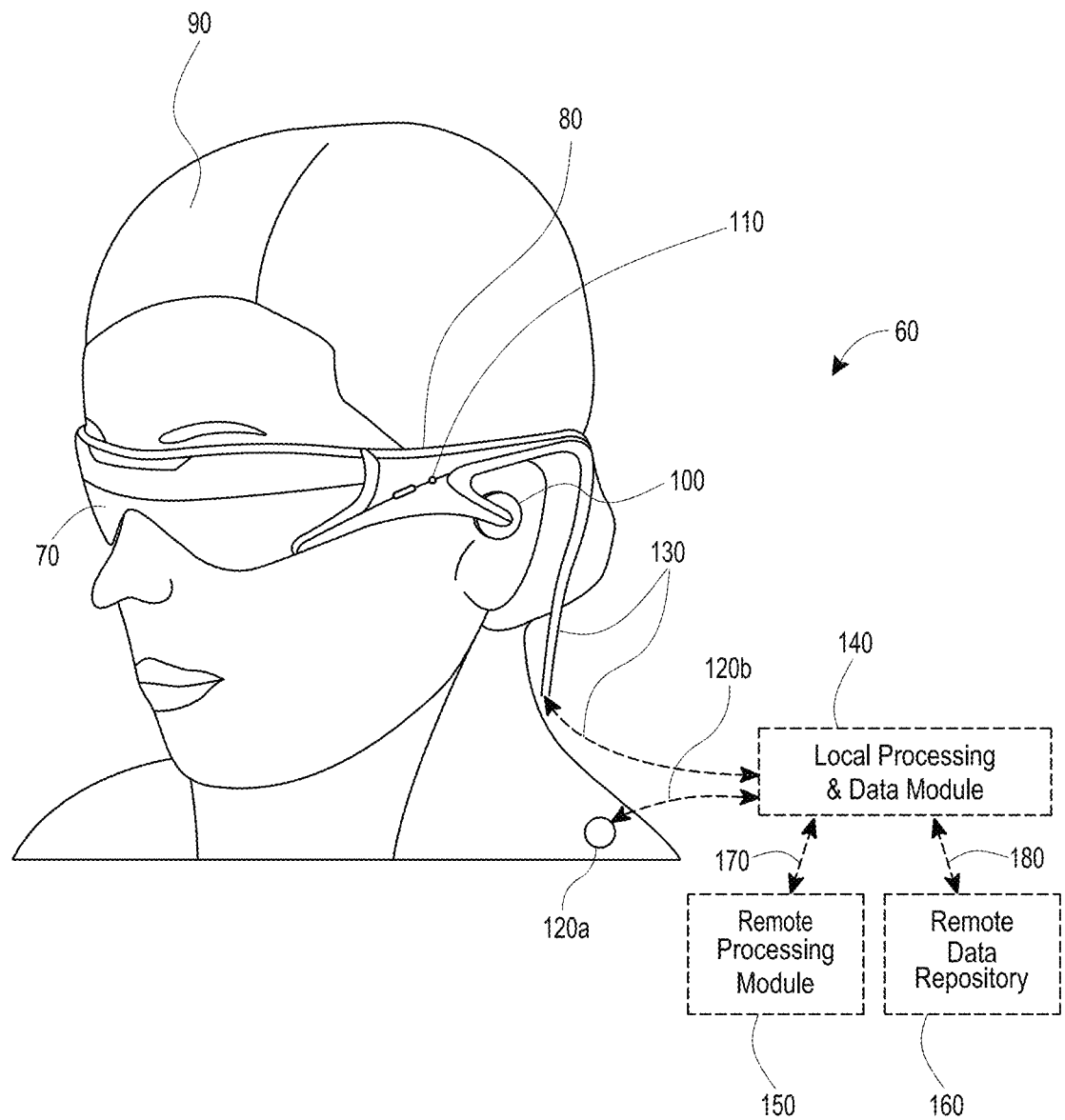
FIG. 9D illustrates an example of wearable display system.

FIG. 9D illustrates an example of wearable display system 60 into which the various waveguides and related systems disclosed herein may be integrated. In some embodiments, the display system 60 is the system 250 of FIG. 6, with FIG. 6 schematically showing some parts of that system 60 in greater detail. For example, the waveguide assembly 260 of FIG. 6 may be part of the display 70.

With continued reference to FIG. 9D, the display system 60 includes a display 70, and various mechanical and electronic modules and systems to support the functioning of that display 70. The display 70 may be coupled to a frame 80, which is wearable by a display system user or viewer 90 and which is configured to position the display 70 in front of the eyes of the user 90. The display 70 may be considered eyewear in some embodiments. In some embodiments, a speaker 100 is coupled to the frame 80 and configured to be positioned adjacent the ear canal of the user 90 (in some embodiments, another speaker, not shown, may optionally be positioned adjacent the other ear canal of the user to provide stereo/shapeable sound control). The display system 60 may also include one or more microphones 110 or other devices to detect sound. In some embodiments, the microphone is configured to allow the user to provide inputs or commands to the system 60 (e.g., the selection of voice menu commands, natural language questions, etc.), and/or may allow audio communication with other persons (e.g., with other users of similar display systems. The microphone may further be configured as a peripheral sensor to collect audio data (e.g., sounds from the user and/or environment). In some embodiments, the display system 60 may further include one or more outwardly-directed environmental sensors 112 configured to detect objects, stimuli, people, animals, locations, or other aspects of the world around the user. For example, environmental sensors 112 may include one or more cameras, which may be located, for example, facing outward so as to capture images similar to at least a portion of an ordinary field of view of the user 90. In some embodiments, the display system may also include a peripheral sensor 120a, which may be separate from the frame 80 and attached to the body of the user 90 (e.g., on the head, torso, an extremity, etc. of the user 90). The peripheral sensor 120a may be configured to acquire data characterizing a physiological state of the user 90 in some embodiments. For example, the sensor 120a may be an electrode.

With continued reference to FIG. 9D, the display 70 is operatively coupled by communications link 130, such as by a wired lead or wireless connectivity, to a local data processing module 140 which may be mounted in a variety of configurations, such as fixedly attached to the frame 80, fixedly attached to a helmet or hat worn by the user, embedded in headphones, or otherwise removably attached to the user 90 (e.g., in a backpack-style configuration, in a belt-coupling style configuration). Similarly, the sensor 120a may be operatively coupled by communications link 120b, e.g., a wired lead or wireless connectivity, to the local processor and data module 140. The local processing and data module 140 may comprise a hardware processor, as well as digital memory, such as non-volatile memory (e.g., flash memory or hard disk drives), both of which may be utilized to assist in the processing, caching, and storage of data. Optionally, the local processor and data module 140 may include one or more central processing units (CPUs), graphics processing units (GPUs), dedicated processing hardware, and so on. The data may include data a) captured from sensors (which may be, e.g., operatively coupled to the frame 80 or otherwise attached to the user 90), such as image capture devices (such as cameras), microphones, inertial measurement units, accelerometers, compasses, GPS units, radio devices, gyros, and/or other sensors disclosed herein; and/or b) acquired and/or processed using remote processing module 150 and/or remote data repository 160 (including data relating to virtual content), possibly for passage to the display 70 after such processing or retrieval. The local processing and data module 140 may be operatively coupled by communication links 170, 180, such as via a wired or wireless communication links, to the remote processing module 150 and remote data repository 160 such that these remote modules 150, 160 are operatively coupled to each other and available as resources to the local processing and data module 140. In some embodiments, the local processing and data module 140 may include one or more of the image capture devices, microphones, inertial measurement units, accelerometers, compasses, GPS units, radio devices, and/or gyros. In some other embodiments, one or more of these sensors may be attached to the frame 80, or may be standalone structures that communicate with the local processing and data module 140 by wired or wireless communication pathways.

With continued reference to FIG. 9D, in some embodiments, the remote processing module 150 may comprise one or more processors configured to analyze and process data and/or image information, for instance including one or more central processing units (CPUs), graphics processing units (GPUs), dedicated processing hardware, and so on. In some embodiments, the remote data repository 160 may comprise a digital data storage facility, which may be available through the internet or other networking configuration in a "cloud" resource configuration. In some embodiments, the remote data repository 160 may include one or more remote servers, which provide information, e.g., information for generating augmented reality content, to the local processing and data module 140 and/or the remote processing module 150. In some embodiments, all data is stored and all computations are performed in the local processing and data module, allowing fully autonomous use from a remote module. Optionally, an outside system (e.g., a system of one or more processors, one or more computers) that includes CPUs, GPUs, and so on, may perform at least a portion of processing (e.g., generating image information, processing data) and provide information to, and receive information from, modules 140, 150, 160, for instance via wireless or wired connections.

Adaptive Lens Assemblies

With reference again to FIG. 9A, some display systems include the waveguide assembly 660 configured to form images at a plurality of virtual depth planes. In the illustrated embodiment, the images may be formed using, e.g., a plurality waveguides 670, 680, 690 configured to form an image at one of the different depth planes. The waveguide assembly 660 may also include additional waveguides having different optical power to form images at different virtual depth planes. However, because each of the waveguides 670, 680, 690 increases the overall thickness, weight, and cost of the waveguide assembly 660, it would be desirable to form images at a plurality of virtual depth planes with fewer waveguides.

In various embodiments described herein, display devices are configured to form images at different virtual depth planes using a waveguide assembly and one or more adaptive lens assemblies. In some embodiments, the adaptive lens assemblies comprise liquid crystals that may form lens assemblies that are lighter and thinner (microns) than conventional lenses, and that may advantageously be configured to be switchable (e.g., electrically switchable). Advantageously, such adaptive lens assemblies may reduce the number, thickness and weight of a waveguide assembly such as the assembly 660.

As used herein, optical power (also referred to as refractive power, focusing power, or convergence power) is the degree to which a lens, mirror, or other optical system converges or diverges light. It is equal to the reciprocal of the focal length of the device: $P=1/f$. That is, high optical power corresponds to short focal length. The SI unit for optical power is the inverse meter ($m^{-1}$), which is commonly called the diopter. As described herein, converging lenses are described to have positive optical power, while diverging lenses are described to have negative power. Without being bound by theory, when light passes through two or more thin lenses that are relatively close to each other, the optical power of the combined lenses may be approximated as a sum of the optical powers of the individual lenses. Thus, when light passes through a first lens having a first optical power P1 and further passes through a second lens having a second optical power P2, the light may be understood to converge or diverge according to the sum of optical powers P=P1+P2.

Figure 10:
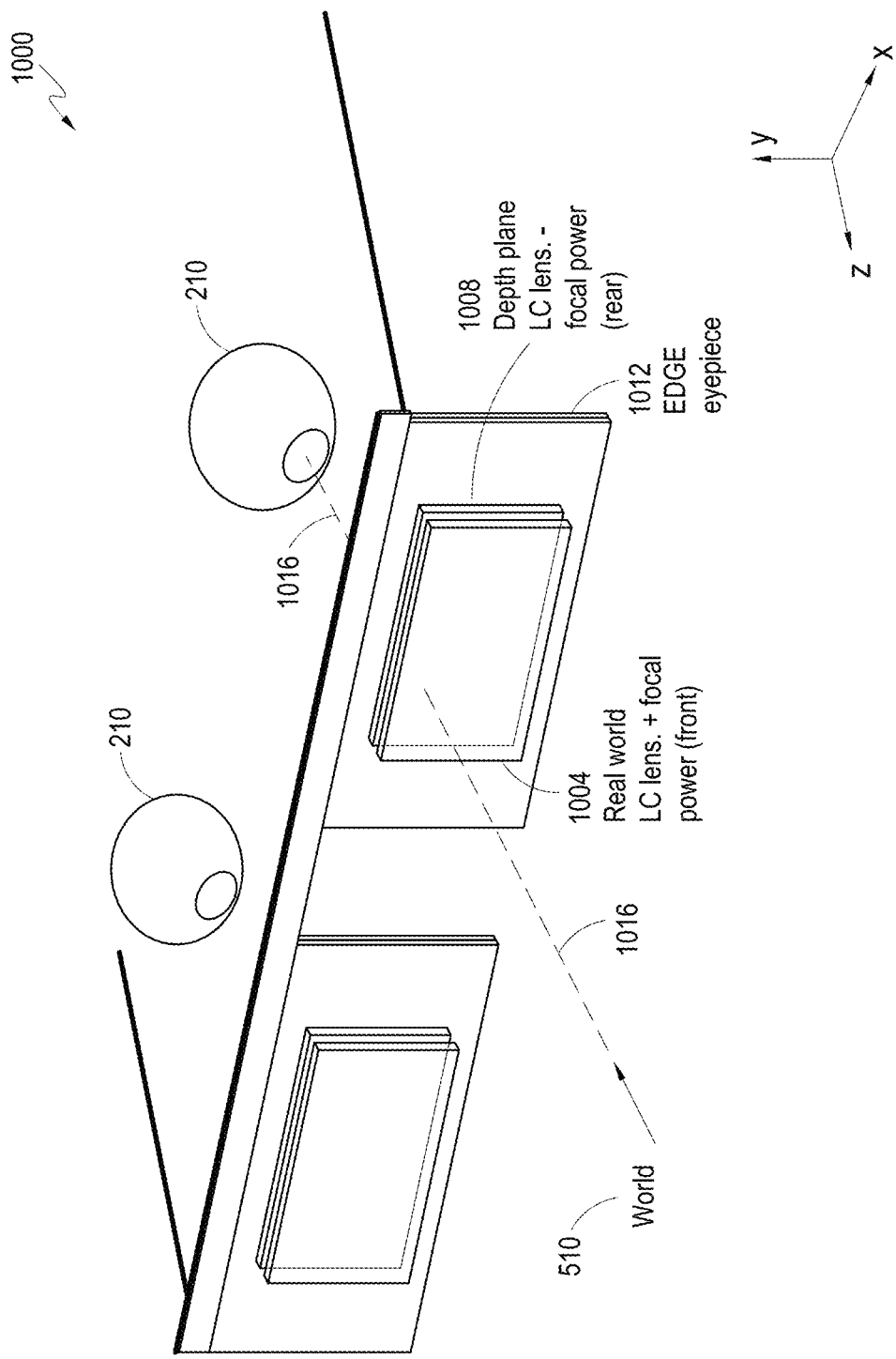
FIG. 10 illustrates an example of a display system comprising a pair of adaptive lens assemblies.

FIG. 10 illustrates an example of a display device 1000, e.g., a wearable display device, comprising one or more adaptive lens assemblies, e.g., a pair of adaptive lens assemblies 1004, 1008 in an optical path 1016 that are interposed by a waveguide assembly 1012. In some embodiments, the waveguide assembly 1012 may correspond to the waveguide stacks 260 or 660. As described herein, the waveguide assembly includes a waveguide configured to propagate light (e.g., visible light) under total internal reflection and to outcouple the light in an optical axis extending from (e.g., in a direction normal to) a light output surface of the waveguide. Preferably, the light output surface is the waveguide's major surface (e.g., the major surfaces of the waveguide may be understood to be the broad surfaces of the waveguide between which the thickness, e.g. the minimum dimension, of the waveguide extends). The light may be outcoupled by a diffraction grating in some embodiments. Each of the adaptive lens assemblies 1004, 1008 may be configured to at least partially transmit outcoupled light therethrough. As illustrated, each of the adaptive lens assemblies 1004, 1008 may be configured to receive outcoupled light from the waveguide assembly 1012 and to converge or diverge the outcoupled light in the optical axis direction. Each of the adaptive lens assemblies 1004, 1008 may comprise a waveplate lens and a switchable waveplate assembly, which may itself comprise first and second waveplate lenses interposed by a switchable waveplate. Each of the waveplates may be configured to alter a polarization state of the outcoupled light passing therethrough. The switchable waveplate may be configured to alter a polarization state of the outcoupled light passing therethrough when activated (e.g., electrically activated).

As used herein, an adaptive lens assembly, refers to a lens assembly having at least one optical property that may be adjusted, e.g., reversibly activated and deactivated, using an external stimulus. Example optical properties that may be reversibly activated and deactivated include, among other properties, optical power (focal length), phase, polarization, polarization-selectivity, transmissivity, reflectivity, birefringence and diffraction properties, among other properties. In various embodiments, adaptive lens assemblies are capable of varying the optical power and the polarization state of light passing therethrough by this selective application of an electric field.

In the illustrated embodiment, each of the pair of adaptive lens assemblies 1004, 1008 is configured to be electrically activated and deactivated, where, in a deactivated state, each of the adaptive lens assemblies 1004, 1008 provide a first optical power, while in an activated state, each of the adaptive lens assemblies 1004, 1008 provide a second optical power that is different than the first optical power. In addition, in some embodiments, one state, each of the adaptive lens assemblies 1004, 1008 alters a polarization state of light (e.g., visible light) passing therethrough, while in another state, each of the adaptive lens assemblies 1004, 1008 preserves a polarization state of the light passing therethrough.

Still referring to FIG. 10, the display device 1000 further comprises a waveguide assembly 1012 interposed between the pair of adaptive lens assemblies 1004, 1008. The waveguide assembly 1012 may be similar to the waveguide assembly 260 or 660 described above with respect to FIGS. 6 and 9A-9C, respectively. The waveguide assembly 1012 may comprise waveguides similar to waveguides 270, 280, 290, 300, 310 of FIG. 6 or waveguides 670, 680, 690 of FIGS. 9A-9C. As described herein, the waveguides may be configured to propagate light under total internal reflection in a lateral direction parallel across a major surface of the waveguide. The waveguide may further be configured to outcouple the light to output the light through the adaptive lens assembly 1008 to a user's eyes 210.

Still referring to FIG. 10, a first adaptive lens assembly 1004 of the pair of adaptive lens assemblies is disposed on a first side of the waveguide assembly 1012, e.g., the side of the world 510 observed by a user, and a second adaptive lens assembly 1008 of the pair of lens assemblies is disposed on a second side of the waveguide assembly 1012, e.g., the side closest to the eye 210 of the user. As described infra, the pair of adaptive lens assemblies as configured provides to a user virtual content from the waveguide assembly 1012 at a plurality of virtual depth planes, as well the view of the real world. In some embodiments, there is little or no distortion due to the presence of the adaptive lens assemblies. The virtual content and the view of the real world are provided to the user upon activation of the first and second adaptive lens assemblies 1004, 1008, as described infra with respect to FIGS. 11A and 11B.

Figures 11A, 11B:
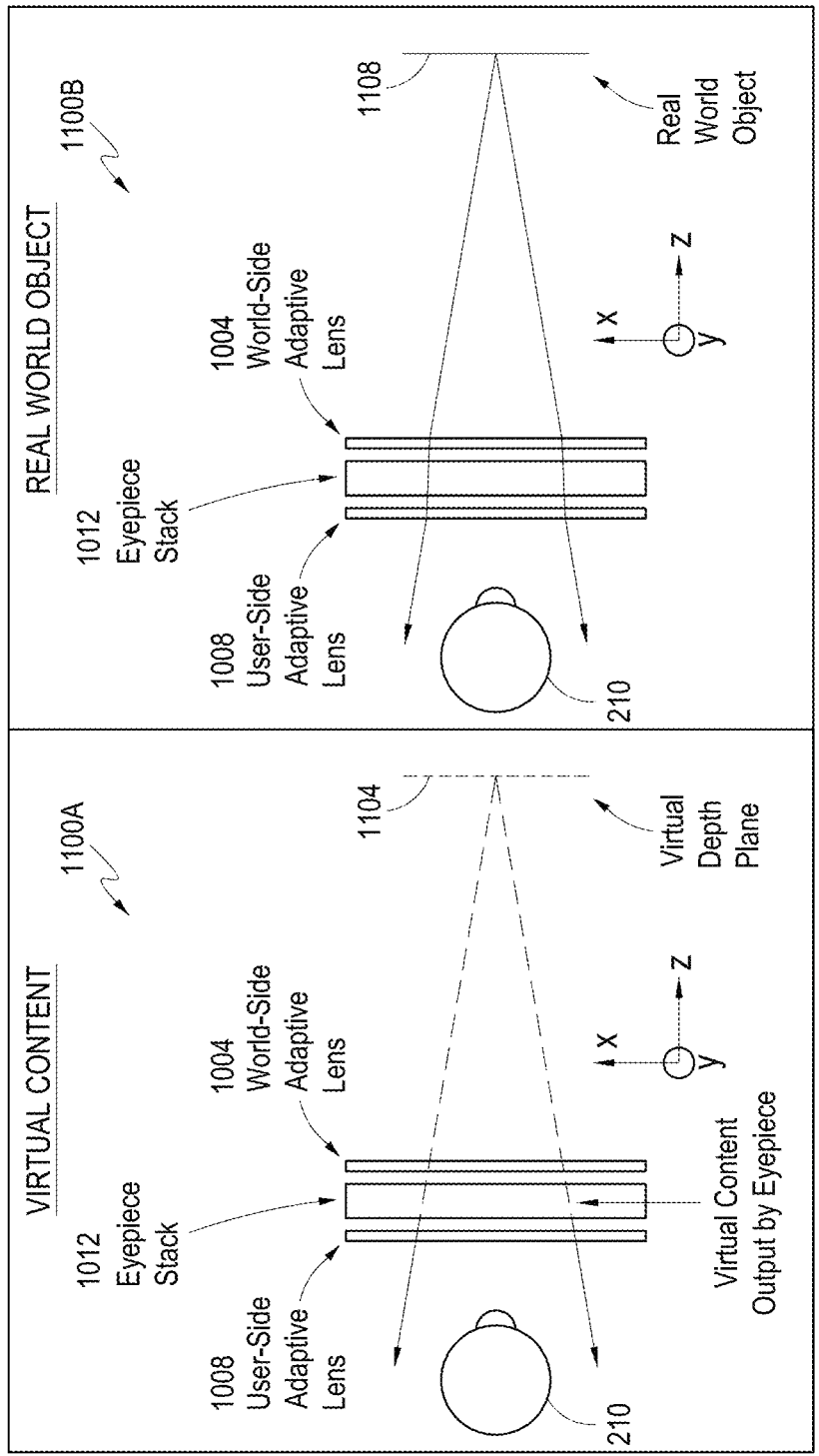
FIG. 11A illustrates an example of the display system of FIG. 10 displaying virtual content to a user at a virtual depth plane.
FIG. 11B illustrates an example of the display system of FIG. 10 providing a view of real world content to a user.

FIGS. 11A and 11B illustrate examples of display devices 1100A/1100B, each comprising adaptive lens assemblies in operation to output image information to a user. The display devices 1100A and 1100B in unpowered state may be structurally identical. The display device 1100A is used herein to illustrate outputting virtual image to the user, while the display device 1100B is used herein to illustrate transmitting a real world image through the display device 1100B to the user. The display device 1100A/1100B includes a pair of the adaptive lens assemblies 1004, 1008 that are configured to be electrically activated by, e.g., application of a voltage or a current. In some embodiments, in a deactivated state, e.g., when no voltage or current is applied, each of the first and second switchable lens assemblies 1004, 1008 has a low, e.g., about zero, optical power. In some embodiments, in an activated state, e.g., when a voltage or a current is applied, the first, world-side adaptive lens assembly 1004 on the side of the world may provide a first net optical power (Pnet1) having a first sign, e.g., a positive optical power. When in an activated state, the second, user-side adaptive lens assembly 1008 on the side of the user may provide a second net optical power (Pnet2) having a second sign, e.g., a negative optical power.

FIG. 11A illustrates an example of the display system of FIG. 10 displaying virtual content to a user at a virtual depth plane, according to some embodiments. As described herein, the waveguide assembly 1012 interposed between the pair of the adaptive lens assemblies 1004, 1008 comprises a waveguide configured to receive light containing virtual image information and propagate the light under total internal reflection. The waveguide assembly 1012 is further configured to outcouple the light through, e.g., a diffraction grating, towards the eye 210. The outcoupled light passes through the second adaptive lens assembly 1008 prior to entering the eye 210. When activated, the second adaptive lens assembly 1008 has a second net optical power, Pnet2, which may have a negative value, such that the user sees the virtual image at a virtual depth plane 1104.

In some embodiments, the second net optical power Pnet2 may be adjusted electrically to adjust the second net optical power (Pnet2) of the second adaptive lens assembly 1008, thereby adjusting the distance to the virtual depth plane 1104. For example, as a virtual object "moves" closer and further relative to the eye 210 within a virtual three-dimensional space, the second net optical power Pnet2 of the second adaptive lens assembly 1008 may be correspondingly adjusted, such that the virtual depth plane one 1104 adjusts to track the virtual object. Thus, the user may experience relatively little or no accommodation/vergence mismatch beyond an acceptable threshold. In some embodiments, the magnitude of the distance to the virtual depth plane 1104 may be adjusted in discrete steps, while in some other embodiments, the magnitude of the distance to the virtual depth plane 1104 may be adjusted continuously.

FIG. 11B illustrates an example of the display system of FIG. 10 providing a view of real world content to a user, according to some embodiments. When the second adaptive lens assembly 1008 is activated to have the second net optical power (Pnet2) to display the virtual content at the virtual depth plane 1104, light from the real world passing through the second adaptive lens assembly 1008 may also be converged or diverged according to Pnet2 of the activated second adaptive lens assembly 1008. Thus, objects in the real world may appear out of focus. To mitigate such distortion, according to some embodiments, when activated, the first and second adaptive lens assemblies 1004, 1008 may be configured to have optical powers having opposite signs. In some embodiments, light passing through the first and second adaptive lens assemblies 1004, 1008 converges or diverges according to a combined optical power having a magnitude that is about a difference between magnitudes of first and second net optical powers Pnet1, Pnet2, of the first and second adaptive lens assemblies 1004, 1008, respectively. In some embodiments, the waveguide assembly 1012 may also have optical power and the adaptive lens assembly 1008 may be configured to account for the distortions caused by both the lens assembly 1004 and the waveguide assembly 1012. For example, the optical power of the adaptive lens assembly 1008 may be opposite in sign to the sum of the optical powers of the lens assembly 1004 and the waveguide assembly 1012.

In some embodiments, the first adaptive lens assembly 1004 is configured to have the first net optical power Pnet1 that has a magnitude that is close to or the same as the magnitude of the second net optical power Pnet2 of the second adaptive lens assembly 1008. As a result, when both the first and second adaptive lens assemblies 1004, 1008 are activated simultaneously, objects in the real world appear relatively unaffected by the optical power of the second adaptive lens assembly 1008 provided for displaying the virtual content.

In some embodiments, first adaptive lens assembly 1004 may be configured such that when activated, the first net optical power Pnet1 dynamically matches the second net optical power Pnet2 of the second adaptive lens assembly 1008. For example, as the second net optical power Pnet1 of the second switchable assembly 1008 is adjusted to track moving virtual objects within the virtual three-dimensional space, the first net optical power Pnet1 of the first adaptive lens assembly 1004 may be dynamically adjusted, such that the magnitude of the combined optical power P=Pnet1+Pnet2 may be kept less than a predetermined value. Thus, according to embodiments, the objects in the real world may be prevented from being unacceptably out of focus by compensating the second net optical power (Pnet2) of the second adaptive lens assembly 1008, which may have a negative value, with the first net optical power (Pnet1) of the first adaptive lens assembly 1004, such that the combined optical power P=Pnet1+Pnet2 remains small, e.g., near about 0 m$^{-1}$.

FIG. 12 illustrates an example of a display device 1500 comprising a pair of adaptive lens assemblies each comprising adaptive lens subassemblies comprising waveplate lenses and switchable waveplates. Each of the first and second adaptive lens assemblies 1504, 1508 comprises a plurality of waveplate lenses, e.g., first to third waveplate lenses 1308-1, 1308-2, 1308-3, that are alternately stacked with a plurality of switchable waveplate assemblies, e.g., first to third switchable waveplate assemblies 1312-1, 1312-2, 1312-3. The waveplate lenses 1308-1, 1308-2, 1308-3 and neighboring switchable waveplate assemblies 1312-1, 1312-2, 1312-3, form subassemblies 1504-1, 1504-2, 1504-3, respectively. Each of the plurality of switchable waveplate assemblies 1312 may be independently activated using a switching circuit. In some embodiments, electrically activating different ones of switchable waveplates diverges or converges the light passing through the adaptive lens assembly according to different net optical powers having magnitudes that are about sums of magnitudes of optical powers of immediately adjacent waveplate lenses interposed by the different ones of switchable waveplate assemblies.

Advantageously, by selecting different ones of one or more of the subassemblies 1508-1, 1508-2, 1508-3 in the second adaptive lens assembly 1508, virtual images at different depth planes may be displayed to a user, and by additionally selecting different corresponding ones of the subassemblies 1504-1, 1504-2, 1504-3 in the first adaptive lens assembly 1504, defocusing or distortion of real world images that may result from the optical powers of the subassemblies 1508-1, 1508-2, 1508-3 may be compensated or reduced.

Adaptive Lens Assemblies With Fixed Lenses

In the example display devices described above including adaptive lens assemblies, the adaptive lens assemblies included waveplate lenses and switchable waveplates that have, among other advantages, reducing the number of waveguides, which in turn reduces the overall device weight and thickness. In some embodiments, additional fixed lenses may be stacked on the one or more adaptive lens assemblies. Advantageously, the additional lenses provide various possible benefits. For example, under some circumstances, such lenses may be provided to add additional optical power. In addition, some users using wearable display devices according to some embodiments, such as the wearable device 1000 described with respect to FIG. 10, have eyes with refractive errors that prevent light from correctly focusing on their eyes' retinas. In some embodiments, the additional lens elements may be configured to provide a particular prescription optical power to allow the user to clearly view the image information projected by the display and/or transmitted through the display from the real world. In addition, the additional lenses may be provided with surfaces having curvatures to better conform the device to the user's facial contours, to integrate better with normal frames for eyewear, and/or for provide more aesthetically pleasing appearance the display device.

Figure 13A:
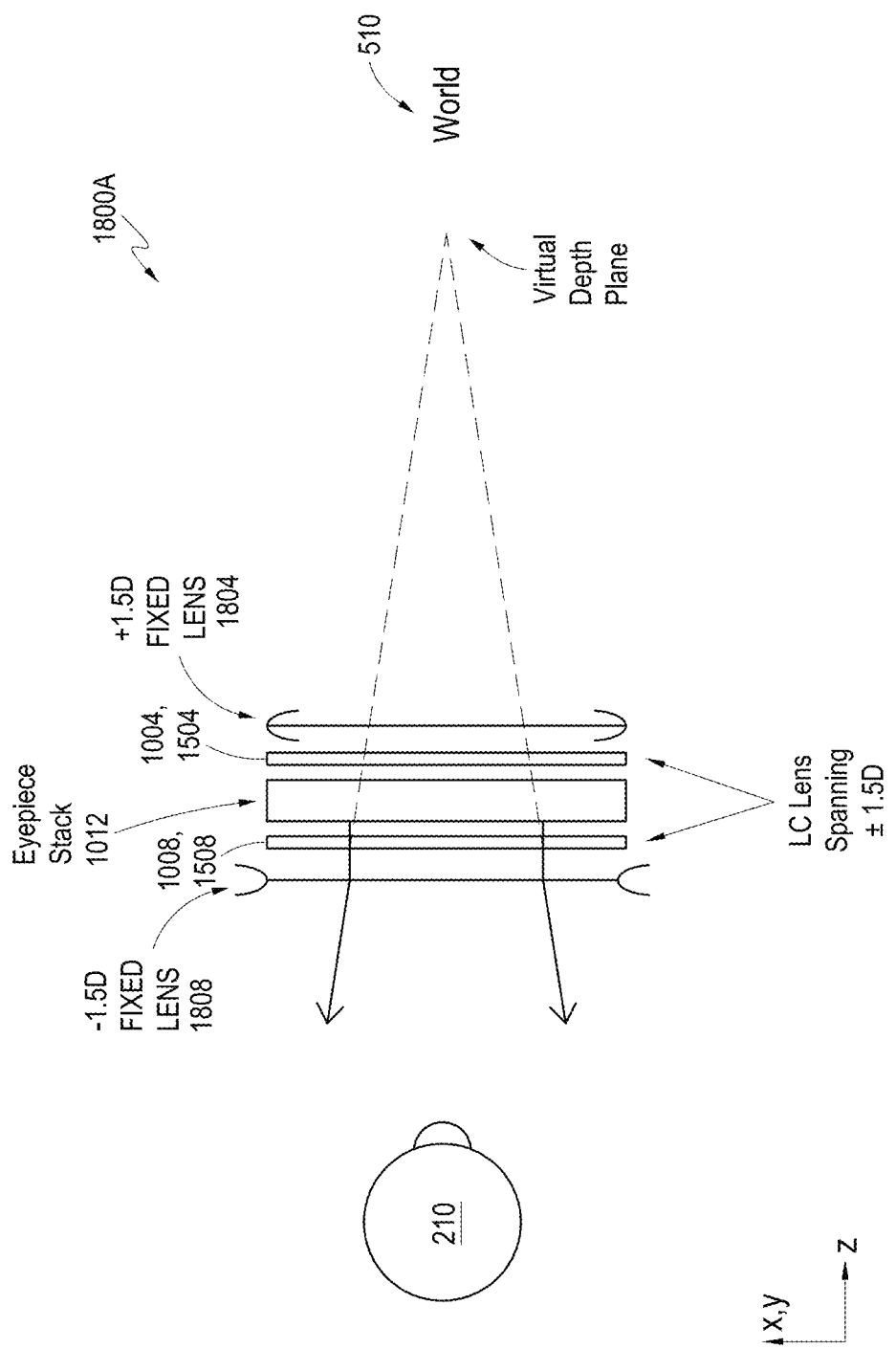

FIGS. 13A and 13B illustrate a display device comprising a pair of adaptive lens assemblies and a pair of fixed lenses, according to some embodiments. As discussed above, the display device 1800A/1800B comprises a pair of adaptive lens assemblies (e.g., 1504, 1508 in FIG. 12) and a waveguide assembly 1012 interposed between the pair of the adaptive lens assemblies, where the waveguide assembly comprises a waveguide configured to propagate light under total internal reflection and to outcouple the light into one of the pair of the adaptive lens assemblies (including 1005, 1504 on one side and 1508, 1008 on the other side) to display virtual content at a plurality of virtual depth planes.

As discussed above, under some circumstances, it may be desirable to add additional fixed lenses, e.g., corrective lenses, to allow the user to see more clearly. In some embodiments, a first fixed focus lens element 1808 may be provided between the waveguide assembly 1012 and the viewer's eye 210. The addition of the first fixed focus lens element may provide appropriate adjustment, to adjust the light outcoupled from the waveguide assembly 1012, which may include virtual content, to be correctly focused for the viewer's eye 210. The first fixed lens element 1808, however, is also in the path of light propagating from the world 510 to the viewer's eye 210. As a result, the first lens element may modify the light from the surrounding environment, thereby causing aberrations in the viewer's view of the world. To correct such aberrations, a second fixed focus lens element 1804 may be disposed on the opposite side of waveguide assembly 1012 from the first variable focus lens element 1808. The second fixed focus lens element 1804 may be configured to compensate for aberrations caused by the first fixed focus lens element 1808.

In some embodiments, the focus of the second fixed focus lens element 1804 may be inverse or opposite the focus of the first fixed focus lens element 1808. For example, if the first fixed focus lens element 1808 has a positive optical power, then the second fixed focus lens element 1804 may have a negative optical power, and vice versa, which may be of similar magnitude in some embodiments.

In some embodiments, the display device 1800A/1800B without the fixed focus lens elements 1804, 1808, may not have sufficient optical power, and the first variable focus lens elements may be configured to provide the appropriate amount of additional divergence to the light for image information to be interpreted by the viewer as being on a particular depth plane.

It will be appreciated that the first and second fixed focus lens elements 1804, 1808 may be provided for one of the viewer's eyes, and that third and fourth fixed focus lens elements (not shown) that are similar to the first and second fixed focus lens elements (but possibly with different optical powers), respectively, may be provided for the other of the viewer's eyes.

In various embodiments, each of the first and second fixed focus lens elements may provide a net optical power (positive or negative) in the range between about ±5.0 diopters and 0 diopters, ±4.0 diopters and 0 diopters, ±3.0 diopters and 0 diopters, ±2.0 diopters and 0 diopters, ±1.0 diopters and 0 diopters, including any range defined by these values, for instance ±1.5 diopters.

In some embodiments, such as illustrated in FIGS. 13A and 13B, the optical power of the first fixed focus lens element 1804, which may be, e.g., a concave or a plano-concave lens, has a positive value, and the optical power of the second fixed focus lens element 1808, which may be, e.g., a convex or a plano-convex lens, has a negative value, such that the optical powers of the first and second focus lens elements 1804, 1808 compensate for each other. However, in some other embodiments, the optical power of the second fixed focus lens element 1808 may have a positive value, and the optical power of the first fixed focus lens element 1804 may have a negative value, such that the optical powers of the first and second fixed focus lens elements 1804, 1808 compensate each other.

Figure 14:
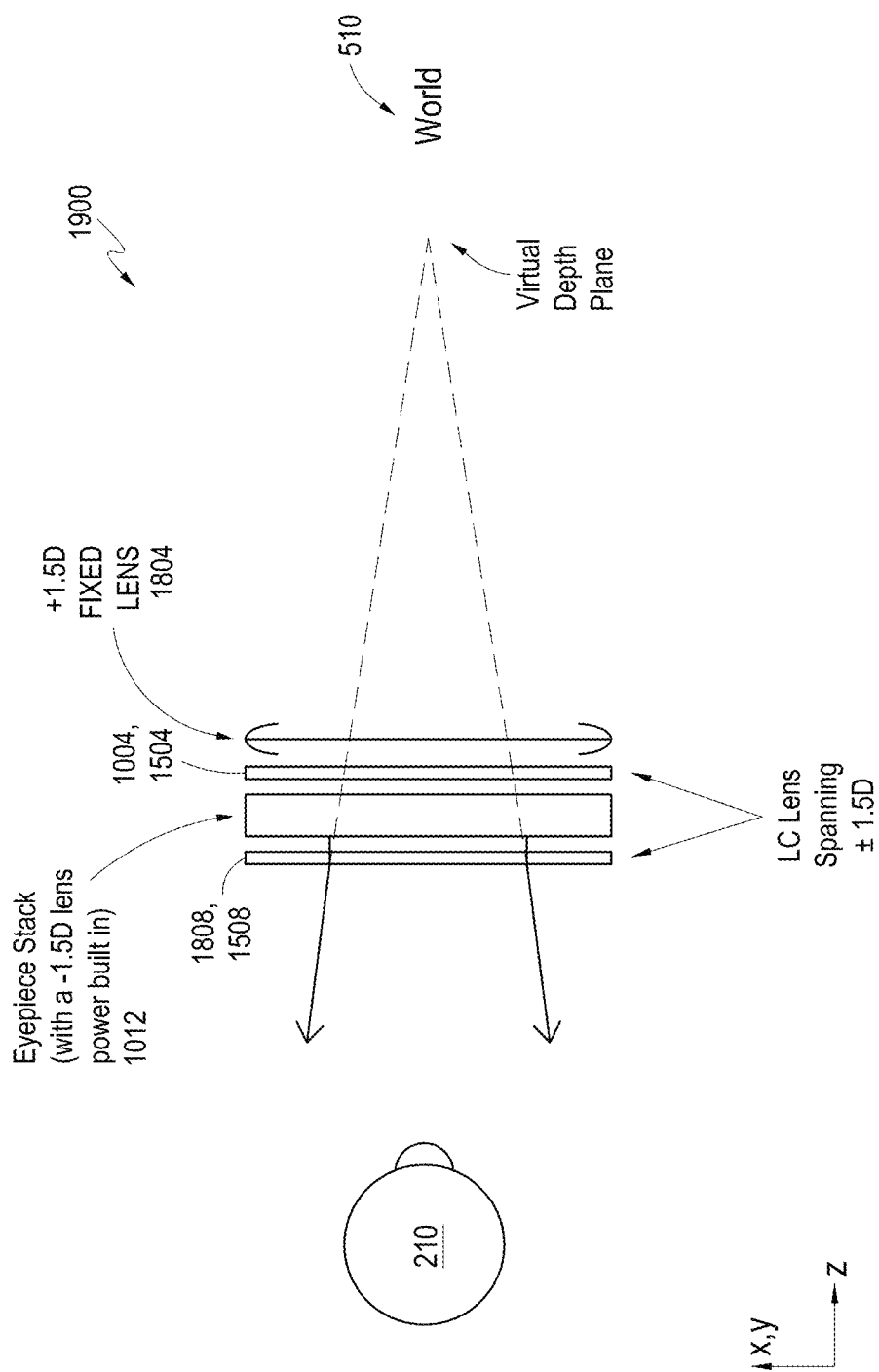
FIG. 14 illustrates an example of a display device comprising a pair of adaptive lens assemblies and a fixed lens.

FIG. 14 illustrates a display device 1900 according to some other embodiments. Similar to the display device 1800A/1800B described above with respect to FIGS. 13A, 13B, the display device 1900 includes a pair of adaptive lens assemblies (e.g., 1504, 1508 in FIG. 12) and a waveguide assembly 1012 interposed between the pair of the adaptive lens assemblies. However, unlike the display device 1800A/1800B of FIGS. 13A, 13B, to adjust the light outcoupled from the waveguide assembly 1012, which may include virtual content, to be correctly focused for the viewer's eye 210, the waveguide assembly 1012 may be configured to have a built-in optical power instead of having a first fixed focus lens element 1808 between the waveguide assembly 1012 and the viewer's eye 210. Similar to the display device 1800A/1800B described above, the built-in optical power in the waveguide assembly 1012 may modify the wavefront of the light from the surrounding environment and, thereby cause aberrations in the viewer's view of the world. To correct such aberrations, a fixed focus lens element 1804 similar to the second fixed focus lens element 1804 described above with respect to FIGS. 13A, 13B may be disposed between the world and the waveguide assembly 1012. The fixed focus lens element 1804 may be configured to compensate for aberrations caused by the built-in optical power in the waveguide assembly 1012, similar to the compensating mechanism described above with respect to FIGS. 13A, 13B. In some embodiments, the built-in optical power in the waveguide assembly 1012 may have a negative value, and the optical power of the fixed focus lens element 1804 may have a positive value, such that the optical powers of the waveguide assembly and the fixed focus lens element compensate each other. Various characteristics of the fixed focus lens element 1804 are similar to those described above with respect to FIGS. 13A, 13B.

It will be appreciated that, in the embodiment illustrated in FIG. 14, while the fixed focus lens element 1804 is disposed between the world 510 and the waveguide assembly 1012, other embodiments are possible. For example, a fixed focus lens element 1808 may be disposed between the eye 210 and the waveguide assembly 1012, similar to the first fixed focus lens element 1808 described above with respect to FIGS. 13A, 13B. In these embodiments, the built-in optical power in the waveguide assembly 1012 may have a positive value, and the optical power of the fixed focus lens element 1808 may have a negative value, such that the optical powers of the waveguide assembly and the fixed focus lens element compensate for each other (e.g., sum to substantially 0).

Switchable Variable Focus Element Components

Figure 15:
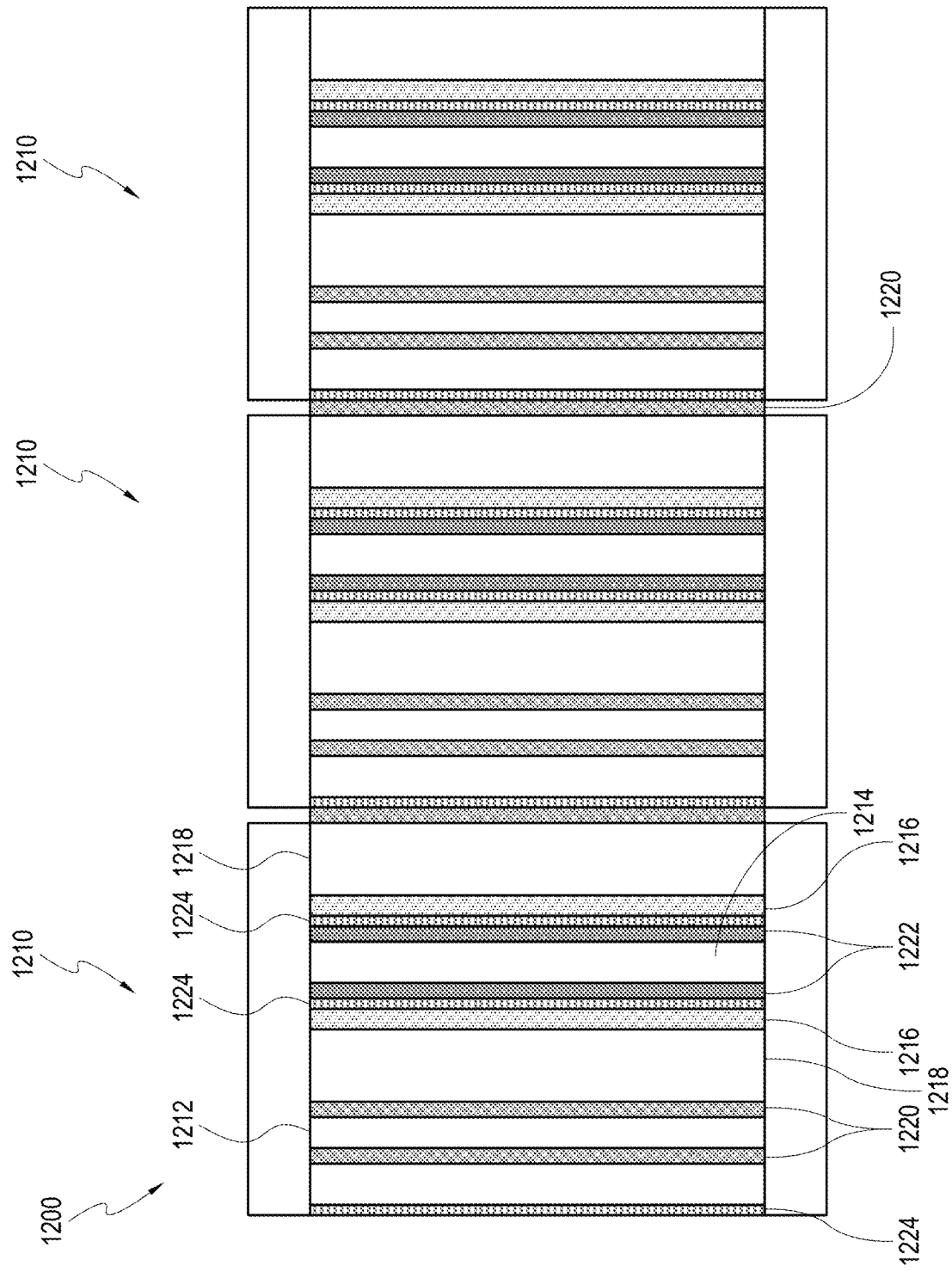
FIG. 15 illustrates an example adaptive lens assembly comprising three adaptive lens layers.

FIG. 15 illustrates an example adaptive lens assembly 1200 comprising three adaptive lens subassemblies 1210. The adaptive lens assembly 1200 may be, for example, a front lens assembly 1004, 1504 or back lens assembly 1008, 1508 as shown in FIGS. 10-12. Each layer 1210 includes a waveplate lens 1212 and a switchable liquid crystal layer 1214. Conductive layers 1216, such as one or more conductive wires or mesh layers, are included within each some assembly 1210 for selective switching of the switchable liquid crystal layer 1214. In some proposed configurations, the subassemblies 1210 may require additional support substrates 1218 and alignment layers 1222. Adhesive 1220 and further coating layers 1224 (e.g., antireflective layers) are provided between various layers and between lens layers 1210. It will be appreciated that the presence of multiple support substrates 1218 and alignment layers 1222 can significantly increase the weight and thickness of the adaptive lens assembly 1200. Thus, thinner and lighter adaptive lens assembly structures may be desirable.

Figure 16A:
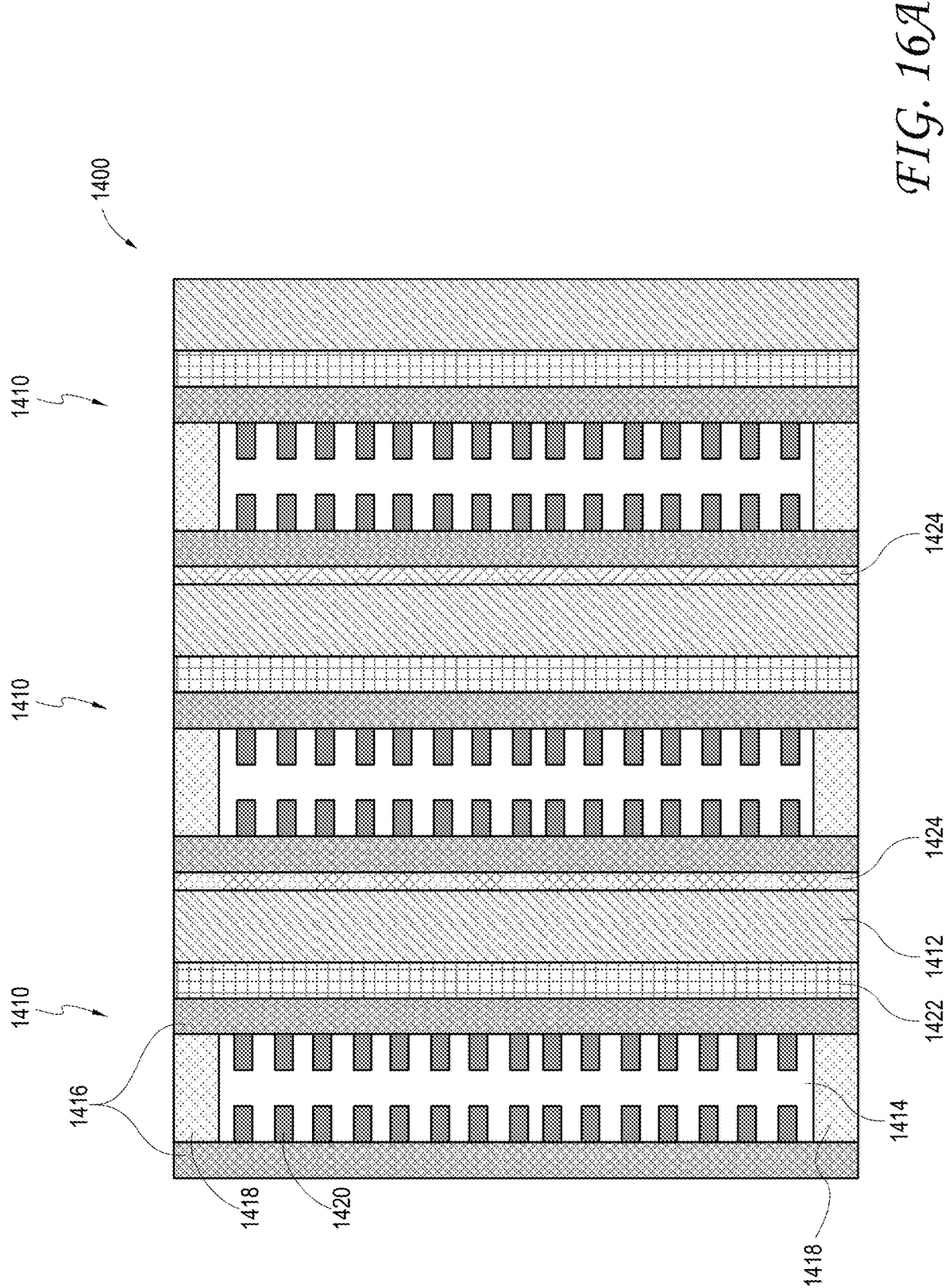
FIGS. 16A and 16B illustrate further example adaptive lens assemblies each comprising three adaptive lens layers.
Figure 16B:
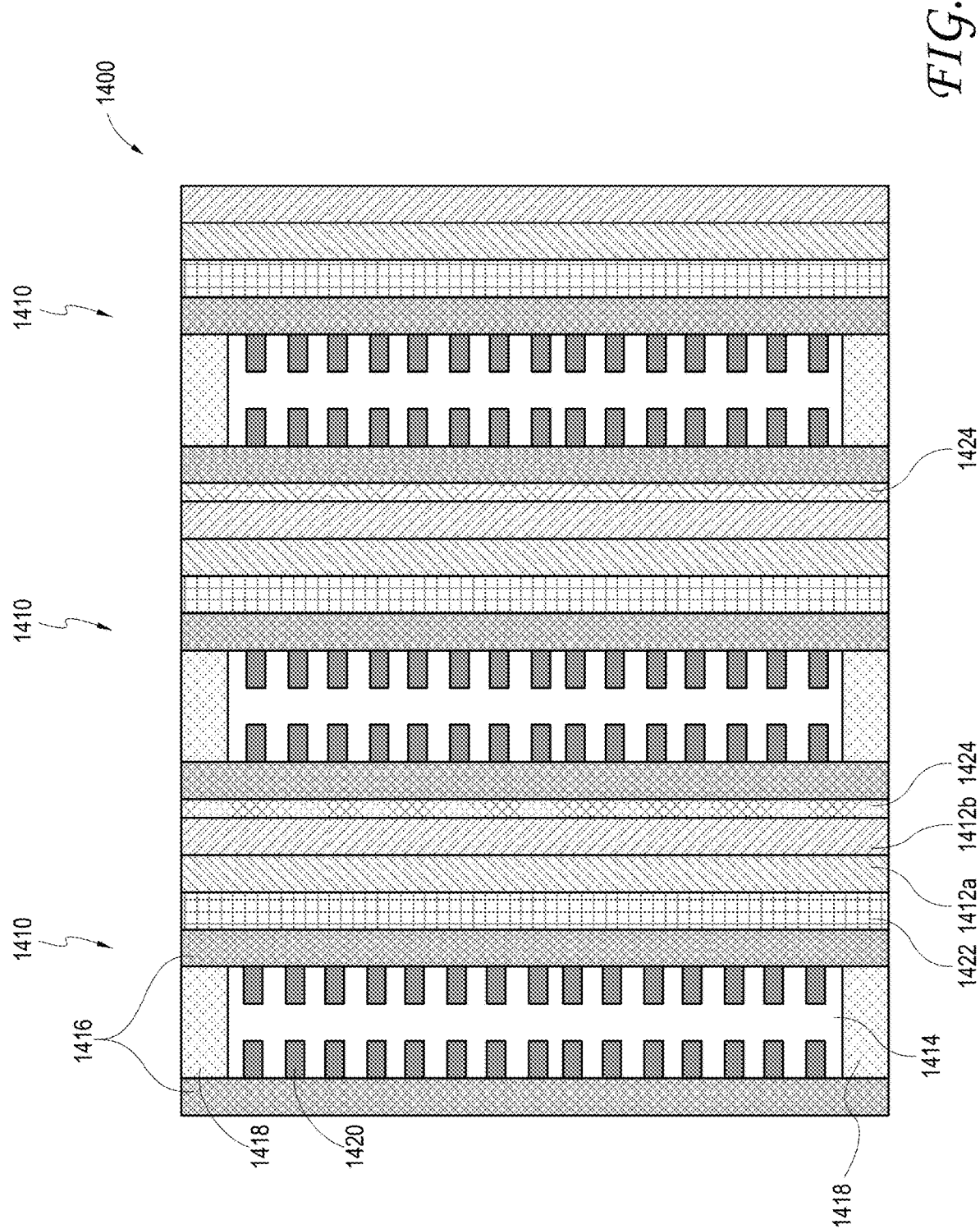

FIGS. 16A and 16B illustrate example adaptive lens assemblies 1400 each comprising three adaptive lens subassemblies according to various embodiments. Advantageously, the adaptive lens assembly 1400 has a simplified structure relative to the adaptive lens assembly 1200 of FIG. 15. In some embodiments, the structures shown in FIGS. 16A and 16B may advantageously provide adaptive lens assemblies that are thinner and lighter than existing adaptive lens assemblies, and may be manufactured more efficiently. The illustrated adaptive lens assemblies 1400 depicted in FIGS. 16A and 16B each include three adaptive lens subassemblies 1410. However, it will be appreciated that the adaptive lens assemblies 1400 may be implemented with fewer than three adaptive lens subassemblies (e.g., one or two subassemblies) or more than three adaptive lens subassemblies (e.g., four, five, six, or more subassemblies). It will be appreciated that the adaptive lens assemblies 1400 may correspond to the lens assemblies 1004, 1504, 1008, 1508 of FIGS. 10-14, such that the adaptive lens assemblies 1400 may be utilized in place of the lens assemblies 1004, 1504, 1008, 1508.

With continued reference to FIGS. 16A and 16B, the adaptive lens assembly 1400 includes three adaptive lens subassemblies 1410 coupled by adhesive layers 1424 (e.g., comprising an index-matches adhesive). Each adaptive lens subassembly 1410 includes at least one waveplate lens 1412, 1412*a*, 1412*b*. For example, FIG. 16A depicts adaptive lens subassemblies 1410 including a single waveplate lens 1412, while FIG. 16B depicts adaptive lens subassemblies 1410 including a first waveplate lens 1412*a* and a second waveplate lens 1412*b*. The multiple-lens configuration shown in FIG. 16B may be desirable where the lenses 1412*a*, 1412*b* are of a type that affect only a subset of wavelengths. Thus, a plurality of adjacent lenses 1412*a*, 1412*b* can be combined to form a system that will provide the desired optical power over a larger wavelength range.

Each adaptive lens subassembly 1410 further includes a switchable waveplate assembly comprising two quarter-wave plates 1416 and switching cell walls 1418 that define a closed volume between the quarter-wave plates 1416. Preferably, the quarter-wave plates 1416 are formed of optically transmissive material that is pliable (allowing the quarter-wave plates 1416 to be rolled and unrolled), mechanically stable, and sufficiently inelastic for use in roll-to-roll processing as disclosed herein. Preferably, the material does not comprise liquid crystal. Examples of suitable materials for the quarter-wave plates 1416 include plastic (polymer) sheets, such as polycarbonate or the like.

The quarter-wave plates 1416 and the switching cell walls 1418 enclose a switching medium 1414 (e.g., a liquid crystal material) and a conductive material 1420 (e.g., wires, a conductive mesh, etc.). In some embodiments, the conductive material 1420 is an indium tin oxide (ITO) layer, which may be patterned into a pattern of electrodes. An alignment layer may be provided between the switchable waveplate assembly and the waveplate lenses 1412, 1412*a*, 1412*b*. The alignment layer may include one or more alignment structures for proper vertical, horizontal, and/or rotational alignment of the adaptive lens subassembly 1410. Alternatively, in some embodiments, the alignment layer 1422 may be omitted, and one or more alignment structures may be added to and/or imprinted into the surface of the adjacent quarter-wave plate 1416 and/or lens 1412, 1412*a*.

Relative to the adaptive lens subassemblies 1210 depicted in FIG. 15, the adaptive lens subassemblies 1410 depicted in FIGS. 16A and 16B may advantageously have fewer component layers. The quarter-wave plates 1416 may provide sufficient structural support to each lens subassembly 1410 such that additional support substrates 1218 (FIG. 15) are not necessary. In addition, the switchable waveplate of adaptive lens subassemblies 1410 includes the conductive material 1420 within the space occupied by the switchable waveplate layer 1414 (e.g., liquid crystal layer) in the form of a mesh or wires integrated with the quarter-wave plates 1416 such that additional conductive layers 1216 (FIG. 15) are not necessary. As a non-limiting example of the advantageously thin adaptive lens assemblies described herein, the adaptive lens assembly 1400 depicted in FIG. 16B may have an overall thickness between 1 mm and 3 mm, such as approximately 1.3 mm. For example, each quarter-wave plate may have a thickness of between 100 microns and 300 microns (e.g., 200 microns), each switching cell wall 1418 may have a thickness of between 5 and 20 microns (e.g., 10 microns), each waveplate lens 1412*a*, 1412*b* may have a thickness of between 1 and 5 microns (e.g., 2 microns), and each alignment layer, if present, may have a thickness of less than 100 nm (e.g., between 20 nm and 30 nm). Thus, each adaptive lens subassembly 1410 may have a thickness of approximately 414 microns. Adhesive layers 1424 may each have a thickness of between 10 and 50 microns (e.g., 20 microns), such that the adaptive lens assembly 1400 has a total thickness of approximately 1.3 mm.

Variable Focus Element Manufacturing Methods and Apparatus

FIGS. 17A-17E illustrate an example process of manufacturing an adaptive lens assembly such as the adaptive lens assembly 1400 described with reference to FIGS. 16A and 16B. It will be appreciated that individual portions of the process may be added or omitted without departing from the scope of the present disclosure. As will be described in greater detail, the process may generally include forming a quarter-wave plate substrate 1430 and a lens substrate 1440 (which may be formed by adding lens layers to an existing quarter-wave plate substrate 1430), and combining the quarter-wave plate substrate 1430 with the lens substrate 1440 to form an adaptive lens subassembly 1410 with an interstice, or volume, enclosing the switchable liquid crystal layer 1414 of FIGS. 16A and 16B. A plurality of adaptive lens subassemblies 1410 may then be combined (e.g., adhered together of an index-matched adhesive layer) in a stack to form an adaptive lens assembly 1400.

As shown in FIG. 17A, the conductive material 1420 can be formed on each quarter-wave plate 1416 as a mesh and/or an array of wires (e.g., parallel wires) to form a quarter-wave plate substrate 1430. For example, the conductive material 1420 can be formed directly on each quarter-wave plate 1416 by a process including one or more of imprinting, deposition, etching, sputtering, and/or washing. Various methods for forming a pattern of conductive material 1420 are discussed further herein, e.g., regarding FIGS. 21A-27D. In addition, methods for forming the pattern of conductive material 1420 are also disclosed in U.S. patent application Ser. No. 15/683,706, filed Aug. 22, 2017, the entire disclosure of which is incorporated herein by reference. In some embodiments, a metal layer may be deposited on the quarter-wave plate substrate 1430, and then patterned to define electrodes forming an electrode pattern on the surface of the substrate 1430. In various embodiments, the conductive material 1420 may be formed onto sheets of quarter-wave plate substrate, singulated quarter-wave plate layers, and/or larger rolls of quarter-wave plate substrate (e.g., in a roll-to-roll manufacturing process). In some embodiments, the orientation, size, spacing, or other aspects of the conductive layer can be selected such that the wires form an alignment guide for the liquid crystal layer 1414 (FIGS. 16A, 16B). Additional surface features may further be imprinted into the quarter-wave plate substrate to further guide the alignment of the liquid crystal molecules in the liquid crystal layer 1414 in some embodiments. In some embodiments, the substrate supplied on the first roller may include a previously-formed pattern of electrodes on a backside of the substrate. Additional methods of forming features on substrates are also disclosed in U.S. patent application Ser. No. 15/990,155, filed May 25, 2018, the entire disclosure of which is incorporated herein by reference.

FIG. 17B depicts a further step in the example manufacturing process. As shown in FIG. 17B, the quarter-wave plate 1416 has been provided with an alignment layer 1422, a first waveplate lens 1412a, and a second waveplate lens 1412b to form a lens substrate 1440. In some embodiments, the alignment layer 1422 may include one or more alignment features printed onto the side of the quarter-wave plate 1416 opposite the electrodes or conductive material 1420. After the alignment layer 1422 and/or other alignment structures are created on the surface of the quarter-wave plate 1416, the first waveplate lens 1412a and the second waveplate lens 1412b are formed. For example, each lens 1412a, 1412b may be formed by depositing a layer (e.g., by a slot die or other deposition apparatus) of liquid crystal and curing each layer to polymerize the liquid crystal and form the waveplate lens 1412a, 1412b. It will be appreciated that alignment structures of the alignment layer 1422 and/or alignment structures on the surface of the quarter-wave plate 1416 aid in the alignment of liquid crystal molecules in the first waveplate lens 1412a. The alignment of the crystals may then be retained (e.g., via polymerization of the liquid crystal molecules) when the first lens 1412a is cured, such as by ultraviolet (UV) irradiation and/or heat. The second lens 1412b may similarly be applied in a flowable form and cured using UV irradiation and/or heat.

As shown in FIG. 17C, the switching cell walls 1418 may further be added onto the lens substrate 1440 on the side comprising the conductive material 1420. For example, the cell walls 1418 may comprise an inkjet-printable material such that the cell walls 1418 can be printed onto the quarter-wave plate 1416 by inkjet printing. In some embodiments, further spacing structures may be added at locations between the cell walls 1418 to maintain substrate spacing along all locations between the cell walls 1418. For example, the spacing structures may be inkjet printed the same or different material used to print the cell walls 1418. Additionally, during an inkjet printing phase, a conductive material may be printed to interconnect the conductive material 1420. For example, if the conductive material 1420 comprises an array of parallel wires, one or more lines of conductive inkjet-printable material may be printed perpendicular or at an angle to the parallel wires such that the conductive material 1420 is interconnected and can effectively apply a voltage difference across the liquid crystal layer 1414 depicted in FIGS. 16A and 16B. In an example manufacturing process, the components shown in FIG. 17B may be formed in a roll-to-roll process, and cut into sheets before printing the cell walls 1418 as shown in FIG. 17C.

As shown in FIG. 17D, a quarter-wave plate substrate 1430 is coupled to a lens substrate 1440 to complete the adaptive lens subassembly 1410. The interstice created between the quarter-wave plate substrate 1430 and the lens substrate 1440 is filled with the liquid crystal material. For example, the lens substrate 1440 may be placed in a horizontal orientation. The liquid crystal material may be dispensed onto the lens substrate 1440 such that at the space between the cell walls 1418 is filled with liquid crystal material. The quarter-wave plate substrate 1430 may then be glued or otherwise secured into place against the lens substrate 1440 to retain the liquid crystal material. Preferably, the adaptive lens subassembly 1410 is formed such that no air is retained with the liquid crystal material. For example, the filling and assembly may be performed in a vacuum and/or the space for the liquid crystal may be overfilled and a vent provided in at least one cell wall 1418, such that the space between the quarter-wave plates 1416 is substantially filled with switching medium and substantially free of air. In some other embodiments, the lens substrate 1440 and the quarter-wave plate substrate 1430 may be adhered together to form an open volume, after which liquid crystal is introduced to fill the volume. While the cell walls 1418 are shown as being printed onto the lens substrate 1440, in some embodiments the cell walls 1418 may be printed onto the quarter-wave plate substrate 1430 rather than the lens substrate 1440, and the filling and assembly step may be performed with the lens substrate 1440 placed atop the quarter-wave plate substrate. In some embodiments, portions of the cell walls 1418 may be printed on both the quarter-wave plate substrate 1430 and the lens substrate 1440.

After the adaptive lens subassembly 1410 is formed, it may be laminated with one or more additional adaptive lens subassemblies 1410 to form an adaptive lens assembly 1400 comprising a stack of adaptive lens subassemblies 1410 as shown in FIG. 17E. Each pair of adaptive lens subassemblies 1410 may be coupled together by an adhesive layer 1424. It will be appreciated that the relative orientations of the waveplate relative to one another impact the optical properties of the subassemblies 1410 and the larger adaptive lens assembly 1400. Preferably, when coupling adaptive lens subassemblies 1410 together, it may be desirable to align each lens subassembly 1410 with the adjacent lens subassembly 1410, for example, with a precision of within approximately 100 microns laterally in x and y dimensions, and with approximately 0.1 mrad of rotation.

Figure 18A:
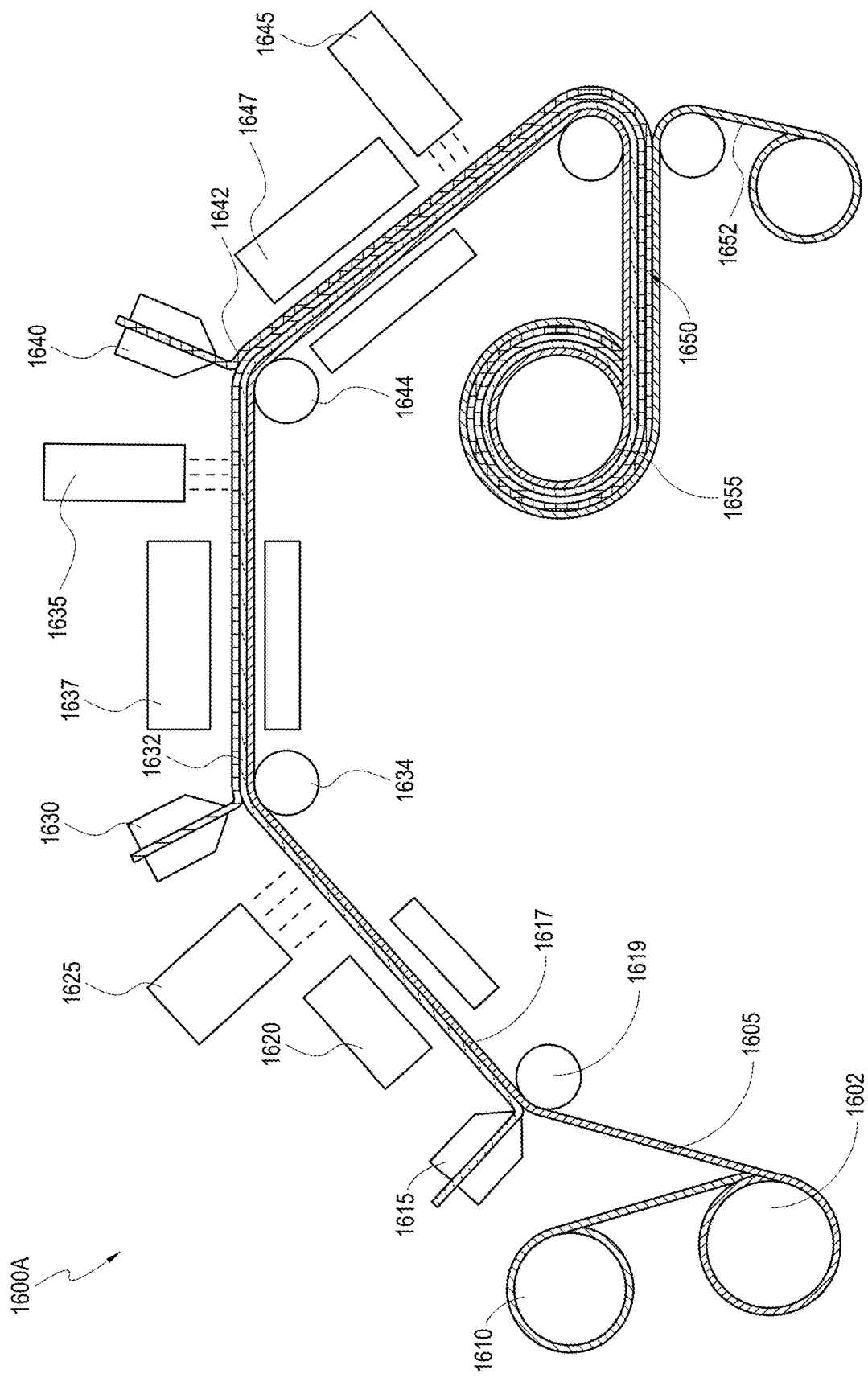
FIG. 18A illustrates an example apparatus for roll-to-roll manufacturing of a lens substrate with an optical alignment process for an adaptive lens assembly.

FIG. 18A illustrates an example apparatus for roll-to-roll manufacturing of a lens substrate with an optical alignment process for an adaptive lens assembly. The lens substrate 1650 formed by the apparatus 1600A may be, for example, the lens substrate 1440 depicted in FIG. 17B. The apparatus 1400A is configured to receive a supply substrate 1605 in the form of a supply substrate roll which may be disposed around a roller 1602 and produce the lens substrate 1650, which may similarly be in the form of a lens substrate roll 1655 for further processing. In some embodiments, the supply substrate may have a composition and/or cross-sectional profile consistent with the quarter-wave plate substrate 1430 depicted in FIG. 17A.

The supply substrate roll 1602 may include the supply substrate 1605 with a protection film 1610. The protection film 1610 may be removed before further layers are applied. An alignment slot die 1615 applies an alignment layer 1617, which may comprise a light-sensitive material such as a resist material (e.g., a photoresist such as a positive photo resist or a negative photoresist), or a holographic medium onto which a holographic recording can be made. The supply substrate 1605 may travel over an alignment application roller 1619 in the vicinity of the alignment slot die 1615 (e.g., the alignment application roller 1619 may be located directly below or nearly below the alignment slot die 1615). The alignment application roller 1619 may stabilize the supply substrate 1605 as it travels under the alignment slot die 1615 to ensure an even coating of the alignment layer 1617 onto the supply substrate 1605. The alignment layer 1617 on the supply substrate 1605 may include solvents, which may be at least partially removed, by e.g. heating in an oven 1620, irradiation, or other solvent removal method, to prepare the alignment layer 1617 for subsequent processing. As used herein, it will be appreciated that an oven is a device that provides thermal energy to heat an object. After solvents are removed from the alignment layer 1617, an optical aligner 1625 creates an alignment pattern in the alignment layer 1617. For example, the optical aligner 1625 may create a pattern using various lithography techniques, such as direct write (maskless) lithography, photolithography using an optical mask and/or a large exposure lens, optical master lens, or the like. In some embodiments, the alignment layer 1617 may be a holographic medium and the optical aligner 1625 may direct light onto that medium to make a direct holographic recording. In some embodiments, the substrate 1605 and alignment layer 1617 may be stationary while the optical aligner 1625 produces the alignment pattern in the alignment layer 1617.

After the alignment layer is imprinted and cured, a first lens slot die 1630 applies a first waveplate lens layer 1632 on the alignment layer 1617. A first waveplate lens application roller 1634 may be provided to stabilize the supply substrate 1605 and alignment layer 1617 as they travel under the first lens slot die 1615 to ensure an even coating of the first waveplate lens layer 1632 onto the alignment layer 1617. In some embodiments, the first waveplate lens layer 1632 comprises liquid crystal. Liquid crystal molecules of the liquid crystal layer may assume an alignment determined at least in part by patterns and/or structures in the alignment layer 1617 adjacent to the first waveplate lens layer 1632. Solvents present in the first waveplate lens layer may be removed by drying and/or by passing the substrate through an oven 1637 or other heat source. An ultraviolet (UV) light source subsequently irradiates the first waveplate lens layer 1632 with UV light to cure the first waveplate lens layer 1632, which may polymerize the liquid crystal molecules to lock in the orientations of these molecules.

After the first waveplate lens layer 1632 is deposited and cured, an optional second waveplate lens layer 1642 may be added. A second waveplate lens slot die 1640 deposits the second waveplate lens layer 1642 as a liquid crystal polymer. A second lens application roller 1644 may be provided to stabilize the supply substrate 1605, alignment layer 1617, and first waveplate lens layer 1632 as they travel under the second lens slot die 1640 to ensure an even coating of the second waveplate lens layer 1642 onto the first waveplate lens layer 1632. The second waveplate lens layer 1642 may similarly be cured by irradiation from a UV light source 1645 and solvent may be removed by application of heat in an oven 1647. It will be appreciated that a single waveplate lens layer 1632 or more than two waveplate lens layers may be added by an apparatus similar to the apparatus 1600A of FIG. 18A. For example, if three waveplate lens layers are desired, the apparatus 1600A may have more lens slot dies (e.g., three lens slot dies) to apply the additional waveplate lens layers.

When all waveplate lens layers 1632, 1642 are applied and cured, the resultant lens substrate 1650 can be rolled onto a lens substrate roller 1655. In some embodiments, a further protection film 1652 may be applied to one or both sides of the lens substrate 1650 to protect surfaces and structures of the lens substrate 1650 during handling of the lens substrate roll 1655.

Figure 18B:
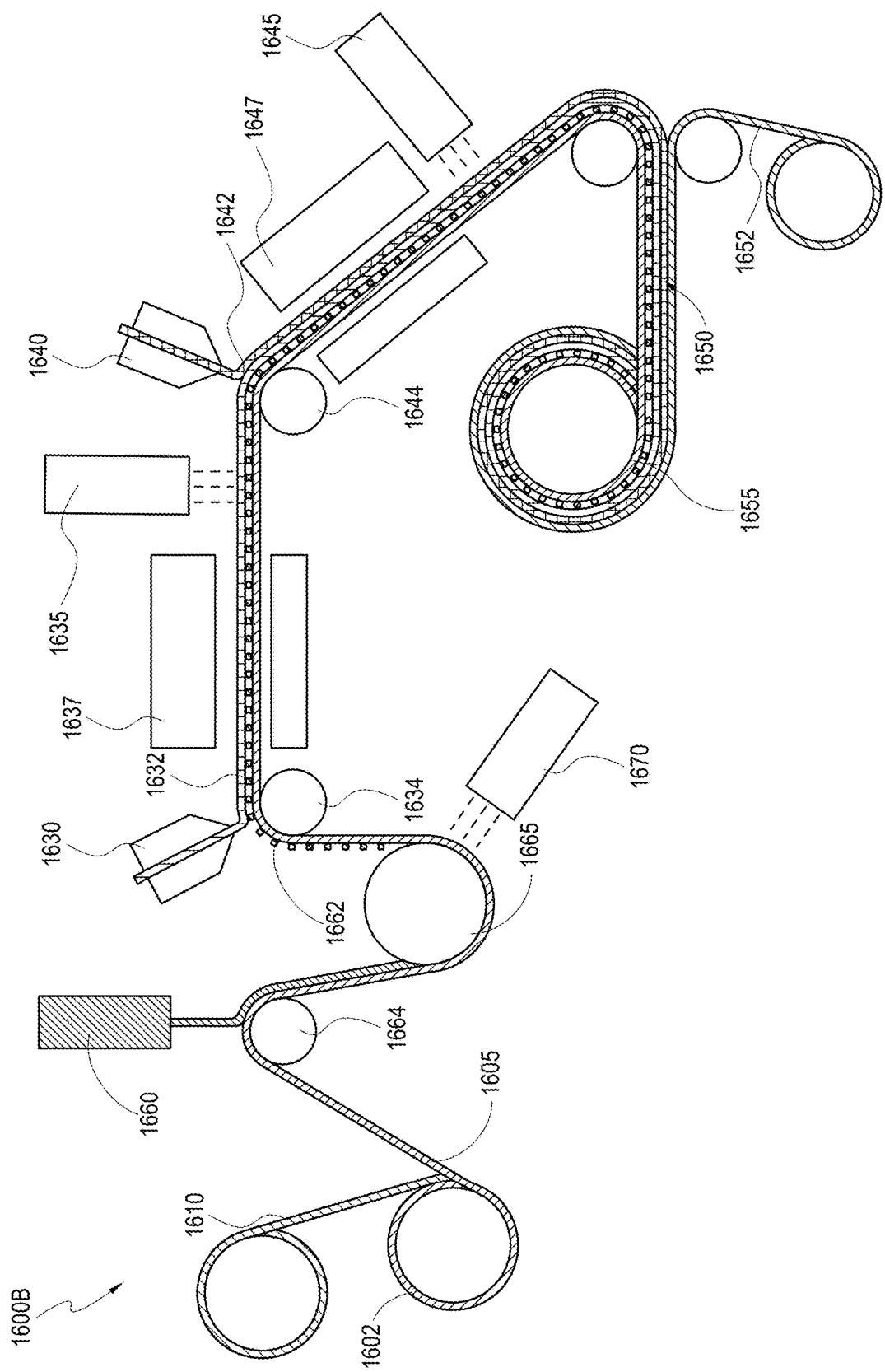
FIGS. 18B-C illustrate an example apparatus for roll-to-roll manufacturing of a lens substrate with an imprint alignment process for an adaptive lens assembly.
Figure 18C:
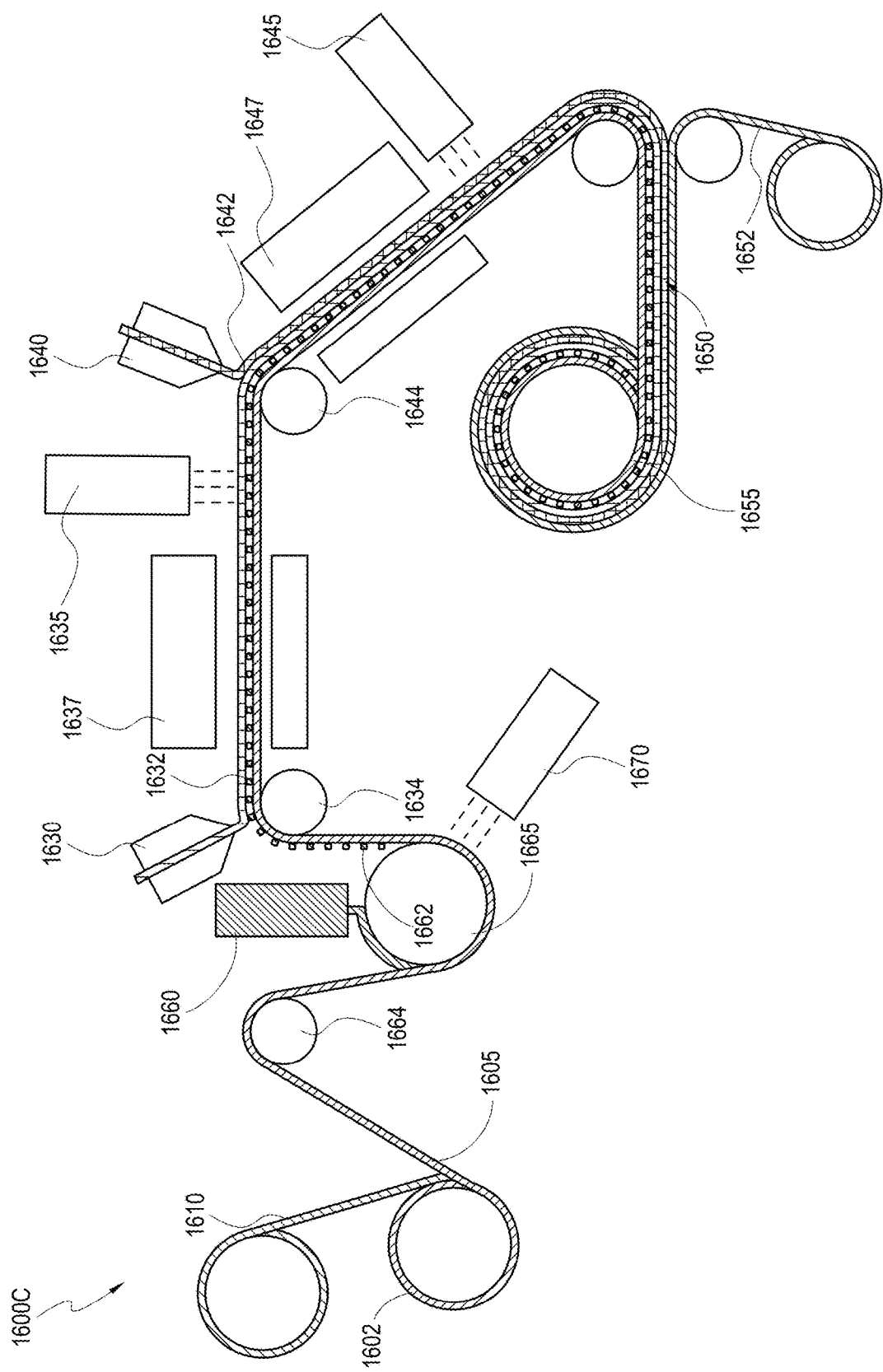

FIGS. 18B-18C illustrate further examples of apparatus for roll-to-roll manufacturing of a lens substrate. Similar to the apparatus 1600A of FIG. 18A, the apparatus 1600B and 1600C are configured to receive a supply substrate 1605 in the form of a supply substrate roll disposed around the roller 1602, and produce the lens substrate 1650, which may similarly be in the form of a lens substrate roll 1655 for further processing. The apparatus 1600B also includes lens slot dies 1630, 1640 to apply liquid crystal polymer waveplate lens layers 1632, 1642, which may be cured by UV light sources 1635, 1645 and/or heat sources 1637, 1647.

The apparatus 1600B and 1600C are configured to perform an imprint alignment process in which alignment features 1662 are added to a surface of the supply substrate 1605 by imprinting. The imprint alignment may be formed using a deposition device 1660, e.g., an inkjet printer or slot die, a conformal roll template (CRT) drum 1665, and a curing device 6070, e.g., a UV light source. The deposition device 1660 may be located at various locations within the apparatus 1600B, 1600C. In the example configuration of apparatus 1600B depicted in FIG. 18B, the deposition device 1660 is located upstream of the CRT drum 1665 to apply the imprintable material directly to the supply substrate 1605. It will be appreciated that the apparatus is configured to move the substrate in a particular direction (e.g., from the roller 1602 to the substrate roll 1655) and, as such, the terms "upstream" and "downstream" referred to points in the substrate path. "Upstream" refers to locations opposite from the direction in which the apparatus is configured to move the substrate, while "downstream" refers to locations in the direction in which the apparatus is configured to move the substrate.

In the configuration shown in FIG. 18B, as the supply substrate 1605 passes the deposition device 1660, the deposition device 1660 deposits a layer or a pattern of droplets onto the supply substrate 1605. In some embodiments, the pattern of droplets may form a continuous layer of material to be imprinted, e.g., resist material. An alignment printing roller 1664 may be provided to stabilize the supply substrate 1605 as it travels past the deposition device 1660 to provide a stable surface and enable the deposition device 1660 to deposit material onto the supply substrate 1605. The side of the supply substrate 1605 bearing the deposited material then contacts the CRT drum 1665. The surface of the CRT drum 1665 comprises a pattern of physical features which imprint a pattern in the deposited imprint material on the surface of the supply substrate 1605. Alternatively, as shown in the configuration of the apparatus 1600C of FIG. 18C, the deposition device 1660 may be located so as to deposit the imprintable material directly onto the CRT drum 1665. In this case, the imprintable material on the surface of the CRT drum 1665 may be applied to the surface of the supply substrate 1605 and imprinted and adhered to the supply substrate 1605 as the CRT drum 1665 contacts the supply substrate 1605.

The UV light source 1670 cures the imprinted material such that a negative tone of the features of the CRT drum 1665 surface remains on the supply substrate 1605 as the alignment features 1662. When the liquid crystal polymer for the first waveplate lens layer 1632 is applied to the supply substrate 1605 over the alignment features 1662 at the first lens slot die 1630, the alignment features 1662 may guide the alignment of crystals of the liquid crystal polymer before curing caused by energy source 1635, e.g., a UV light source. In some embodiments, the imprint layer formation applied by the apparatus 1600B may allow for continuous operation of the apparatus 1600B (e.g., non-stop processing of an entire roll of supply substrate 1605 into lens substrate 1650), because the imprint alignment process may be operated continuously without requiring a section of the supply substrate 1605 to be paused for, e.g., a stationary optical alignment.

Figure 18D:
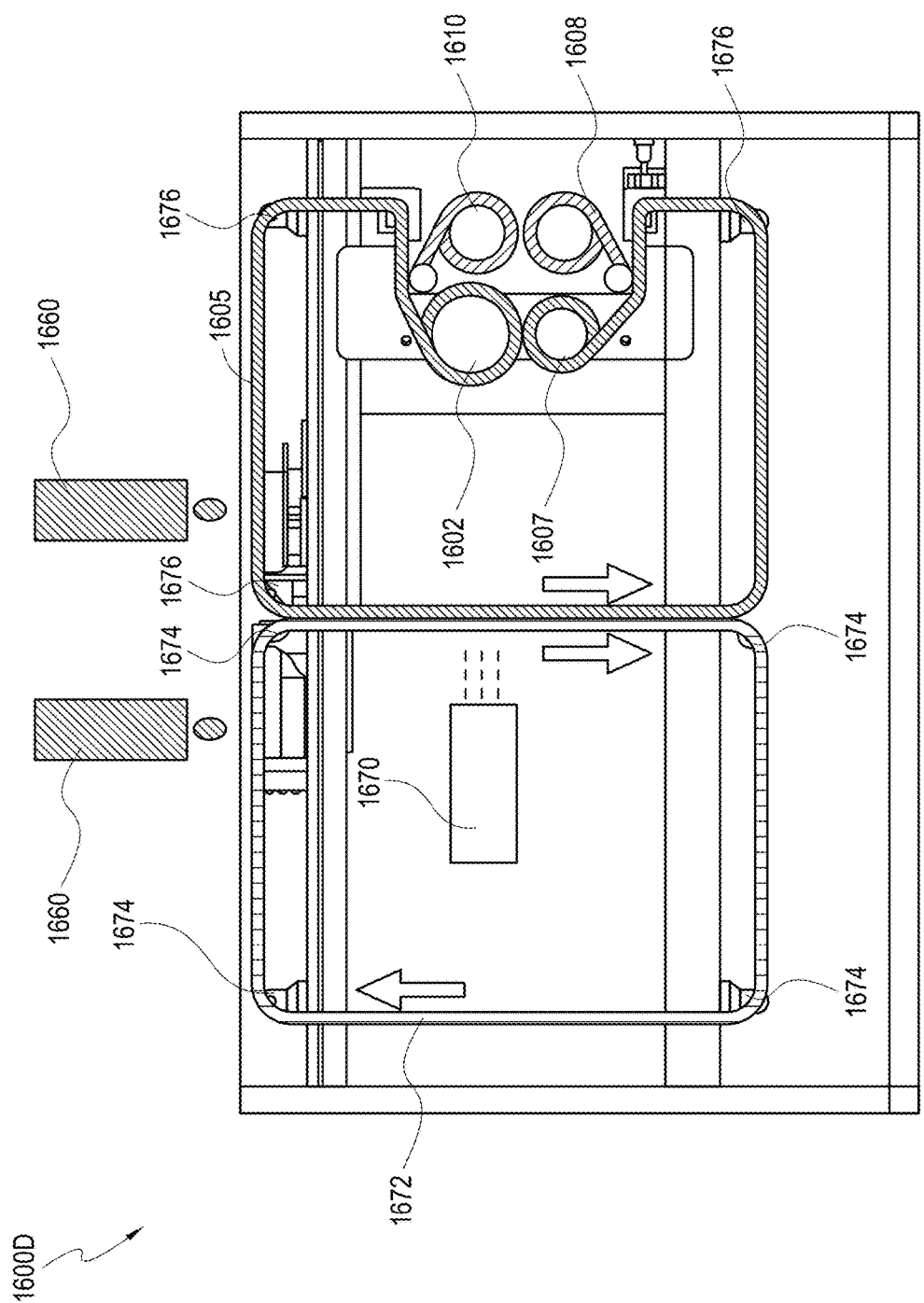
FIG. 18D illustrates an example apparatus for roll-to-roll manufacturing of an intermediate substrate with an imprint alignment process for an adaptive lens assembly.
Figure 18E:
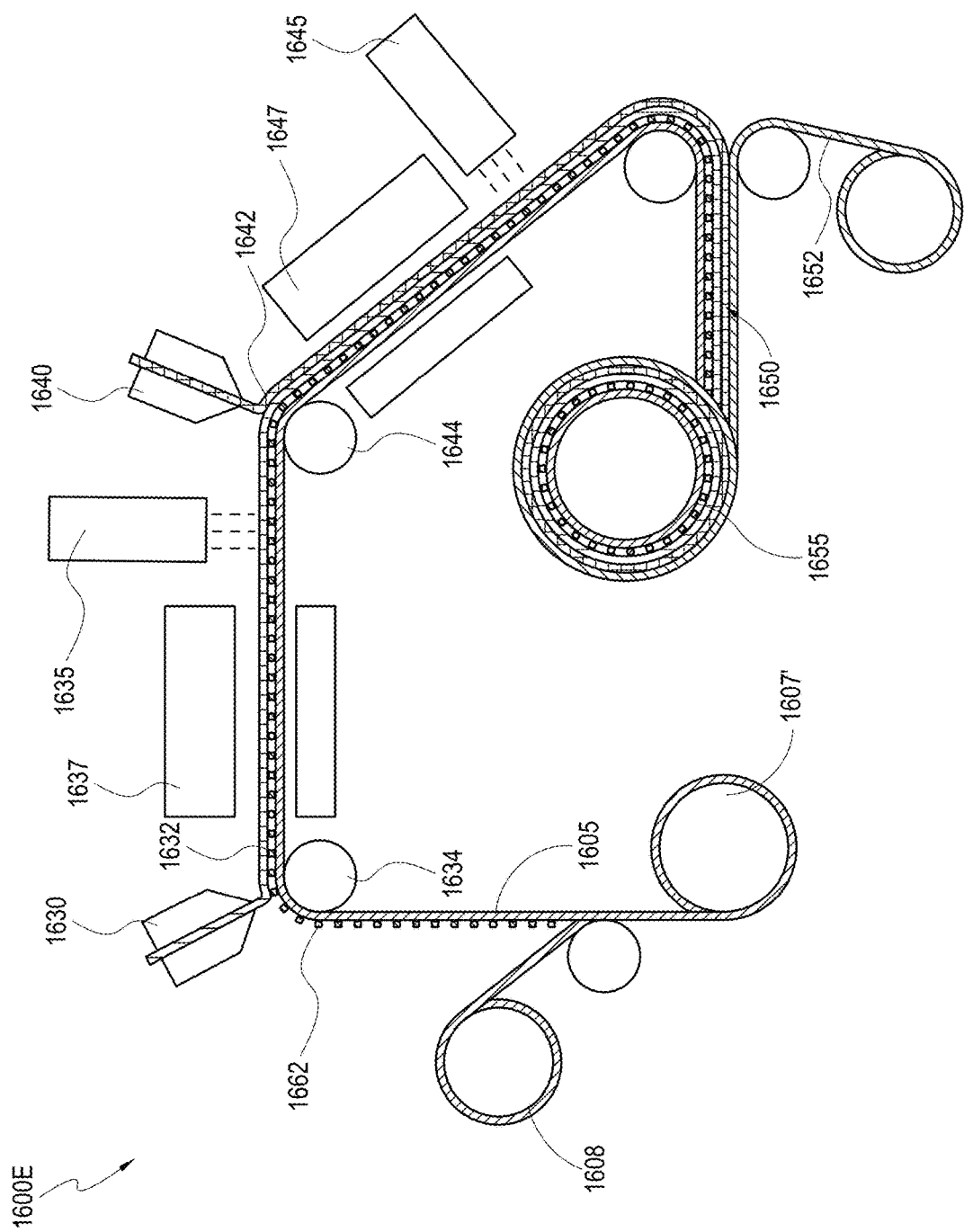
FIG. 18E illustrates an example apparatus for roll-to-roll manufacturing of a lens substrate using the intermediate substrate produced by the apparatus of FIG. 18D.

In some embodiments, the roll-to-roll manufacturing processes described and depicted with reference to FIGS. 18A-18C may be performed in two or more sub-processes, e.g., using different manufacturing apparatus. With reference to FIG. 18D, an apparatus 1600D may implement a first roll-to-roll manufacturing process to produce an intermediate substrate 1607, having alignment features, from a supply substrate 1605. With reference to FIG. 18E, an apparatus 1600E may subsequently implement a second roll-to-roll manufacturing process to produce the lens substrate 1655, having deposited liquid crystal layers, using the intermediate substrate 1607.

With reference to FIG. 18D, the apparatus 1600D is configured to perform an imprint alignment process similar to portions of the imprint alignment process of FIGS. 18B and 18C. The apparatus 1600D is configured to receive a supply substrate 1605 in the form of a supply substrate roll disposed around a supply substrate roller 1602. In some embodiments, the supply substrate roll includes a protection film 1610, which may be removed before alignment features are formed on the supply substrate 1605. The supply substrate 1605 travels through the apparatus 1600D supported by a plurality of supply substrate rollers 1676, which may be located, e.g., at points where the path of the supply substrate 1605 changes direction. The rollers 1676 facilitate movement of the supply substrate 1605 along a substrate path from the substrate supply roller 1602 to a roller 1607 around which the intermediate substrate is rolled to form an intermediate substrate roll. As used herein, the substrate supply roll is a roll of the supply substrate 1605 before formation of alignment features thereon and which may be wrapped around the substrate supply roller 1602, and the intermediate substrate roll is a roll of the supply substrate 1605 after forming alignment features which may be wrapped around the roller 1607.

The apparatus 1600D further includes a template 1672 (e.g., a conformal roll template), which may be a closed or continuous or continuous loop formed of a flexible material having an imprint template pattern on its surface. Preferably, rollers 1674 support, move, and provide tension for the template 1672. Thus, the rollers 1674 define a closed template path or travel loop for the template 1672. In some embodiments, the template 1672 may include a repeating template pattern similar to a template pattern present on the surface of the CRT drum 1665 of FIGS. 18B and 18C. It will be appreciated that the template path meets up or is directly adjacent a portion of the substrate path and that a pattern may be transferred from the template 1672 to the substrate 1605 at the location (an imprinting portion of the template path) where these two paths coincide.

The closed-loop template 1672 advantageously may provide advantages over a CRT drum arrangement. For example, it will be appreciated that the CRT drum may have a template wrapped around its surface, with the end of the template formed on a sheet of material having ends which are spliced together on the drum. At the point at which the ends are spliced, there may be overlap between those ends. Undesirably, this overlap does not provide acceptable imprinting results due to, e.g., differences in height between the overlap and other regions of the template. Consequently, the overlap undesirably decreases the yield and/or throughput of lens structures formed in the substrate 1605. Advantageously, while the template 1672 may also have an overlap region, the length of the template loop 1672 is typically longer than the circumference of the CRT drum. As a result, the percentage of the template 1672 occupied by the overlap is less than the percentage of the overlap region with a CRT drum. This can improve yield and/or throughput relative to the typical CRT drum. Moreover, in some embodiments, the length of the template 1672 may be increased as desired by appropriate lengthening and/or routing of the template 1672 along paths defined by the rollers 1674. It will be appreciated that the length of a template associated with a CRT drum is not as readily manipulated, since it is dependent on the size of the drum. In addition, as shown in FIGS. 18B and 18C, the CRT drum 1665 contacts the substrate along its curved surface, which may be susceptible to changes in tension at different points of contact with the substrate and, because the drum surface is curved, may not provide the same high fidelity for transferring imprint patterns as contact along a flat region such as provided by the template 1672.

With continued reference to FIG. 18D, at least one deposition device 1660 is disposed above the supply substrate 1605 and/or the conformal roll template 1672. Similar to the deposition device 1660 of FIGS. 18B and 18C, the deposition device 1660 can be any suitable device for depositing material onto either or both of the conformal roll template 1672 and the supply substrate 1605, such as an inkjet printer, a slot die, or the like. The deposited material may be a selectively definable material such as an imprint resist in some embodiments. Preferably, the supply substrate 1605 and the template 1672 travel in the same direction at the same speed along at least a portion of their paths through the apparatus 1600D. In some embodiments, the adjacent portions of the supply substrate 1605 and template 1672 travel paths are located downstream of the deposition device 1660, such that the deposited material can be imprinted by the template features of the conformal roll template 1672. An energy source 1670 (e.g., a light source such as a UV light source) is disposed along the adjacent portion and cures the imprinted material such that a negative tone of the features of the template 1672 surface remains on the supply substrate 1605 as one or more alignment features, similar to those depicted in FIGS. 18B and 18C after contact with the CRT drum 1665. In some embodiments, the adjacent portion is preferably a linear portion of the path the display substrate 1605, such that the conformal roll template 1672 and the supply substrate 1605 are both substantially flat as the deposited material is imprinted and cured. The imprinting and curing of the negative tone on the supply substrate 1605 yields an intermediate substrate. The imprinted side of the intermediate substrate may then be covered with a protection film 1608 before the intermediate substrate is rolled on the roller 1607 to complete the first part of a roll-to-roll manufacturing process.

With reference to FIG. 18E, a second part of a roll-to-roll manufacturing process may be used to form waveplate layers on the intermediate substrate to produce a finished lens substrate 1650. An apparatus 1600E is configured to receive the intermediate substrate, which was formed using the apparatus 1600D in some embodiments. In some embodiments, the apparatus 1600E may be located in a different location from the apparatus 1600D, and the intermediate substrate may be transported in roll form to the location of the apparatus 1600E to be converted to the lens substrate 1650. In the apparatus 1600E, the intermediate substrate may be unrolled at an intermediate substrate roller 1607'. Any protection film 1608 may also be removed during this unrolling. Similar to the processes described in FIGS.

18A-18C, after the protection film 1608 is removed from the intermediate substrate, a first waveplate lens layer 1632 may be deposited by a first waveplate lens layer dispenser 1615 (e.g., a slot die) and the first waveplate lens layer 1632 may be subsequently cured using a heat source 1637 (e.g., an oven) and/or a light source 1635 (e.g., a UV light source). A second waveplate lens layer may similarly be deposited by a second wave plate lens layer dispenser 1640 (e.g., a second slot die), and then cured using a second heat source 1647 (e.g., a second oven) and/or a second light source 1645 (e.g., a second UV light source). The resultant lens substrate 1650 can be rolled onto a lens substrate roller 1655. In some embodiments, a further protection film 1652 may be applied to one or both sides of the lens substrate 1650 to protect surfaces and structures of the lens substrate 1650 during handling of the lens substrate roller 1655.

Figure 19B:
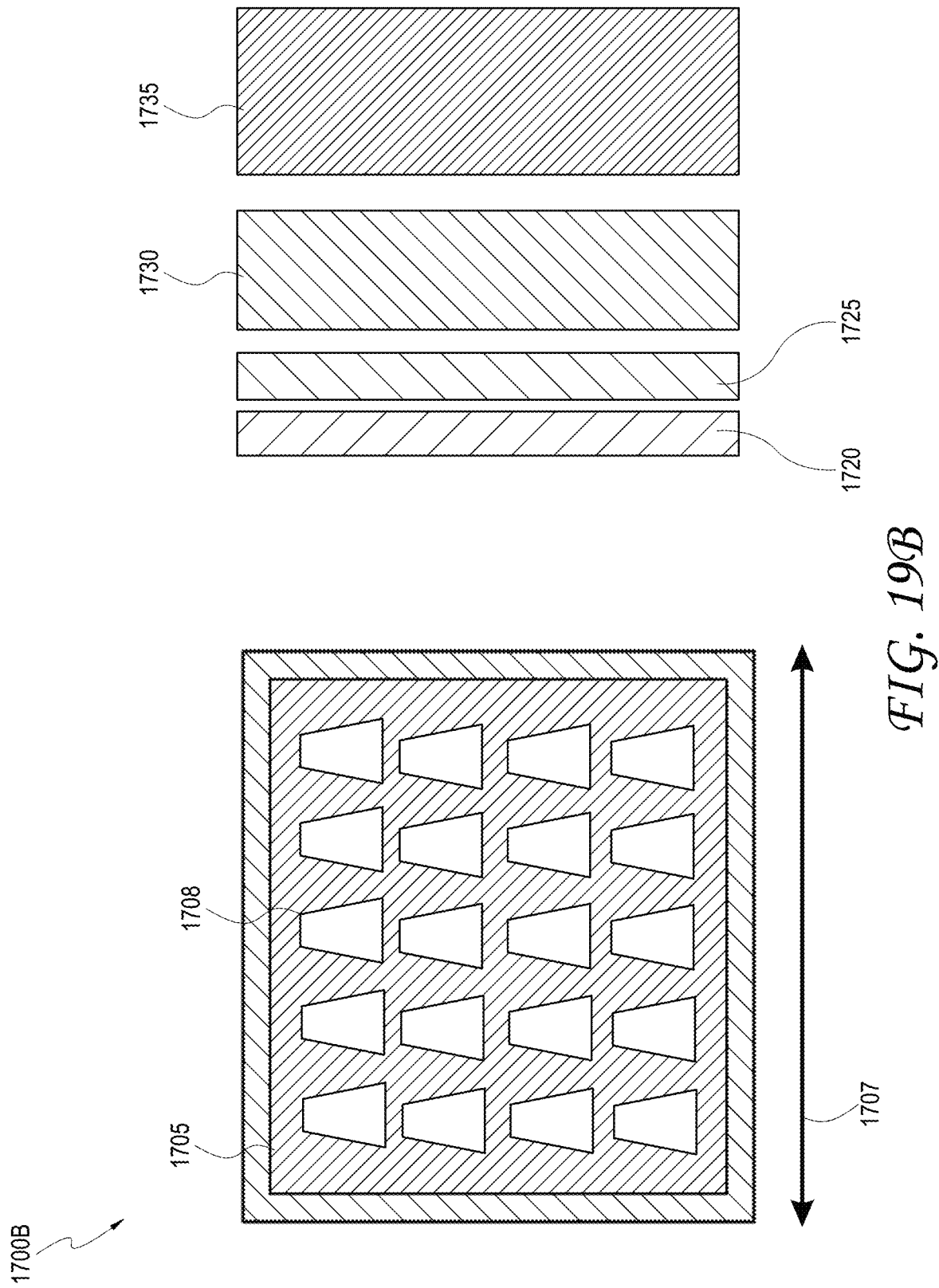
FIG. 19B illustrates an example apparatus for sheet manufacturing of a lens substrate with an optical alignment process for an adaptive lens assembly.

FIGS. 19A and 19B illustrate additional example systems for sheet manufacturing of a lens substrate for an adaptive lens assembly. Similar to the configurations of FIGS. 18A-18E, the systems 1700A and 1700B are configured to apply one or more thin waveplate lens layers, such as liquid crystal polymer waveplate lens layers, to a supply substrate to form a lens substrate. The processes applied in FIGS. 19A and 19B correspond to the processes applied in FIGS. 18A-18E, respectively. Systems 1700A and 1700B differ from the apparatus 1600A, 1600B, 1600C, 1600D, and 1600E primarily in that systems 1700A and 17000B are configured for sheet-based manufacturing processes, rather than the roll-to-roll manufacturing processes described with reference to FIGS. 18A-18E. For example, substrate sheets 1705, rather than rolls, may be utilized for processing. In various embodiments, the sheets may be square or rectangular, and may have dimensions of between 6" and 36" on each side.

System 1700A receives a supply substrate sheet 1705, which may be, for example, a quarter-wave plate substrate having a mesh or other array of conductive material form on one side of the substrate. System 1700A includes an optical aligner 1710, an alignment layer applicator 1715, a first waveplate lens layer applicator 1720, a second waveplate lens layer applicator 1725, a UV light source 1730, and an oven 1735 which may be similar to the deposition and curing devices of the apparatus 1600A of FIG. 18A. The alignment layer applicator 1715, and the waveplate lens layer applicators 1720, 1725 may each include a slot die and/or other mechanism for depositing a layer of material to the supply substrate sheet 1705. The supply substrate sheet 1705 travels along a process path 1707, passing the other components of the system 1700A. The optical aligner 1710 is configured to travel along an axis 1712 transverse to the process path 1707 such that the optical aligner can apply one or more alignment structures to the supply substrate sheet 1705 and/or alignment layer material 1715 by photolithography, direct write methods, holographic recording, or other optical process. In some embodiments, the optical aligner 1710 may apply the alignment structures while the supply substrate sheet 1705 is in a stationary position at least partially intersecting the axis 1712.

System 1700B of FIG. 19B employs a similar sheet processing method as shown in FIG. 19A. The system 1700B is configured to receive a supply substrate sheet 1705 that has been previously prepared with alignment features 1708. For example, the alignment structures 1708 can be applied by a jet-and-flash process similar to the imprint alignment process described with reference to FIG. 18B (involving the deposition of the resist layer and patterning, by imprinting, of that resist layer to form alignment structures 1708). It will be appreciated that the alignment structures 1708 are represented schematically and may have other arbitrary shapes and more complex arrangements of features than that depicted. Examples of alignment structures are disclosed in U.S. Provisional Patent Application No. 62/424,341, filed Nov. 18, 2016; and U.S. Provisional Patent Application No. 62/518,539, filed Jun. 12, 2017, the entireties of both of which are incorporated herein by reference. Thus, the alignment features 1708 may at least partially determine the orientation of crystals in the liquid crystal polymer applied by the first waveplate lens layer applicator 1720.

Figure 20A:
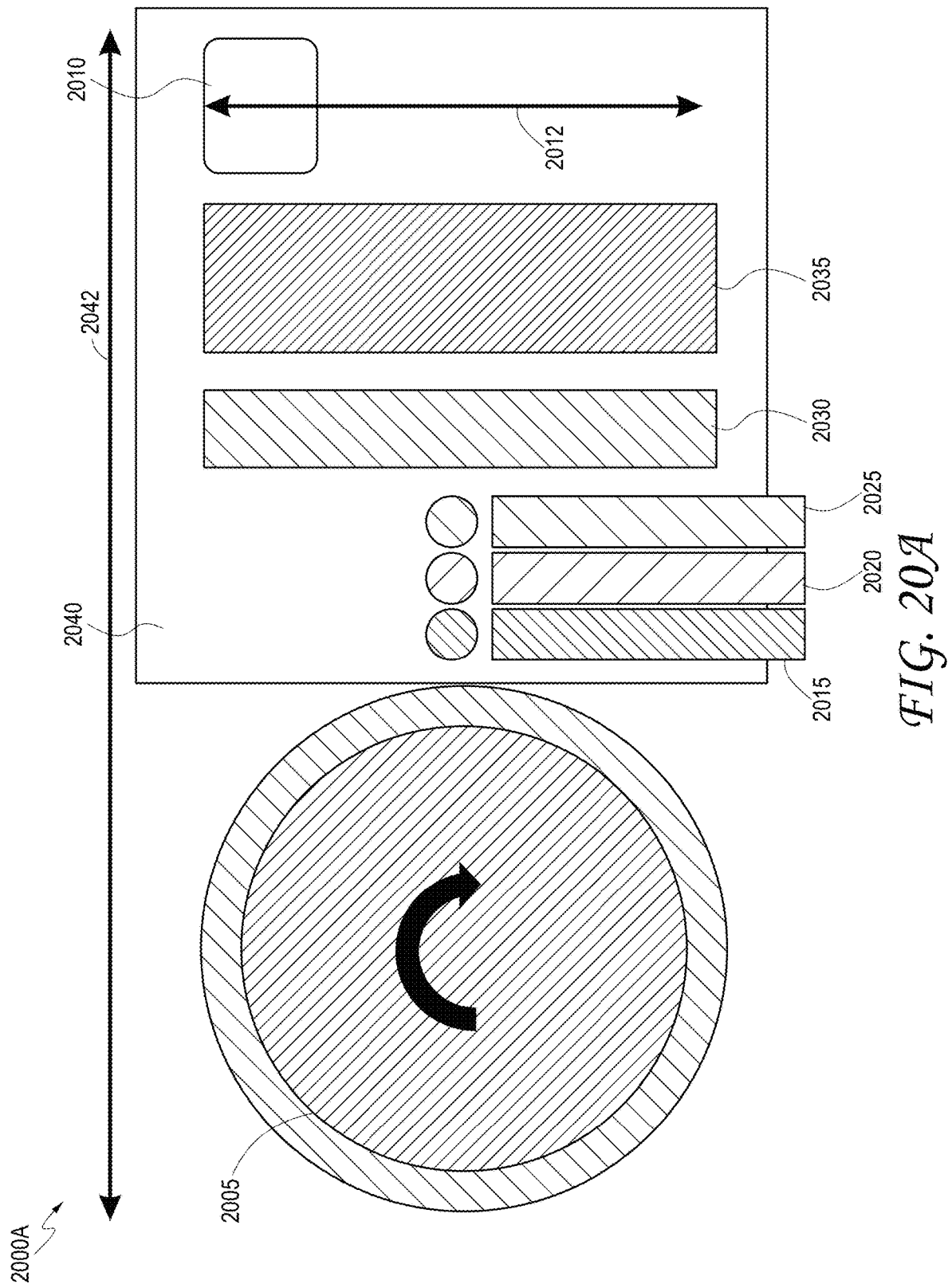
FIG. 20A illustrates an example apparatus for spin coat manufacturing of a lens substrate with an imprint alignment process for an adaptive lens assembly.
Figure 20B:
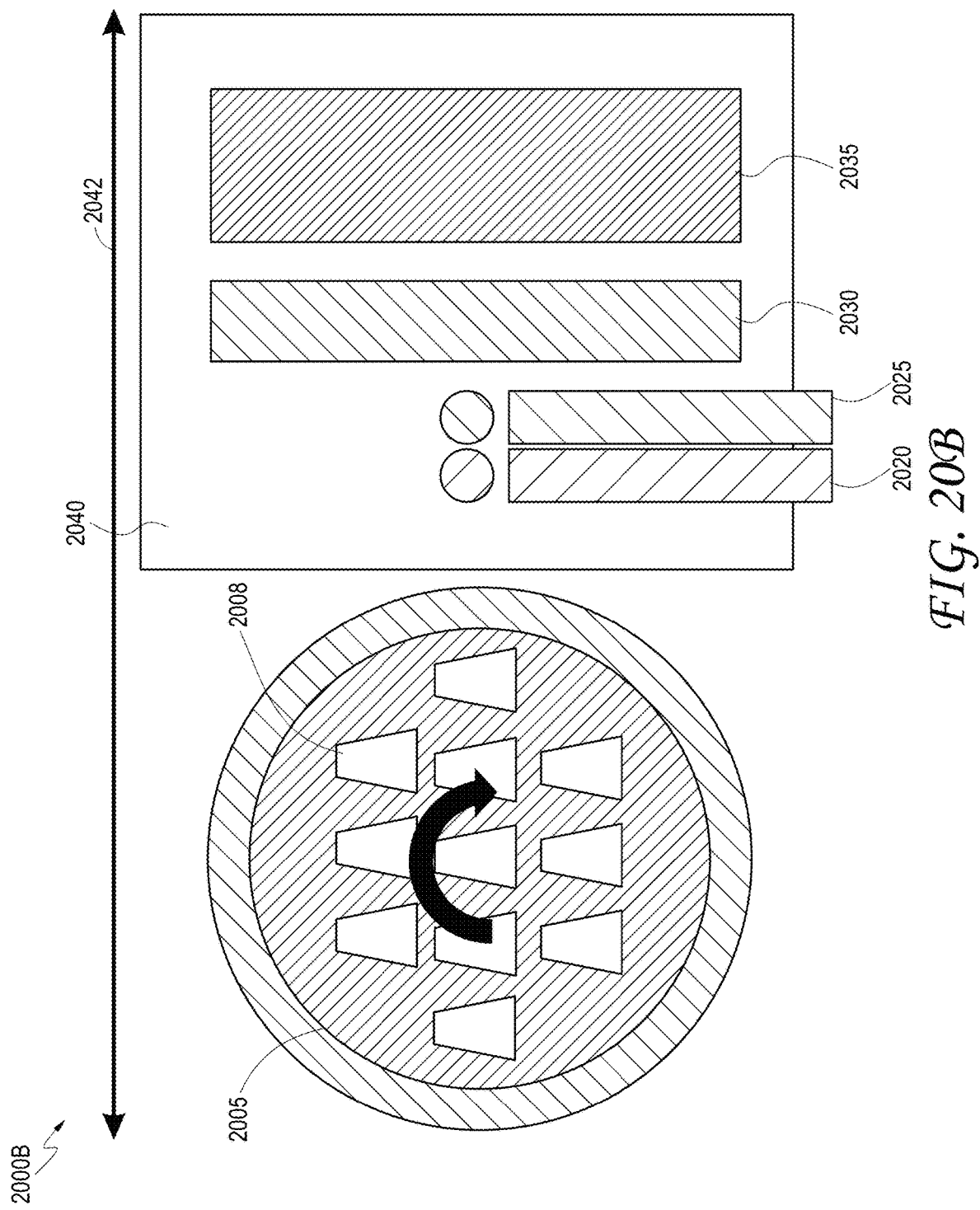
FIG. 20B illustrates an example apparatus for spin coat manufacturing of a lens substrate with an optical alignment process for an adaptive lens assembly.
Figure 26A:
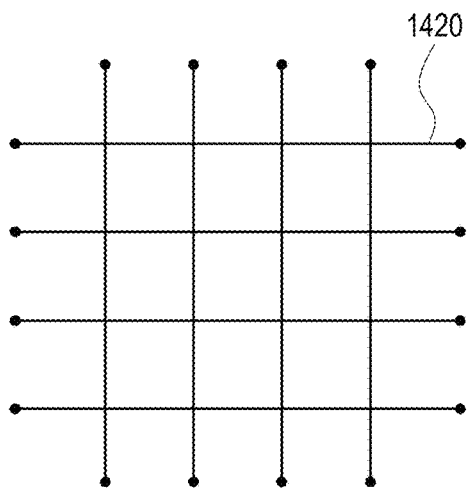
FIGS. 26A-26F illustrate examples of top-down views of patterns of conductive material.
Figure 26D:
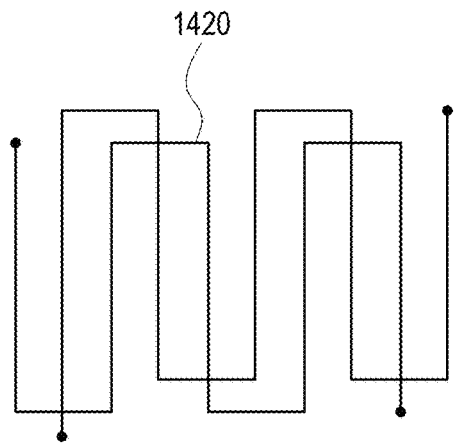
Figure 26B:
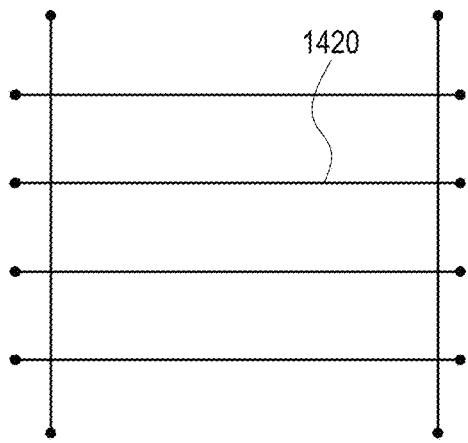
Figure 26E:
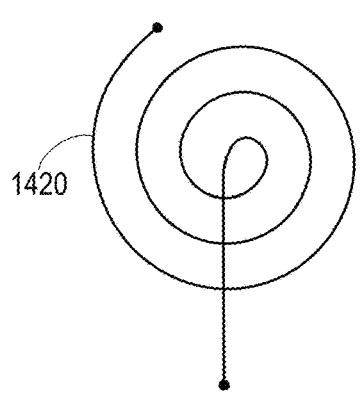
Figure 26C:
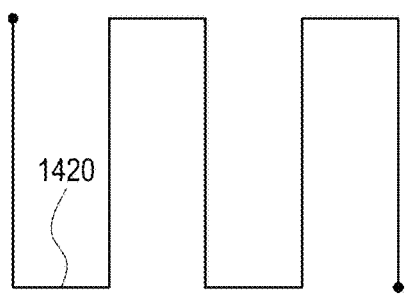
Figure 26F:
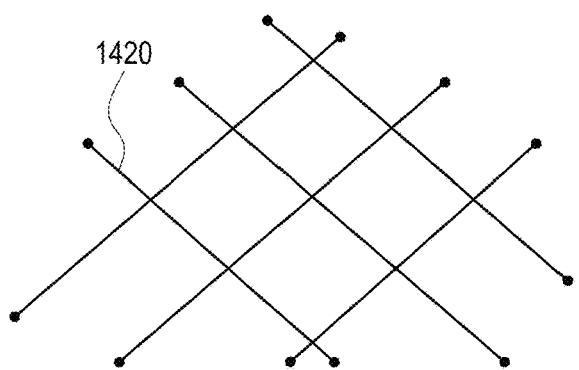

FIGS. 20A and 20B illustrate example systems for spin coat manufacturing of a lens substrate for an adaptive lens subassembly. Similar to the systems 1700A and 1700B of FIGS. 19A and 19B, the systems 2000A and 2000B are configured to apply one or more thin waveplate lens layers, such as liquid crystal waveplate lens layers, to a discrete section of a supply substrate to form a lens substrate. The processes applied in FIGS. 20A and 20B correspond to the processes applied in FIGS. 19A and 19B, respectively. Systems 2000A and 2000B differ from systems 1700A and 1700B primarily in that systems 2000A and 2000B are configured to form waveplate lens layers on a substantially circular supply substrate 2005, rather than the rectangular supply substrate sheets 1705 depicted in FIGS. 19A and 19B. For example, a roll of supply substrate may be cut into supply substrate sheets 2005 before entering the systems 2000A, 2000B, order substrate sheets may be obtained as circular sheets 2005. In various embodiments, the supply substrate wafers 2005 may have a diameter between 100 mm and 500 mm. For example, the supply substrate wafers 2005 may be of a standardized wafer size, such as 150 mm, 200 mm, 300 mm, 450 mm, etc.

System 2000A receives a supply substrate 2005, which may be, for example, a quarter-wave plate substrate having a mesh or other array of conductive material previously formed on one side of the substrate 2005. Similar to the system 1700A of FIG. 19A, system 2000A includes an optical aligner 2010, an alignment layer applicator 2015, a first waveplate lens layer applicator 2020, a second waveplate lens layer applicator 2025, a UV light source 2030, and an oven 2035, some or all of which may be located on a gantry 2040. The gantry can be movable along a gantry axis 2042 such that the gantry 2040 can travel to any of various positions partially or entirely over the rotating supply substrate wafer 2005. The optical aligner 2010 may be configured to travel along an aligner axis 2012 on the gantry 2040. The alignment layer applicator 1715, and the waveplate lens layer applicators 1720, 1725 may each include a dispensing mechanism configured to deposit a portion of liquid material to the supply substrate 2005. For example, dispensing mechanism may be a spin coating deposition device. In some embodiments, the dispensing mechanism may apply the liquid material to the center of the supply substrate wafer 2005 such that the spinning of the supply substrate 2005 causes the liquid to be distributed radially outward over the surface of the supply substrate wafer 2005 by centrifugal force.

The supply substrate wafer 2005 is rotated about the center of the substrate 2005 while the gantry 2040 passes over the wafer 2005 along the gantry axis 2042. In some embodiments, the gantry 2040 may pass several times over a supply substrate wafer 2005. For example, in a first pass, the alignment layer applicator 2015 may apply a liquid alignment layer which is distributed by centrifugal force, and cured as the UV light source 2030 and/or oven 2035 pass over the wafer 2005. The optical aligner 2010 may then pass over the wafer 2005 to optically generate one or more alignment structures within the alignment layer before the waveplate lens layers are applied by first and second waveplate lens layer applicators 2020, 2025. It will be appreciated that each of the alignment and waveplate lens layers may be deposited by spin coating, by deposition of material towards the center of the substrate 2005 and distribution of the material over the substrate by spending the substrate.

System 2000B of FIG. 20B employs a similar sheet processing method as shown in FIG. 20A. The system 2000B is configured to receive a supply substrate wafer 2005 that has been prepared with alignment features 2008, which may be similar to the alignment feature 1708 of FIG. 19B. For example, the alignment structures 2008 can be applied by an inkjet deposition and imprint process in which imprint material is deposited on the substrate 2005, the material is physically imprinted the pattern (e.g., using a mold or imprint reticle), the imprinted material is hardened or cured, and the mold or imprint reticle is removed. Thus, the alignment features 2008 may at least partially determine the orientation of crystals in the liquid crystal polymer applied by the first waveplate lens layer applicator 2020. One or more waveplate lenses may be formed on the alignment features 2008 using one or more waveplate lens layer applicators 2020, 2025 as described above regarding FIG. 20A.

Referring jointly to FIGS. 18A-20B, each apparatus, system, and method described may produce a roll or sheet of a lens substrate larger and/or differently shaped than an adaptive lens assembly that will be incorporated into a display device (e.g., adaptive lens assemblies 1004, 1008 as shown in FIG. 10). For example, a roll or sheet of the lens substrate may contain sufficient lens substrate to form a plurality of adaptive lens assemblies or subassemblies. Thus, the adaptive lens assemblies, subassemblies, and/or substrates may be divided, shaped, and/or singulated at some point during the manufacturing process. In one example, a roll of lens substrate may be cut into sheets. Cell walls (e.g., cell walls 1418 as shown in FIGS. 17C and 17D) may be printed onto a sheet in the desired shape of the adaptive lens assembly. The liquid crystal may then be added, and a quarter-wave plate substrate adhered to the cell walls as described herein to form a sheet of adaptive lens subassemblies. Alternatively, the sections of the substrate may be separated into the lens substrates for individual adaptive lens subassemblies before the liquid crystal is added. If a sheet of adaptive lens subassemblies is formed, the sheet may then be divided into individual adaptive lens subassemblies, which may then be combined in multiple layers to form a complete adaptive lens assembly.

Methods for Forming Wire Meshes and Electrode Patterns

As discussed above, various methods may be employed to form the electrode patterns, or wire meshes, 1420 disclosed herein.

FIGS. 21A-21C illustrate an example of a process for forming a pattern of conductive material by directional etching. A metal layer 1420 is deposited on the substrate 1416 and a resist layer 2100 is deposited (e.g. by inkjet deposition) on the metal layer 1420. The resist layer 2100 is subsequently patterned (e.g., by imprinting and subsequent hardening by UV exposure). The patterned resist layer 2100 may then be used as a mask for a directional or anisotropic etch of the underlying metal layer, to define the patterned conductive features 1420, which may be electrodes as disclosed herein. It will be appreciated that the substrate 1416 may correspond to substrates 1605, 1705, 2005 discussed with reference to various figures herein.

FIGS. 22A-22C illustrate an example of a process for forming a pattern of conductive material using a solvent-soluble "lift-off" layer. A solvent-soluble layer 2102 is deposited on the substrate 1416 and a resist layer 2100 is deposited (e.g. by inkjet deposition) on the solvent soluble layer 2102. The resist layer 2100 is subsequently patterned (e.g., by imprinting and subsequent hardening by UV exposure). The patterned resist layer 2100 may include a pattern of openings 2101a and may be used as a mask for a wet etch of the solvent-soluble underlying layer 2102, thereby opening up a volume into which metal (e.g., silver) is deposited using a blanket deposition, as shown in FIG. 22B. It will be appreciated that the blanket deposition may include a chemical vapor deposition (CVD or AP-CVD), a physical vapor deposition (PVD), a slot-die deposition, inkjet printing, doctor blade deposition, etc. In some embodiments, the solvent-soluble layer is formed of a water-soluble material and the wet etch comprises exposure to water. In some other embodiments, the solvent-soluble layer is formed of PMMA, and the wet etch comprises exposure to acetone or toluene. After the metal deposition, with reference to FIG. 22C, the overall structure is exposed to solvent again, which causes the solvent-soluble layer 2102 to be removed or easily lifted off to leave the deposited metal in a pattern dictated by the originally patterned resist layer 2100.

FIGS. 23A-23C illustrate an example of a process for forming a pattern of conductive material using a seed layer. A resist layer 2100 is deposited (e.g. by inkjet deposition) on the substrate 1416, and a solvent-soluble layer 2102 is deposited on the resist layer 2100. The resist layer 2100 and solvent-soluble layer 2102 are patterned (e.g., by imprinting and subsequent hardening by UV exposure) and have a shared open volume 2101a. A conductive seed layer (e.g., a metal layer) is blanket deposited (e.g., by CVD or PVD) over the entire structure. The solvent-soluble layer 2102 is subsequently exposed to solvent, thereby allowing removal of portions of the seed layer 2104' overlying the solvent-soluble layer 2102. Conductive metal is then selectively deposited in the opening 2101a by, e.g., electroplating.

FIGS. 24A-24C illustrate another example of a process for forming a pattern of conductive material using a seed layer. A conductive seed layer 2104 is deposited (e.g. by CVD or PVD) on the substrate 1416, and a resist layer 2100 is deposited on the seed layer 2104. The resist layer 2100 is patterned (e.g., by imprinting and subsequent hardening by UV exposure) to, e.g., define volumes 2101a. The volumes 2101a may be extended downward to expose the seed layer 2104 by etching e.g., using an anisotropic etch that is selective for the material forming the resist layer 2100. Conductive metal is then selectively deposited in the opening 2101a by, e.g., electroplating.

FIGS. 25A-25C illustrate an example of a process for forming a pattern of conductive material by deposition of a suspension of metal material into openings in a patterned layer. A resist layer 2100 is deposited (e.g. by CVD or PVD) on the substrate 1416 and is patterned (e.g., by imprinting and subsequent hardening by UV exposure) to, e.g., define volumes 2101a. A solution or suspension 1420" comprising a metal is subsequently deposited into the openings 2101a by, e.g., inkjet deposition, slot-die deposition, etc. Liquid in the suspension or solution may subsequently be removed by, e.g., exposure to heat (e.g., sintering) to leave metal in the openings. In some embodiments, the solution or suspension 1420" may be exposed to a timed wet or dry etch to remove a top portion of the deposited metal-containing layer extending above the opening 2101a and optionally not exposed to heat to drive liquid from the suspension of solution. In some embodiments, the resist 2100 may subsequently be removed. In some other embodiments, the resist may be retained in order to provide additional mechanical and structural stability.

FIGS. 26A-26F illustrate examples of top-down views of patterns of conductive material. In some embodiments, the conductive material 1420 in each of FIGS. 26A-26F may be formed by the methods described above with reference to FIGS. 21A-25C. Generally, the conductive material 1420 may be arranged in various shapes, patterns, paths, and/or orientations along a substrate. In some embodiments, the arrangement of the conductive material 1420 may be selected so as to provide a sufficiently uniform electric field across a liquid crystal material disposed adjacent to the substrate. In various non-limiting examples, the arrangement of the conductive material 1420 may include a square or rectangular array (e.g., FIG. 26A), an array of parallel wires connected by one or more transverse wires (e.g., FIG. 26B), a non-overlapping snaking wire (e.g., FIG. 26C), a plurality of overlapping snaking wires (e.g., FIG. 26D), a generally spiral wire (e.g., FIG. 26E), a parallelogram array (e.g., FIG. 26F), or various other arrangement of straight and/or curving elongated wires of material. Endpoints of the various wires of the conductive material 1420 may be in contact with other circuitry configured to selectively apply a voltage difference across the conductive material 1420 in order to generate an electric field.

Referring now to FIGS. 27A-27D, examples of cross-sectional side-views of lines of conductive material are illustrated. In some embodiments, the methods and layers depicted in FIGS. 27A-27D may be used, for example, to form a variety of shapes and/or layers of conductive material 1420 or other material. For example, additional layers may be useful in forming anti-reflective coatings. For example, a layer of cap material 1421 (e.g., optically transmissive material) may be applied over at least a portion of the conductive material 1421. The thickness of the cap material 1421 may be selected to allow the cap material 1421 to function as an anti-reflective coating, for example, to provide destructive interference at a desired range of wavelengths.

Figure 27A:
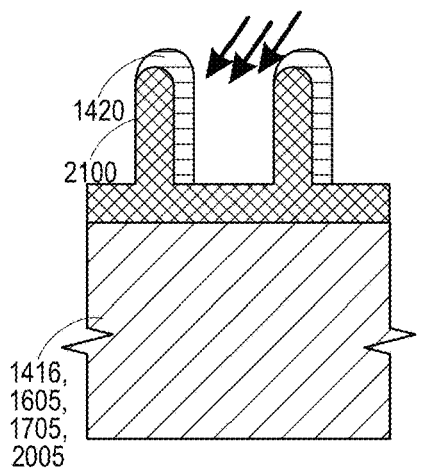
FIGS. 27A-27D illustrate examples of cross-sectional side-views of lines of conductive material.

As shown in FIG. 27A, in some embodiments a conductive material 1420 can be applied in a desired shape by an angled deposition. In FIG. 27A, a pattern layer 2100 includes a plurality of features protruding away from the substrate 1416, 1605, 1705, 2005. Angled deposition of a conductive material 1420, such as silver or the like, may result in a configuration in which one side of the protruding features is substantially covered, while other portions of the pattern layer 2100 remain exposed to, e.g., provide a relatively large cross-sectional area for current to flow.

Figures 27B, 27C:
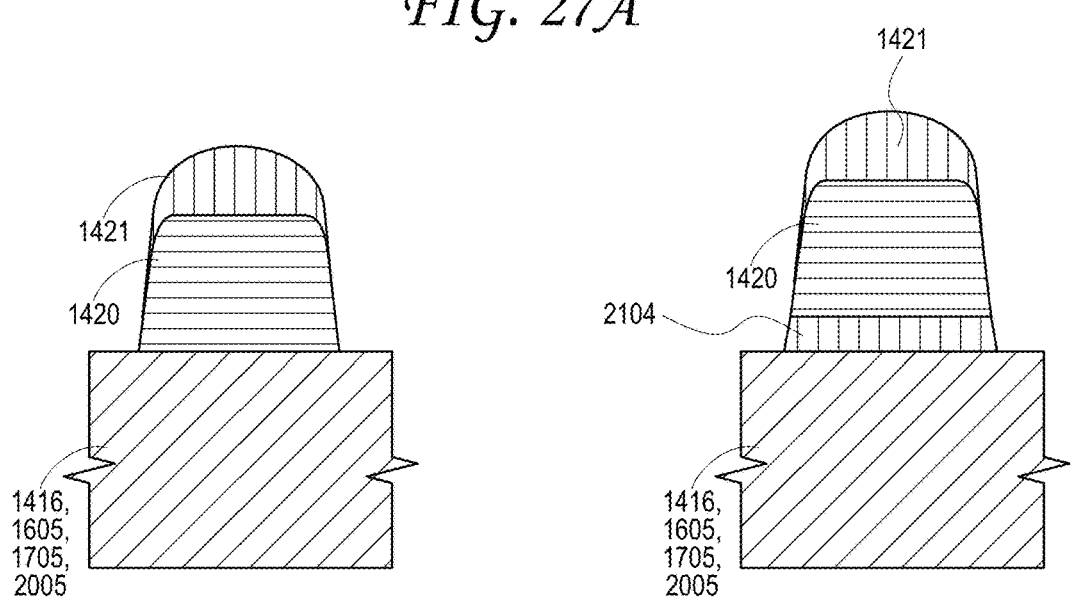
Figure 27D:
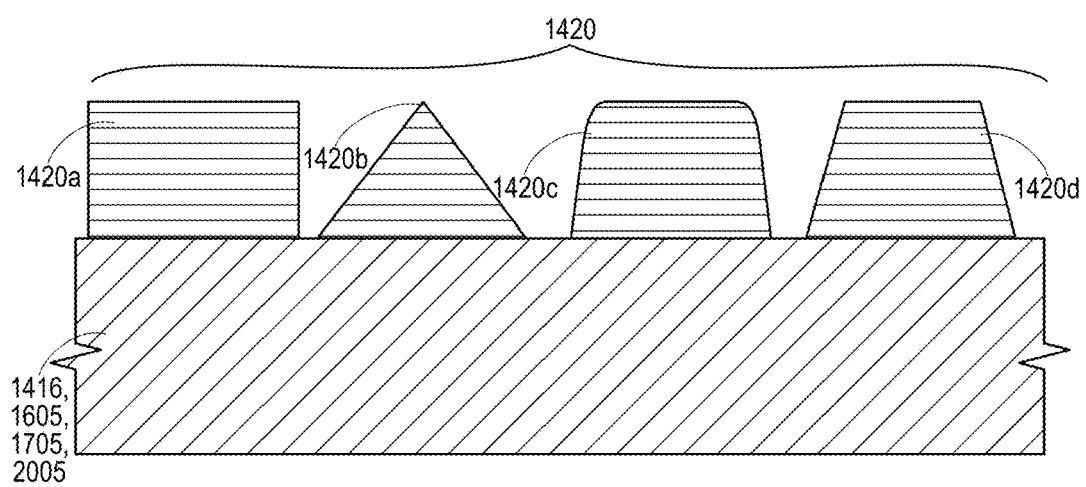

As shown in FIG. 27B, a cap material 1421 may be applied to a layer of conductive material 1420. For example, the cap material 1421 may be an additional metal, such as chromium or the like, an ionic compound such as $MgF_2$, $SiO_2$, $TiO_2$ or the like, or any other cap material than can be deposited onto the conductive material 1420 and provide desired electrical and/or optical properties. FIG. 27C depicts a similar arrangement to FIG. 27B, in which a further seed layer 2104 or adhesion layer is provided between the conductive material 1420 and the substrate 1416, 1605, 1705, 2005. For example, the seed layer may be left over from formation of the conductive material 1420 using the processes of FIGS. 23A-24C. As shown in FIG. 27D, the conductive material 1420 may be formed the substrate 1416, 1605, 1705, 2005 in a variety of shapes. For example, the cross-sectional profile of the conductive material 1420 may be a rectangular profile 1420a, a triangular profile 1420b, a rounded profile 1420c, a trapezoidal profile 1420d, or any other desired profile shape.

ADDITIONAL CONSIDERATIONS

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than restrictive sense.

Indeed, it will be appreciated that the systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure.

Certain features that are described in this specification in the context of separate embodiments also may be implemented in combination in a single embodiment. Conversely, various features that are described in the context of a single embodiment also may be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination. No single feature or group of features is necessary or indispensable to each and every embodiment.

It will be appreciated that conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise. Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one or more example processes in the form of a flowchart. However, other operations that are not depicted may be incorporated in the example methods and processes that are schematically illustrated. For example, one or more additional operations may be performed before, after, simultaneously, or between any of the illustrated operations. Additionally, the operations may be rearranged or reordered in other embodiments. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products. Additionally, other embodiments are within the scope of the following claims. In some cases, the actions recited in the claims may be performed in a different order and still achieve desirable results.

Accordingly, the claims are not intended to be limited to the embodiments shown herein, but are to be accorded the widest scope consistent with this disclosure, the principles and the novel features disclosed herein.

What is claimed is:

1. A display device comprising:
    a waveguide assembly comprising a waveguide configured to output light to display a image; and
    an adaptive lens assembly having a major surface facing a major surface of the waveguide, the adaptive lens assembly comprising:
        a waveplate lens comprising a liquid crystal polymer layer; and
        a switchable waveplate assembly comprising:
            a first substrate and a second substrate defining a volume therebetween, wherein the first substrate is a first quarter-wave plate and the second substrate is a second quarter-wave plate, and wherein the first substrate and the second substrate are composed of a non-liquid crystal material that is optically transmissive and pliable;
            a liquid crystal layer disposed within the volume;
            a first set of guides for aligning liquid crystal molecules of the liquid crystal layer, the first set of guides comprising a first electrode pattern disposed in the volume and directly on the first substrate; and
            a second set of guides for aligning the liquid crystal molecules of the liquid crystal layer, the second set of guides comprising a second electrode pattern disposed in the volume and directly on the second substrate;
            wherein the first electrode pattern and the second electrode pattern extend into the liquid crystal layer and are configured to selectively apply an electric field, and
            wherein the first electrode pattern and the second electrode pattern are configured to:
                cause a first orientation of the liquid crystal molecules of the liquid crystal layer when the electric field is not applied, to cause the adaptive lens assembly to provide a first optical power, and
                cause a second orientation of the liquid crystal molecules when the electric field is applied, to cause the adaptive lens assembly to provide a second optical power that is different than the first optical power.

2. The display device of claim 1, wherein at least one of the first electrode pattern and the second electrode pattern comprises an array of parallel conductors.

3. The display device of claim 1, wherein at least one of the first electrode pattern and the second electrode pattern comprises a wire mesh.

4. The display device of claim 1, wherein the waveplate lens and the switchable waveplate assembly constitute an adaptive lens subassembly, wherein the adaptive lens assembly comprises a plurality of adaptive lens subassemblies, each adaptive lens subassembly comprising:
    a waveplate lens; and
    a switchable waveplate assembly.

5. The display device of claim 1, further comprising an other adaptive lens assembly on the opposite side of the waveguide assembly from the adaptive lens assembly, wherein the other adaptive lens assembly comprises an associated waveplate lens and an associated switchable waveplate assembly.

6. An adaptive lens assembly comprising:
    a waveplate lens comprising a liquid crystal polymer layer;
    a switchable waveplate assembly comprising:
        a first substrate and a second substrate defining a volume therebetween, wherein the first substrate is a first quarter-wave plate and the second substrate is a second quarter-wave plate, and wherein the first substrate and the second substrate are composed of a non-liquid crystal material that is optically transmissive and pliable;
        a liquid crystal layer disposed within the volume;
        a first set of guides for aligning liquid crystal molecules of the liquid crystal layer, the first set of guides comprising a first electrode pattern disposed in the volume and directly on the first substrate; and
        a second set of guides for aligning the liquid crystal molecules of the liquid crystal layer, the second set of guides comprising a second electrode pattern disposed in the volume and directly on the second substrate;
        wherein the first electrode pattern and the second electrode pattern extend into the liquid crystal layer and are configured to selectively apply an electric field, and
        wherein the first electrode pattern and the second electrode pattern are configured to:
            cause a first orientation of the liquid crystal molecules of the liquid crystal layer when the electric field is not applied, to cause the switchable waveplate assembly to provide a first optical power, and
            cause a second orientation of the liquid crystal molecules when the electric field is applied, to cause the switchable waveplate assembly to provide a second optical power that is different than the first optical power.

7. The adaptive lens assembly of claim 6, wherein at least one of the first electrode pattern and the second electrode pattern comprises an array of parallel conductors.

8. The adaptive lens assembly of claim 6, wherein at least one of the first electrode pattern and the second electrode pattern comprises a wire mesh.

9. The adaptive lens assembly of claim 6, wherein the adaptive lens assembly further comprises an alignment layer disposed between the waveplate lens and the first quarter-wave plate, wherein the alignment layer at least partially determines orientations of the liquid crystal molecules in the liquid crystal polymer layer.

10. The adaptive lens assembly of claim 6, wherein the waveplate lens comprises an other liquid crystal polymer layer on the liquid crystal polymer layer.

11. The adaptive lens assembly of claim 6, wherein the waveplate lens and the switchable waveplate assembly constitute an adaptive lens subassembly, wherein the adaptive lens assembly comprises a plurality of adaptive lens subassemblies, each adaptive lens subassembly comprising:
   a waveplate lens; and
   a switchable waveplate assembly.

12. The display device of claim 1, wherein the switchable waveplate assembly further comprises an optically transmissive cap material comprising a metal or an ionic compound overlying at least a portion of the first electrode pattern or the second electrode pattern.

13. The display device of claim 12, wherein the cap material comprises an anti-reflective coating.

14. The adaptive lens assembly of claim 6, wherein the first electrode pattern and the second electrode pattern each comprise:
   a layer disposed on the first or second substrate and comprising a plurality of protrusions extending into the volume; and
   a layer of conductive material conformally disposed on at least a portion of the plurality of protrusions.

15. The adaptive lens assembly of claim 6, wherein the switchable waveplate assembly further comprises an optically transmissive cap material comprising a metal or an ionic compound overlying at least a portion of the first electrode pattern or the second electrode pattern.

16. The adaptive lens assembly of claim 15, wherein the cap material comprises an anti-reflective coating.

17. The display device of claim 1, wherein:
   the first orientation of the liquid crystal molecules causes the adaptive lens assembly to provide substantially zero optical power when the electric field is not applied, and
   the second orientation of the liquid crystal molecules causes the adaptive lens assembly to provide a positive optical power or a negative optical power when the electric field is applied.

18. The display device of claim 17, wherein the display device is configured to be worn by a user, and wherein:
   the adaptive lens assembly is on a user side of the waveguide assembly and the second orientation of the liquid crystal molecules causes the adaptive lens assembly to provide the negative optical power when the electric field is applied, or
   the adaptive lens assembly is on a world side of the waveguide assembly and the second orientation of the liquid crystal molecules causes the adaptive lens assembly to provide the positive optical power when the electric field is applied.

19. The display device of claim 1, wherein the adaptive lens assembly has an overall thickness between about 1 mm and about 3 mm.

20. The adaptive lens assembly of claim 6, wherein the adaptive lens assembly has an overall thickness between about 1 mm and about 3 mm.

* * * * *